(12) United States Patent  (10) Patent No.: US 7,911,562 B2
Okabe et al.  (45) Date of Patent: Mar. 22, 2011

(54) LIQUID CRYSTAL DISPLAY AND PROCESS FOR PRODUCING THE SAME

(75) Inventors: Masato Okabe, Tokyo-to (JP); Naoko Sawatari, Tokyo-to (JP); Makoto Ishikawa, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 10 days.

(21) Appl. No.: 11/914,640

(22) PCT Filed: May 19, 2006

(86) PCT No.: PCT/JP2006/310068
§ 371 (c)(1),
(2), (4) Date: Nov. 16, 2007

(87) PCT Pub. No.: WO2006/123791
PCT Pub. Date: Nov. 23, 2006

(65) Prior Publication Data
US 2009/0066884 A1  Mar. 12, 2009

(30) Foreign Application Priority Data

May 19, 2005 (JP) ................................. 2005-147230
May 19, 2005 (JP) ................................. 2005-147329

(51) Int. Cl.
*G02F 1/1334*  (2006.01)
*G02F 1/1339*  (2006.01)
*G02F 1/141*  (2006.01)

(52) U.S. Cl. ............................. 349/86; 349/155; 349/127

(58) Field of Classification Search ........................ None
See application file for complete search history.

(56) References Cited

U.S. PATENT DOCUMENTS 5,262,882 A * 11/1993 Hikmet ......................... 349/127
5,617,229 A   4/1997 Yamamoto et al.
(Continued)

FOREIGN PATENT DOCUMENTS

EP   1 079 265 A2   2/2001
(Continued)

OTHER PUBLICATIONS

Partial English translation for JP 2002-23164 A, (Sumiyoshi Ken) Jan. 23, 2002, [online], [retrieved on Sep. 7, 2009] Retrieved from the Industrial Property Digital Library of the Japanese Patent Office using Internet <URL: http://www.ipdl.inpit.go.jp/homepg_e.ipdl>.*

(Continued)

*Primary Examiner* — Omar Rojas
(74) *Attorney, Agent, or Firm* — Ladas & Parry LLP

(57) ABSTRACT

To provide a liquid crystal display, in which substrates are strongly fixed with an even cell gap to exhibit an excellent display quality. The liquid crystal display includes a spacer side substrate and a counter substrate in which the spacer side substrate and the counter substrate oppose a first alignment layer and a second alignment layer to each other; and in which a liquid crystal layer having a liquid crystal material are held between the spacer side substrate and the counter substrate. Additionally, a reactive alignment layer having a curable resin is formed on at least one of the first alignment layer and the second alignment layer, and the spacer side substrate and the counter substrate are bonded to each other with the reactive alignment layer interposed therebetween.

22 Claims, 14 Drawing Sheets

U.S. PATENT DOCUMENTS

| | | | |
|---|---|---|---|
| 5,880,803 A * | 3/1999 | Tamai et al. | 349/156 |
| 6,330,049 B1 * | 12/2001 | Kume et al. | 349/156 |
| 6,597,422 B1 | 7/2003 | Fünfschilling et al. | |
| 7,105,209 B2 * | 9/2006 | Heckmeier et al. | 428/1.1 |
| 7,326,449 B2 * | 2/2008 | Geisow et al. | 428/1.2 |
| 2002/0085153 A1 | 7/2002 | Choi et al. | |
| 2003/0021913 A1 | 1/2003 | O'Neill et al. | |
| 2003/0156243 A1 | 8/2003 | Yoshihara et al. | |
| 2004/0041975 A1 | 3/2004 | Yoshihara et al. | |

FOREIGN PATENT DOCUMENTS

| | | |
|---|---|---|
| JP | 62-182719 A | 8/1987 |
| JP | 01-105912 A | 4/1989 |
| JP | 04-234018 A | 8/1992 |
| JP | 7-64051 A | 3/1995 |
| JP | 7-199202 A | 8/1995 |
| JP | 7-239485 A | 9/1995 |
| JP | 2000-010076 A | 1/2000 |
| JP | 2001-142098 A | 5/2001 |
| JP | 2002-532755 A | 10/2002 |
| JP | 2003-172935 | 6/2003 |
| JP | 2003-241226 | 8/2003 |
| JP | 2004-12543 A | 1/2004 |
| JP | 2004-013098 | 1/2004 |
| JP | 2004-145258 A | 5/2004 |
| WO | WO 02/03131 | 1/2002 |

OTHER PUBLICATIONS

Yuji Murakami, et al; "Intrinsic Half-V-Mode Ferroelectric Liquid Crystal Displays Fabricated Using Hybrid Alignment Exhibiting High Contrast Ratio and High Reliability without DC Voltage Application to Remove Layer Degeneracy and Their Electro-Optic Characteristics", Jpn. J. Appl. Phys. vol. 42, (2003), pp. 2759-2761, Part 1, No. 5A, May 2003 (exact date not found).

* cited by examiner

LIQUID CRYSTAL DISPLAY AND PROCESS FOR PRODUCING THE SAME

TECHNICAL FIELD

The present invention relates to a liquid crystal display used in a liquid crystal display device or the like, more specifically, to a liquid crystal display in which the cell gap thereof is less fluctuated to exhibit an excellent display quality.

BACKGROUND ART

In recent years, liquid crystal display devices have been rapidly spreading instead of conventional CRT displays since the devices have characteristics of electric power saving, light weight, a thin form, and others. The liquid crystal display which constitutes any ordinary liquid crystal display device has a structure in which a liquid crystal layer made of a liquid crystal material having a regular configuration is held between two substrates having alignment layers, and has a function that the configuration state of the liquid crystal material is changed by the application of a voltage to between the substrates so as to display images.

The display quality of images based on liquid crystal displays depends on the configuration state of the liquid crystal material. When the configuration state of the liquid crystal molecules is made even, a good display quality can be obtained. Many factors which produce an effect on such a configuration state of liquid crystal material are known. One of the factors is the gap between the two substrates, between which the liquid crystal layer is held (the cell gap). The cell gap corresponds to the thickness of the liquid crystal layer. In order to obtain an excellent display quality, it is essential to fix the substrates to make the cell gap highly precise and uniform. In particular, recently, an increase in the screen size of liquid crystal display devices has been advancing; thus, there has been caused a problem that the display quality is deteriorated by a matter that the cell gap is fluctuated between the upper of the screen and the lower of the screen by an effect of gravity and others. Such a problem becomes in particular serious in liquid crystal displays using a ferroelectric liquid crystal.

Ferroelectric liquid crystal (FLC) exhibits a very fast response in order of microseconds, and thus FLC is a liquid crystal suitable for high-speed devices. In recent years, attention has been paid to ferroelectric liquid crystal in which the liquid crystal layer thereof is stable in a single state (hereinafter referred to as "monostable") when no voltage is applied thereto as a liquid crystal making it possible to attain gray scale display by the matter that the director (the inclination of the molecule axis) of the liquid crystal is continuously changed by a change in applied voltage so as to analogue-modulate the light transmission thereof (Non-Patent Document 1. FIG. 13). As the ferroelectric liquid crystal that can be made into a mono-stability state in the liquid crystal phase, there are a material having the phase change of cholesteric phase (Ch)-chiral smectic C phase (SmC*) without the transition to the smectic A (SmA) phase in the temperature lowering process and a material having the phase change of Ch-SmA-SmC* so as to show the SmC* phase via the SmA phase in the temperature lowering process (FIG. 14).

Ferroelectric liquid crystal has a higher order of molecules therein than nematic liquid crystal; therefore, the former liquid crystal is not easily aligned so that defects called zigzag defects or hairpin defects are easily generated. Such defects cause a fall in contrast based on light leakage. Moreover, the ferroelectric liquid crystal undergoing phase transition via no SmA phase in the phase sequence generates two domains different in the layer normal-line direction thereof (hereinafter referred to as "double domains") (FIG. 14). The double domains give such display that black and white are reversed when driven so as to cause a serious problem (FIG. 15). On the other hand, since the ferroelectric liquid crystal having the SmA phase in the phase sequence in general has two stable states for one layer normal so as to show the bi-stability, it is difficult to obtain a mono-stability state. From such a fact, in liquid crystal displays using a ferroelectric liquid crystal, it becomes in particular necessary that the cell gap is not fluctuated in order to stabilize the ferroelectric liquid crystal, the configuration of which is not originally controlled with ease, into a mono-stability state.

The cell gap of liquid crystal displays is usually kept constant by arranging members called spacers between their substrates. The method using such spacers is roughly classified to a method using bead-form spacers, and a method using column-form or wall-form spacers.

The method using bead-form spacers is a method of causing bead-form spacers having an even particle diameter to be present in the liquid crystal layer, thereby controlling the cell gap. The method has an advantage that the cell gap can easily be made even. However, in the bead-form spacer used method, the arrangement locations of the bead-form spacers in the liquid crystal layer cannot be controlled. Thus, the bead-form spacers are unfavorably provided in pixel regions, which are indispensable for the display of images, so as to cause a problem that the display quality of the liquid crystal display falls. Moreover, the bead-form spacer used method is not a method of fixing the two substrates positively; therefore, there is also caused a problem that an advantageous effect is not produced onto external force in the direction along which the cell gap is made wide although a good advantageous effect is produced onto external force in the direction along which the cell gap is made narrow.

On the other hand, the column-form or wall-form spacer used method has an advantage that a fall in the display quality can be prevented since the spacers can be provided by a photolithography method and other methods in regions other than the pixel regions, which are indispensable for the display of images. However, this method is not a method of fixing the two substrates positively, either; therefore, an advantageous effect is not produced onto external force in the direction along which the cell gap is made wide.

In such circumstances, Patent Document 1 discloses a method of using spacers having a photo thermal conversion function, arranging the spacers between two substrates having thermoplastic alignment layers, and then radiating light thereto so that heat is generated in the spacers so as to melt-bond the alignment layers of the two substrates and the spacers, thereby fixing the two substrates with a constant gap. Such a method is useful since the substrates can be strongly fixed with the constant cell gap. However, the constituent material of the alignment layers is limited to thermoplastic materials. Thus, there remains a problem that the scope to which the present method can be applied is narrow.

Patent Document 1: Japanese Patent Application Laid-Open No. 2004-13098

Non-Patent Document 1: NONAKA, T., LI, J. OGAWA, A., HORNUNG, B., SCHMIDT, W., WINGEN, R., and DUBAL, H., 1999, Liq. Cryst., 26, 1599

DISCLOSURE OF THE INVENTION

Problems to be Solved by the Invention

The present invention has been made in light of the above-mentioned problems, and a main object thereof is to provide a liquid crystal display in which substrates are strongly fixed with an even cell gap to exhibit an excellent display quality.

Means for Solving the Problems

To attain the above-mentioned object, the present invention provides a liquid crystal display, comprising: a spacer side substrate having a first substrate, a first electrode formed on the first substrate, a spacer formed on the first electrode, and a first alignment layer formed on the first electrode and the spacer, and a counter substrate having a second substrate, a second electrode formed on the second substrate, and a second alignment layer formed on the second electrode; in which the spacer side substrate and the counter substrate are provided to oppose the first alignment layer and the second alignment layer to each other; and in which a liquid crystal layer comprising a liquid crystal material are held between the spacer side substrate and the counter substrate; characterized in that a reactive alignment layer comprising a curable resin is formed on at least one of the first alignment layer and the second alignment layer, and further characterized in that

[Chemical Formula 1]

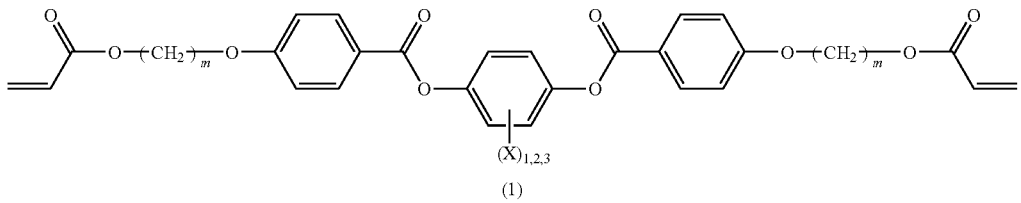

(1)

the spacer side substrate and the counter substrate are bonded to each other with the reactive alignment layer interposed therebetween.

In the liquid crystal display of the invention, at least one of the spacer side substrate and the counter substrate has the reactive alignment layer, which comprises a cured product of a curable resin, and the spacer side substrate and the counter substrate are bonded to each other with the reactive alignment layer interposed therebetween, whereby the spacer side substrate and the counter substrate can be strongly fixed with an even cell gap. According to the invention, therefore, a liquid crystal display in which the cell gap is not fluctuated by external force so as to exhibit an excellent display quality can be obtained.

In the invention, the curable resin is preferably a resin obtained by fixing a reactive liquid crystal. By using, as the curable resin, the resin obtained by fixing a reactive liquid crystal, the alignment regulating power of the reactive alignment layer to any liquid crystal material can be improved so that the alignment properties of the liquid crystal material in the liquid crystal layer can be improved.

In the invention, it is preferable that the above-mentioned reactive liquid crystal shows a nematic phase. The nematic phase allows the alignment control relatively easily among the liquid crystal phases.

Moreover, in the invention, it is preferable that the reactive liquid crystal has a polymerizable liquid crystal monomer. Compared with the other polymerizable liquid crystal materials, that is, a polymerizable liquid crystal oligomer and a polymerizable liquid crystal polymer, the polymerizable liquid crystal monomer can be aligned at a lower temperature and it has a high alignment sensitivity so that it can be aligned easily.

Furthermore, in the invention, it is preferable that the above-mentioned polymerizable liquid crystal monomer is a monoacrylate monomer or a diacrylate monomer. The monoacrylate monomer or the diacrylate monomer can easily be polymerized while preferably maintaining the aligned state.

Furthermore, in the invention, it is preferable that the diacrylate monomer is a compound represented by the below-mentioned formula (1):

Here, X in the formula is hydrogen, alkyl having 1 to 20 carbon atoms, alkenyl having 1 to 20 carbon atoms, alkyloxy having 1 to 20 carbon atoms, alkyloxy carbonyl having 1 to 20 carbon atoms, formyl, alkyl carbonyl having 1 to 20 carbon atoms, alkyl carbonyloxy having 1 to 20 carbon atoms, halogen, cyano or nitro; and m is an integer in a range of 2 to 20.

Still further, in the invention, it is preferable that the above-mentioned diacrylate monomer is a compound represented by the below-mentioned formula (2):

[Chemical Formula 2]

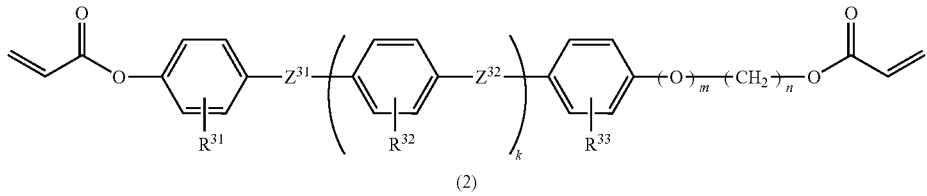

(2)

Here, $Z^{31}$ and $Z^{32}$ in the formula are each independently and directly bonded —COO—, —OCO—, —O—, —CH$_2$CH$_2$—, —CH=CH—, —C≡C—, —OCH$_2$—, —CH$_2$O—, —CH$_2$CH$_2$COO— or —OCOCH$_2$CH$_2$—; $R^{31}$, $R^{32}$ and $R^{33}$ are each independently hydrogen or alkyl having 1 to 5 carbon atoms; K and m is each 0 or 1; and n is an integer in a range of 2 to 8.

Moreover, in the invention, it is preferable that the above-mentioned first alignment layer and the above-mentioned second alignment layer is a photo alignment layer. Since the photo alignment treatment at the time of forming a photo alignment layer is a non contact alignment treatment, it is advantageous in that the quantitative alignment treatment control can be enabled without generation of the static electricity or the dust, and thus it is advantageous.

Furthermore, in the invention, it is preferable that a constituent material for the above-mentioned photo alignment layer is a photoreactive type material to exhibit anisotropy to the above-mentioned photo alignment layer by generating a photoreaction, or a photo-isomerization type material including a photo-isomerization-reactive compound to exhibit anisotropy to the above-mentioned photo alignment layer by generating a photo-isomerization reaction. By using such a material, the anisotropy can be exhibited easily to the photo alignment layer.

In the invention, the spacer side substrate and the counter substrate preferably have, therebetween, a sealing agent comprising an ultraviolet curable resin. When they have this sealing agent, it is possible to prevent the liquid crystal material from leaking from the liquid crystal layer. When the sealing agent comprises an ultraviolet curable resin, for example, the sealing agent and the reactive alignment layer can be simultaneously cured in the case of using an ultraviolet curable resin as the curable resin which constitutes the reactive alignment layer. For this reason, the process for producing the liquid crystal display of the invention can be made simple.

The liquid crystal display in the invention is preferably driven by an active matrix system using a thin film transistor (TFT). This is because the adoption of the active matrix system using TFT elements makes it possible to switch on or off target pixels surely to give high-quality display. Furthermore, it is possible to combine a TFT substrate, in which TFT elements are provided in a matrix form on one of the substrates, with a common electrode substrate, in which a common electrode is formed in the whole of the display section of the other substrate, to form a micro color filter in which TFT elements are provided in a matrix form between the common electrode of the common electrode substrate and the substrate thereof, and use the resultant as a color liquid crystal display.

The invention also provides a process for producing a liquid crystal display, using a spacer side substrate having a first substrate, a first electrode formed on the first substrate, a spacer formed on the first electrode, and a first alignment layer formed on the first electrode and the spacer, and a counter substrate having a second substrate, a second electrode formed on the second substrate, and a second alignment layer formed on the second electrode, comprising: steps of an uncured reactive alignment layer forming step of forming an uncured reactive alignment layer containing a curable resin that is not yet cured on at least one of the first alignment layer and the second alignment layer; a liquid crystal display substrate pair-forming step of bringing the spacer side substrate and the counter substrate into contact with each other to oppose the first alignment layer and the second alignment layer to each other with the uncured reactive alignment layer interposed therebetween, and then curing the curable resin, thereby bonding the spacer side substrate and the counter substrate to each other to form a liquid crystal display substrate pair; and a liquid crystal layer forming step of forming a liquid crystal layer between the spacer side substrate and the counter substrate of the liquid crystal display substrate pair formed in the liquid crystal display substrate pair-forming step.

The invention also provides a process for producing a liquid crystal display, using a spacer side substrate having a first substrate, a first electrode formed on the first substrate, a spacer formed on the first electrode, and a first alignment layer formed on the first electrode and the spacer, and a counter substrate having a second substrate, a second electrode formed on the second substrate, and a second alignment layer formed on the second electrode, comprising steps of: an uncured reactive alignment layer forming step of forming an uncured reactive alignment layer containing a curable resin that is not yet cured on at least one of the first alignment layer and the second alignment layer; a liquid crystal dropping step of dropping a liquid crystal material on at least one of the first alignment layer and the second alignment layer after the uncured reactive alignment layer forming step; and a substrate bonding step of bringing the spacer side substrate and the counter substrate into contact with each other to oppose the first alignment layer and the second alignment layer to each other with the uncured reactive alignment layer interposed therebetween, and then curing the curable resin, thereby bonding the spacer side substrate and the counter substrate to each other.

According to the invention, the spacer side substrate and the counter substrate can be strongly fixed to each other with the reactive alignment layer interposed therebetween; therefore, a liquid crystal display in which the cell gap is not fluctuated to exhibit an excellent display quality can be produced.

Moreover, in order to attain the object, the invention provides a liquid crystal display comprising: a spacer side substrate having a first substrate, a first electrode formed on the first substrate, a spacer formed on the first electrode, and a first alignment layer formed on the first electrode and the spacer, and a counter substrate having a second substrate, a second electrode formed on the second substrate, and a second alignment layer formed on the second electrode; in which the spacer side substrate and the counter substrate are provided to oppose the first alignment layer and the second alignment layer to each other; and further in which a liquid crystal layer comprising a ferroelectric liquid crystal are held between the spacer side substrate and the counter substrate; characterized in that a reactive liquid crystal layer obtained by fixing a reactive liquid crystal is formed on at least one of the first alignment layer and the second alignment layer, and further characterized in that the spacer side substrate and the counter substrate are bonded to each other with the reactive liquid crystal layer interposed therebetween.

In the liquid crystal display of the invention, either one of the spacer side substrate or the counter substrate has the reactive liquid crystal layer, in which a reactive liquid crystal is fixed, and the spacer side substrate and the counter substrate are bonded to each other with the reactive liquid crystal layer interposed therebetween, whereby the spacer side substrate and the counter substrate can be strongly fixed with an even cell gap. According to the invention, therefore, a liquid crystal display in which the cell gap is not fluctuated by external force so as to exhibit an excellent display quality can be obtained.

Since the reactive liquid crystal layer in the invention is a layer obtained by fixing a reactive liquid crystal, the layer can function as an alignment layer for aligning the ferroelectric liquid crystal which constitutes the liquid crystal layer. Accordingly, alignment of the ferroelectric liquid crystal can be more effectively controlled than in the case of using only the alignment layers. Furthermore, according to the invention, either one of the spacer side substrate or the counter substrate has the reactive liquid crystal layer, in which a reactive liquid crystal is fixed, thereby making it possible to restrain the generation of alignment defects such as zigzag defects, hairpin defects or double domains. Thus, an operation mode of mono-stability using a ferroelectric liquid crystal can be realized.

The invention also provides a liquid crystal display comprising: a spacer side substrate having a first substrate, a first electrode formed on the first substrate, a spacer formed on the first electrode, a first alignment layer formed on the first electrode and the spacer, and a first reactive liquid crystal layer formed on the first alignment layer and obtained by fixing a reactive liquid crystal, and a counter substrate having a second substrate, a second electrode formed on the second substrate, a second alignment layer formed on the second electrode, and a second reactive liquid crystal layer formed on the second alignment layer and obtained by fixing a reactive liquid crystal; in which the spacer side substrate and the counter substrate are provided to oppose the first reactive liquid crystal layer and the second reactive liquid crystal layer to each other; and further in which a liquid crystal layer comprising a ferroelectric liquid crystal are held between the spacer side substrate and the counter substrate; characterized in that the reactive liquid crystal which constitutes the first reactive liquid crystal layer and the reactive liquid crystal which constitutes the second reactive liquid crystal layer are different from each other in composition.

In the liquid crystal display of the invention, the spacer side substrate and the counter substrate are bonded to each other with the first reactive liquid crystal layer and the second reactive liquid crystal layer interposed therebetween, whereby the spacer side substrate and the counter substrate can be strongly fixed with an even cell gap. According to the invention, therefore, a liquid crystal display in which the cell gap is not fluctuated by external force so as to exhibit an excellent display quality can be obtained.

Moreover, in the liquid crystal display of the invention, the spacer side substrate and the counter substrate have the reactive liquid crystal layers, respectively, whereby the alignment of the ferroelectric liquid crystal can be more effectively controlled than in the case that the spacer side substrate and the counter substrate have only the alignment layers, respectively. The reactive liquid crystal which constitutes the first reactive liquid crystal layer formed on the first alignment layer is different in composition from the reactive liquid crystal which constitutes the second reactive liquid crystal layer formed on the second alignment layer, thereby making it possible to restrain the generation of alignment defects such as zigzag defects, hairpin defects or double domains. Thus, an operation mode of mono-stability using a ferroelectric liquid crystal can be realized.

In the invention, it is preferable that the above-mentioned reactive liquid crystal shows a nematic phase. The nematic phase allows the alignment control relatively easily among the liquid crystal phases.

Moreover, in the invention, it is preferable that the reactive liquid crystal has a polymerizable liquid crystal monomer. Compared with the other polymerizable liquid crystal materials, that is, a polymerizable liquid crystal oligomer and a polymerizable liquid crystal polymer, the polymerizable liquid crystal monomer can be aligned at a lower temperature and it has a high alignment sensitivity so that it can be aligned easily.

Furthermore, in the invention, it is preferable that the above-mentioned polymerizable liquid crystal monomer is a monoacrylate monomer or a diacrylate monomer. The monoacrylate monomer or the diacrylate monomer can easily be polymerized while preferably maintaining the aligned state.

Furthermore, in the invention, it is preferable that the diacrylate monomer is a compound represented by the below-mentioned formula (1):

[Chemical Formula 3]

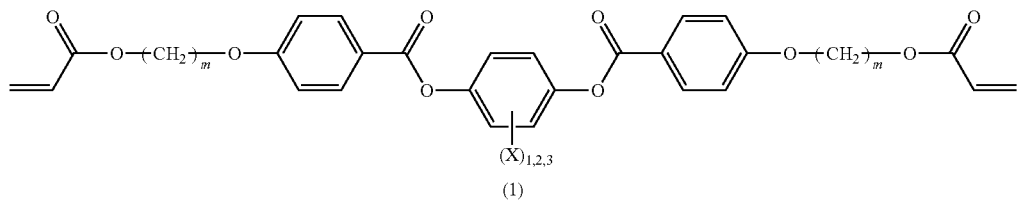

(1)

Here, X in the formula is hydrogen, alkyl having 1 to 20 carbon atoms, alkenyl having 1 to 20-carbon atoms, alkyloxy having 1 to 20 carbon atoms, alkyloxy carbonyl having 1 to 20 carbon atoms, formyl, alkyl carbonyl having 1 to 20 carbon atoms, alkyl carbonyloxy having 1 to 20 carbon atoms, halogen, cyano or nitro; and m is an integer in a range of 2 to 20.

Still further, in the invention, it is preferable that the above-mentioned diacrylate monomer is a compound represented by the below-mentioned formula (2):

[Chemical Formula 4]

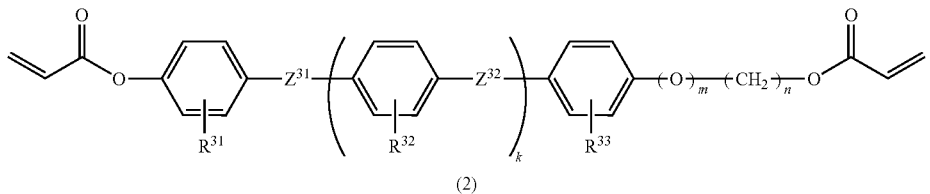

(2)

Here, $Z^{31}$ and $Z^{32}$ in the formula are each independently and directly bonded —COO—, —OCO—, —O—, —$CH_2CH_2$—, —CH=CH—, —C≡C—, —$OCH_2$—, —$CH_2O$—, —$CH_2CH_2COO$— or —$OCOCH_2CH_2$—; $R^{31}$, $R^{32}$ and $R^{33}$ are each independently hydrogen or alkyl having 1 to 5 carbon atoms; K and m is each 0 or 1; and n is an integer in a range of 2 to 8.

Moreover, in the invention, it is preferable that the above-mentioned first alignment layer and the above-mentioned second alignment layer is a photo alignment layer. Since the photo alignment treatment at the time of forming a photo alignment layer is a non contact alignment treatment, it is advantageous in that the quantitative alignment treatment control can be enabled without generation of the static electricity or the dust, and thus it is advantageous.

Furthermore, in the invention, it is preferable that a constituent material for the above-mentioned photo alignment layer is a photoreactive type material to exhibit anisotropy to the above-mentioned photo alignment layer by generating a photoreaction, or a photo-isomerization type material including a photo-isomerization-reactive compound to exhibit anisotropy to the above-mentioned photo alignment layer by generating a photo-isomerization reaction. By using such a material, the anisotropy can be exhibited easily to the photo alignment layer.

In the invention, the ferroelectric liquid crystal is preferably made into a mono-stability state. The light transmission can be analogue-modulated by varying the director of the liquid crystal continuously on the basis of a voltage change. Consequently, gray scale display can be attained.

In the invention, the spacer side substrate and the counter substrate preferably have, therebetween, a sealing agent comprising an ultraviolet curable resin. When they have this sealing agent, it is possible to prevent the liquid crystal material from leaking from the liquid crystal layer. When the sealing agent comprises an ultraviolet curable resin, for example, the sealing agent and the reactive alignment layer can be simultaneously cured in the case of using an ultraviolet curable resin as the curable resin which constitutes the reactive alignment layer. For this reason, the process for producing the liquid crystal display of the invention can be made simple.

The liquid crystal display in the invention is preferably driven by an active matrix system using a thin film transistor (TFT). This is because the adoption of the active matrix system using TFT elements makes it possible to switch on or off target pixels surely to give high-quality display. Furthermore, it is possible to combine a TFT substrate, in which TFT elements are provided in a matrix form on one of the substrates, with a common electrode substrate, in which a common electrode is formed in the whole of the display section of the other substrate, to form a micro color filter in which TFT elements are provided in a matrix form between the common electrode of the common electrode substrate and the substrate thereof, and use the resultant as a color liquid crystal display.

Moreover, the liquid crystal display of the invention is preferably displayed by a field sequential color system. This is because the liquid crystal display of the invention has a fast response speed and can align the ferroelectric liquid crystal without generating alignment defects. As a result, a bright and highly precise, low-power consumption and low cost display of color moving images with a wide viewing angle can be realized by displaying the field sequential color system.

The invention further provides a process for producing a liquid crystal display, using a spacer side substrate having a first substrate, a first electrode formed on the first substrate, a spacer formed on the first electrode, and a first alignment layer formed on the first electrode and the spacer; and a counter substrate having a second substrate, a second electrode formed on the second substrate, and a second alignment layer formed on the second electrode, comprising steps of: an uncured reactive liquid crystal layer forming step of forming an uncured reactive liquid crystal layer containing a reactive liquid crystal on either one of the first alignment layer or the second alignment layer; a liquid crystal display substrate pair-forming step of bringing the spacer side substrate and the counter substrate into contact with each other to oppose the first alignment layer and the second alignment layer to each other with the uncured reactive liquid crystal layer, which is formed in the uncured reactive liquid crystal layer forming step, therebetween, and then fixing the reactive liquid crystal resin, thereby bonding the spacer side substrate and the counter substrate to each other to form a liquid crystal display substrate pair; and a liquid crystal layer forming step of forming a liquid crystal layer comprising a ferroelectric liquid crystal between the spacer side substrate and the counter substrate of the liquid crystal display substrate pair formed in the liquid crystal display substrate pair-forming step.

According to the invention, the spacer side substrate and the counter substrate can be strongly fixed with the reactive liquid crystal layer interposed therebetween; thus, a liquid crystal display in which the cell gap is not fluctuated so as to exhibit an excellent display quality can be produced.

Moreover, the liquid crystal display produced by the invention has the reactive liquid crystal layer on either one of the first alignment layer or the second alignment layer, thereby making it possible to restrain the generation of alignment defects of the ferroelectric liquid crystal, such as zigzag defects, hairpin defects or double domains. Thus, a liquid crystal display in which an operation mode of mono-stability can be realized using a ferroelectric liquid crystal can be yielded.

The invention also provides a process for producing a liquid crystal display, using a spacer side substrate having a first substrate, a first electrode formed on the first substrate, a spacer formed on the first electrode, and a first alignment layer formed on the first electrode and the spacer; and a counter substrate having a second substrate, a second electrode formed on the second substrate, and a second alignment layer formed on the second electrode, comprising steps of: an uncured reactive liquid crystal layer forming step of forming uncured reactive liquid crystal layers containing reactive liquid crystals different from each other in composition on the first alignment layer and the second alignment layer, respectively; a liquid crystal display substrate pair-forming step of bringing the uncured reactive liquid crystal layer formed on the first alignment layer formed in the uncured reactive liquid crystal layer forming step and the uncured reactive liquid crystal layer formed on the second alignment layer formed in the same step into contact with each other so as to be opposed to each other, and then fixing the reactive liquid crystals, thereby bonding the spacer side substrate and the counter substrate to each other to form a liquid crystal display substrate pair; and a liquid crystal layer forming step of forming a liquid crystal layer comprising a ferroelectric liquid crystal between the spacer side substrate and the counter substrate of the liquid crystal display substrate pair formed in the liquid crystal display substrate pair-forming step.

According to the liquid crystal display producing process of the invention, the uncured reactive liquid crystal layers are formed on the first alignment layer and the second alignment layer, respectively, thereby making it possible to yield a liquid crystal display in which the alignment of a ferroelectric liquid crystal is more controlled than in the case of using only the alignment layers. Moreover, the reactive liquid crystal contained in the uncured reactive liquid crystal layer formed on the first alignment layer is different in composition from the reactive liquid crystal contained in the uncured reactive liquid crystal layer formed on the second alignment layer, thereby making it possible to restrain the generation of alignment defects, such as zigzag defects, hairpin defects or double domains. Thus, a liquid crystal display in which an operation mode of mono-stability can be realized using a ferroelectric liquid crystal can be yielded.

The invention further provides a process for producing a liquid crystal display, using a spacer side substrate having a first substrate, a first electrode formed on the first substrate, a spacer formed on the first electrode, and a first alignment layer formed on the first electrode and the spacer; and a counter substrate having a second substrate, a second electrode formed on the second substrate, and a second alignment layer formed on the second electrode, comprising steps of: an uncured reactive liquid crystal layer forming step of forming an uncured reactive liquid crystal layer containing a reactive liquid crystal on either one of the first alignment layer or the second alignment layer; a liquid crystal dropping step of dropping a heated ferroelectric liquid crystal onto either one of the first alignment layer or the second alignment layer after the uncured reactive liquid crystal layer forming step; and a substrate bonding step of bringing the spacer substrate and the counter substrate to oppose the first alignment layer and the second alignment layer with the uncured reactive liquid crystal layer, which is formed in the uncured reactive liquid crystal layer forming step, interposed therebetween, and then fixing the reactive liquid crystal, thereby bonding the spacer side substrate and the counter substrate.

The invention also provides a process for producing a liquid crystal display, using a spacer side substrate having a first substrate, a first electrode formed on the first substrate, a spacer formed on the first electrode, and a first alignment layer formed on the first electrode and the spacer; and a counter substrate having a second substrate, a second electrode formed on the second substrate, and a second alignment layer formed on the second electrode, comprising steps of: an uncured reactive liquid crystal layer forming step of forming uncured reactive liquid crystal layers containing reactive liquid crystals different from each other in composition on the first alignment layer and the second alignment layer, respectively; a liquid crystal dropping step of dropping a heated ferroelectric liquid crystal onto either one of the first alignment layer or the second alignment layer after the uncured reactive liquid crystal layer forming step; and a substrate bonding step of bringing the uncured reactive liquid crystal layer formed on the first alignment layer formed in the uncured reactive liquid crystal layer forming step and the uncured reactive liquid crystal layer formed on the second alignment layer formed in the same step into contact with each other so as to be opposed to each other, and then fixing the reactive liquid crystals, thereby bonding the spacer side substrate and the counter substrate to each other.

EFFECT OF THE INVENTION

The invention produces an advantageous effect that a liquid crystal display can be yielded in which substrates are strongly fixed with an even cell gap to exhibit an excellent display quality.

EXPLANATION OF REFERENCE NUMERALS

Figure 1A:
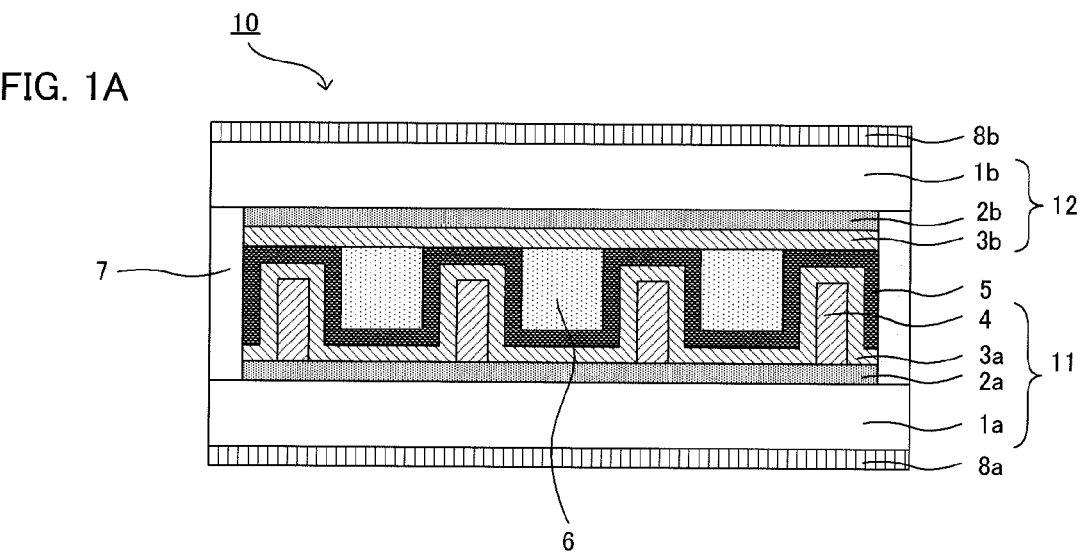
FIGS. 1A to 1C are each a schematic sectional view illustrating an example of the liquid crystal display of a first embodiment of the invention.

1$a$ and 31$a$: first substrates
1$b$ and 31$b$: second substrates
2$a$ and 32$a$: first electrodes
2$b$ and 32$b$: second electrodes
3$a$ and 33$a$: first alignment layers
3$b$ and 33$b$: second alignment layers
4 and 34: spacers
5: reactive alignment layer
5': uncured reactive alignment layer
35: reactive liquid crystal layer
35': uncured reactive liquid crystal layer
6 and 36: liquid crystal layers
7 and 37: sealing agents
8$a$, 8$b$, 38$a$ and 38$b$: polarizing plates
10, 30$a$ and 30$b$: liquid crystal displays
11 and 31: spacer side substrates
12 and 32: counter substrates
16: liquid crystal material
46: ferroelectric liquid crystal

BEST MODE FOR CARRYING OUT THE INVENTION

The invention relates to a liquid crystal display, and a process for producing a liquid crystal display.

The liquid crystal display of the invention and the liquid crystal display producing process thereof are each classified into two embodiments in accordance with the structure thereof.

The liquid crystal display of the invention and the liquid crystal display producing process thereof will be described in detail in accordance with each of the classified embodiments herein after.

A. First Embodiment

A-1. Liquid Crystal Display

First, a liquid crystal display of the first embodiment in the present invention will be explained. The liquid crystal display of the first embodiment, comprises: a spacer side substrate having a first substrate, a first electrode formed on the first substrate, a spacer formed on the first electrode, and a first alignment layer formed on the first electrode and the spacer, and a counter substrate having a second substrate, a second electrode formed on the second substrate, and a second alignment layer formed on the second electrode; in which the spacer side substrate and the counter substrate are provided to oppose the first alignment layer and the second alignment layer to each other; and in which a liquid crystal layer comprising a liquid crystal material are held between the spacer side substrate and the counter substrate; characterized in that a reactive alignment layer comprising a curable resin is formed on at least one of the first alignment layer and the second alignment layer, and further characterized in that the spacer side substrate and the counter substrate are bonded to each other with the reactive alignment layer interposed therebetween.

Figure 1B:
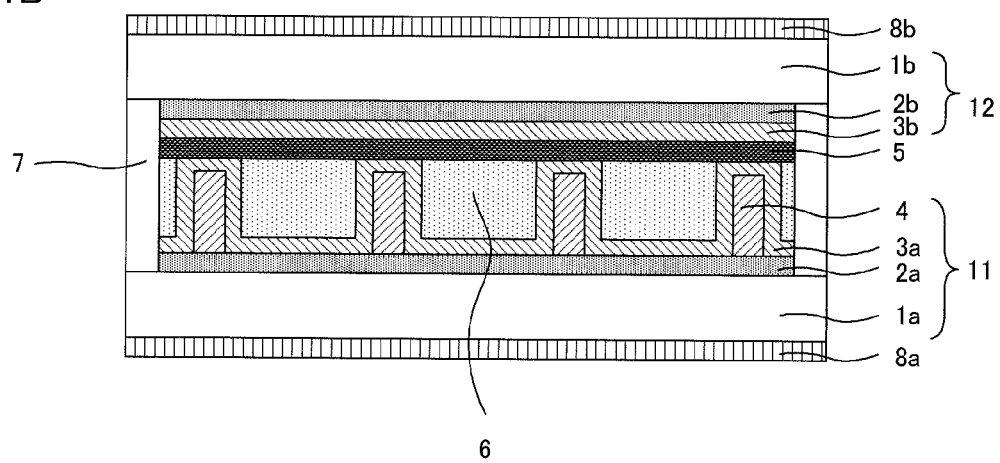
Figure 1C:
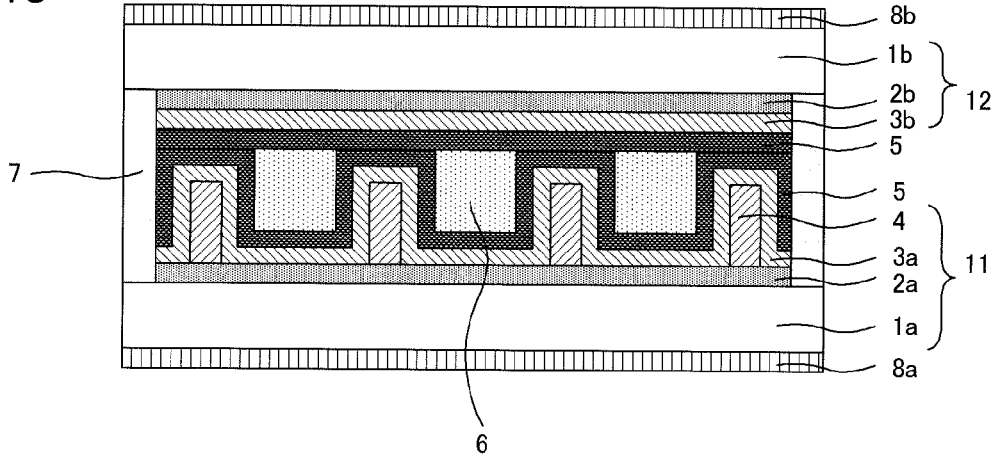

Next, the liquid crystal display of the present embodiment is described with reference to the drawings. FIG. 1A is a schematic sectional view illustrating an example of the liquid crystal display of the embodiment. As illustrated in FIG. 1A, in a liquid crystal display 10 of the embodiment, a spacer side substrate 11, which has a first substrate 1a, a first electrode 2a formed on the first substrate, spacers 4 formed on the first electrode, a first alignment layer 3a formed on the first electrode 2a and the spacers 4, and a reactive alignment layer 5 formed on the first alignment layer 3a and made of a curable resin; and a counter substrate 12, which has a second substrate 1b, a second electrode 2b formed on the second substrate 1b and a second alignment layer 3b formed on the second electrode 2b are provided to bond the reactive alignment layer 5 and the second alignment layer 3b to each other. A liquid crystal layer 6 made of a liquid crystal material is held between the spacer side substrate 11 and the counter substrate 12. As illustrated in FIGS. 1A to 1C, the liquid crystal display of the embodiment may have a sealing agent 7 for preventing the leakage of the liquid crystal material, and polarizing plates 8a and 8b.

In the liquid crystal display of the embodiment, the spacer side substrate and the counter substrate are bonded to each other with the reactive alignment layer interposed therebetween, whereby the two substrates can be strongly fixed to each other with an even cell gap. According to the embodiment, therefore, a liquid crystal display in which the cell gap is not fluctuated to exhibit an excellent display quality can be obtained. According to the embodiment, a material high in anisotropy, such as a reactive liquid crystal, is used as the constituent material of the reactive alignment layer, whereby the alignment power for the liquid crystal material of the reactive liquid crystal layer can be improved.

Each of the constituents of the liquid crystal display of the embodiment will be described in detail herein after.

1. Reactive Alignment Layer

First, the reactive alignment layer which the liquid crystal display of the embodiment has is described. The reactive alignment layer which the liquid crystal display of the embodiment has is a layer formed on at least one of the alignment layers of the spacer side substrate and the counter substrate and having a function of bonding the spacer side substrate and the counter substrate to each other. The reactive alignment layer in the embodiment comprises a curable resin. Hereinafter, the reactive alignment layer used in the embodiment will be described herein after.

(1) Curable Resin

The curable resin which constitutes the reactive alignment layer in the embodiment is not particularly limited as long as the resin is a curable resin exhibiting adhesive properties to the spacer side substrate and the counter substrate and further having a power of aligning the liquid crystal material which constitutes the above-mentioned liquid crystal layer. Examples of such a resin include a thermosetting resin, which is polymerized by heating treatment, and an active radiation curable resin, which is polymerized by irradiation with an active radiation (ray). In the embodiment, it is preferred to use an active radiation curable resin. In the case of using a thermosetting resin, it is necessary to subject the resin to heating treatment; therefore, other members that constitute the liquid crystal display of the embodiment may be damaged by such heating treatment. However, the active radiation curable resin has an advantage that such a risk is not generated.

The active radiation curable resin may be an electron beam curable resin, which is cured by electron beams, and a photo setting resin, which is set by irradiation with light. In the embodiment, the photo setting resin is preferred. The use of the photo setting resin makes it possible to make the producing process of the liquid crystal display of the embodiment simple.

In the embodiment, the photo setting resin is preferably a resin obtained by fixing a reactive liquid crystal. Since the reactive liquid crystal exhibits liquid crystal properties, the reactive liquid crystal can be regularly arranged by alignment regulating power of the above-mentioned alignment layer so that the aligning power for the liquid crystal material of the reactive alignment layer can be improved. The wording "fixing" means that, for example, when the reactive liquid crystal contains a polymerizable liquid crystal monomer, the polymerizable liquid crystal monomer is in a state that the monomer is polymerized and cured.

As such reactive liquid crystal, it is preferable that the reactive liquid crystal shows a nematic phase. The nematic phase can allow the alignment control relatively easily among the liquid crystal phases.

As the reactive liquid crystal, any of a polymerizable liquid crystal monomer, a polymerizable liquid crystal oligomer and a polymerizable liquid crystal polymer can be used. In the present embodiment, a polymerizable liquid crystal monomer is preferably used. Compared with the other polymerizable liquid crystal materials, that is, a polymerizable liquid crystal oligomer and a polymerizable liquid crystal polymer, the polymerizable liquid crystal monomer can be aligned at a lower temperature and it has a high alignment sensitivity so that it can be aligned easily.

The above-mentioned polymerizable liquid crystal monomer is not particularly limited as long as it is a liquid crystal monomer having a polymerizable functional group. For example, a monoacrylate monomer, a diacrylate monomer, or the like can be presented. Moreover, these polymerizable liquid crystal monomers may be used alone or as a mixture of two or more kinds.

As the monoacrylate monomer, for example, the compounds represented by the below-mentioned formula can be presented:

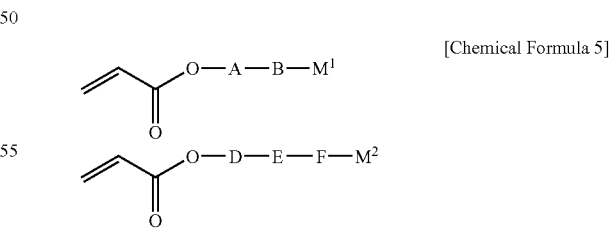

[Chemical Formula 5]

In the above-mentioned formula, A, B, D, E and F are benzene, cyclohexane or pyrimidine, which may have a substituent group such as halogen. Moreover, A and B, or D and E may be bonded via a bonding group such as an acetylene group, a methylene group and an ester group. $M^1$ and $M^2$ may be any of a hydrogen atom, an alkyl group having 3 to 9 carbon atoms, an alkoxy carbonyl group having 3 to 9 carbon atoms, or a cyano group. Furthermore, an acryloyloxy group on the molecular chain end and A or D may be bonded via a spacer such as an alkylene group having 3 to 6 carbon atoms.

Moreover, as the diacrylate monomer, for example, the compounds represented by the below-mentioned formula can be presented:

[Chemical Formula 6]

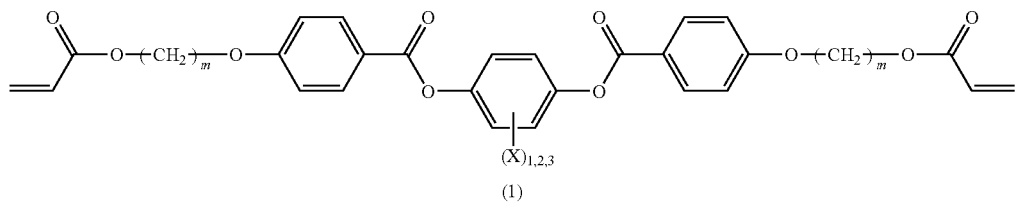

(1)

[Chemical Formula 7]

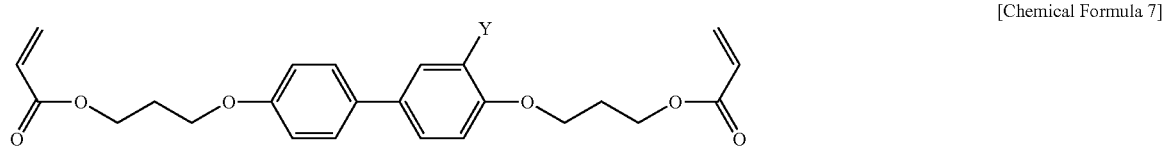

In the above-mentioned formula, X and Y each is hydrogen, alkyl having 1 to 20 carbon atoms, alkenyl having 1 to 20 carbon atoms, alkyloxy having 1 to 20 carbon atoms, alkyloxy carbonyl having 1 to 20 carbon atoms, formyl, alkyl carbonyl having 1 to 20 carbon atoms, alkyl carbonyloxy having 1 to 20 carbon atoms, halogen, cyano or nitro; and m is an integer in a range of 2 to 20.

Furthermore, as the diacrylate monomer, the compounds represented by the below-mentioned formula can also be presented:

[Chemical Formula 8]

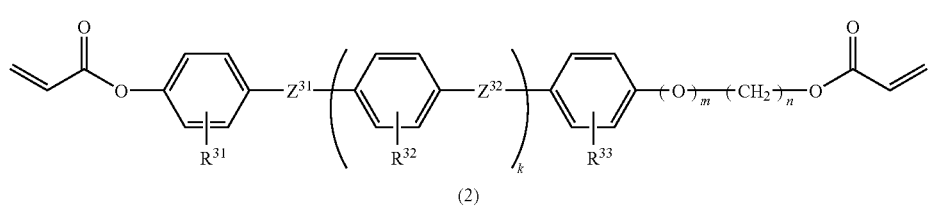

(2)

Here, $Z^{31}$ and $Z^{32}$ in the above formula are each independently and directly bonded —COO—, —OCO—, —O—, —CH$_2$CH$_2$—, —CH=CH—, —C≡C—, —OCH$_2$—, —CH$_2$O—, —CH$_2$CH$_2$COO— or —OCOCH$_2$CH$_2$—; $R^{31}$, $R^{32}$ and $R^{33}$ are each independently hydrogen or alkyl having 1 to 5 carbon atoms; k and m is each 0 or 1; and n is an integer in a range of 2 to 8.

As an example of the above-mentioned formula (2), a compound represented by the below-mentioned formula (3) can also be presented:

In the formula (3), $Z^{21}$ and $Z^{22}$ are each independently and directly bonded —COO—, —OCO—, —O—, —CH$_2$CH$_2$—, —CH=CH—, —C≡C—, —OCH$_2$—, —CH$_2$O—, —CH$_2$CH$_2$COO— or —OCOCH$_2$CH$_2$—; m is 0 or 1; and n is an integer in a range of 2 to 8.

In the present embodiment, in particular, the compounds represented by the above-mentioned formulae (1) and (2) can be used preferably. Moreover, in the case of the compounds represented by the formula (1), X is preferably alkyloxycarbonyl having 1 to 20 carbon atoms, methyl or chlorine. In particular, it is preferably alkyloxy carbonyl having 1 to 20 carbon atoms, and particularly preferably CH$_3$(CH$_2$)$_4$OCO. Moreover, as the specific examples of the compounds represented by the formula (2), ADEKA CHIRACOL PLC-7209 (manufactured by ASAHI DENKA CO., LTD.), ADEKA CHIRACOL PCL-7183 (manufactured by ASAHI DENKA Co., Ltd.), or the like can be presented.

The polymerizable liquid crystal monomer used in the present embodiment is preferably a diacrylate monomer among the above-mentioned examples. This is because the diacrylate monomer can maintain the aligned state preferably by polymerization.

The above-mentioned polymerizable liquid crystal monomer may not show the nematic phase by itself. In the present embodiment, these polymerizable liquid crystal monomers may be used as a mixture of two or more kinds as mentioned

[Chemical Formula 9]

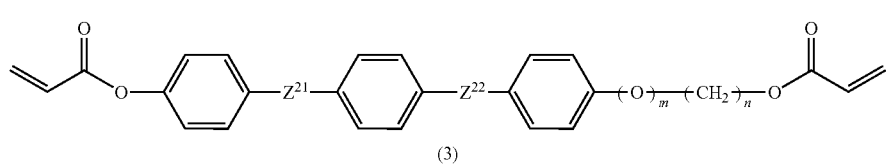

(3)

above so that a composition mixture thereof, that is, a reactive liquid crystal may show the nematic phase.

Furthermore, according to the present embodiment, as needed, a photo polymerization initiating agent or a polymerization inhibiting agent may be added to the above-mentioned reactive liquid crystal. As the photo polymerization initiating agent to be used in the present embodiment, benzyl (it is also referred to as bibenzoyl), benzoin isobutyl ether, benzoin isopropyl ether, benzophenone, benzoyl benzoic acid, methyl benzoyl benzoate, 4-benzoyl-4'-methyl diphenyl sulfide, benzyl methyl ketal, dimethyl amino methyl benzoate, 2-n-butoxy ethyl-4-dimethyl amino benzoate, p-dimethyl amino isoamyl benzoate, 3,3'-dimethyl-4-methoxy benzophenone, methylobenzoyl formate, 2-methyl-1-(4-(methyl thio)phenyl)-2-morpholino propane-1-on, 2-benzyl-2-dimethyl amino-1-(4-morpholino phenyl)-butane-1-on, 1-(4-dodecyl phenyl)-2-hydroxy-2-methylpropane-1-on, 1-hydroxycyclohexyl phenyl ketone, 2-hydroxy-2-methyl-1-phenyl propane-1-on, 1-(4-isopropyl phenyl)-2-hydroxy-2-methyl propane-1-on, 2-chloro thioxantone, 2,4-diethyl thioxantone, 2,4-diisopropyl thioxantone, 2,4-dimethyl thioxantone, isopropyl thioxantone, 1-chloro-4-propoxy thioxantone, or the like can be presented. In addition to the photo polymerization initiating agent, a sensitizing agent may be added within a range of not deteriorating the object of the present invention.

The addition amount of such a photo polymerization initiating agent is in general 0.01 to 20% by weight, it is preferably 0.1 to 10% by weight, and more preferably in a range of 0.5 to 5% by weight so as to be added to the above-mentioned reactive liquid crystal.

Furthermore, in the case of using the above-mentioned photo polymerization initiating agent, a photo polymerization initiating auxiliary agent may be used in combination. As such a photo polymerization initiating auxiliary agent, tertiary amines such as triethanol amine and methyl diethanol amine, and benzoic acid derivatives such as 2-dimethyl amino ethyl benzoic acid, 4-dimethyl amide ethyl benzoate can be presented, but it is not limited thereto.

(2) Reactive Alignment Layer

It is sufficient that the reactive alignment layer which the liquid crystal display of the embodiment has is formed on at least one of the first alignment layer of the spacer side substrate or the second alignment layer of the counter substrate. Referring to the drawings, specific description is given about each form of the case that the reactive alignment layer is formed on at least one of the first alignment layer of the spacer side substrate or the second alignment layer of the counter substrate, as described above. As described above, FIG. 1A illustrates a form in which the reactive alignment layer 5 is formed on the first alignment layer 3a of the spacer side substrate 11. Forms of the reactive alignment layer in the embodiment besides the above-mentioned form include: a form in which the reactive alignment layer 5 is formed on the second alignment layer 3b of the counter substrate 12, as illustrated in FIG. 1B; and a form in which the reactive alignment layer 5 is formed on each of the first alignment layer 3a of the spacer side substrate 11 and the second alignment layer 3b of the counter substrate 12.

The reactive alignment layer in the embodiment may be a form in which the layer is formed on the first alignment layer of the spacer side substrate, a form in which the layer is formed on the second alignment layer of the counter substrate, or a form in which the layer is formed on each of the first alignment layer of the spacer side substrate and the second alignment layer of the counter substrate. In particular preferred is the form in which the layer is formed on the second alignment layer of the counter substrate. This is because if the reactive alignment layer is formed on the spacer side substrate, the film thickness of the reactive alignment layer may become uneven or unevenness in the curing of the curable resin may be generated by the presence of the spacers; however, when the reactive alignment layer is present on the counter substrate, such a problem is not caused.

The thickness of the reactive liquid crystal layer is preferably in a range of 1 nm to 1,000 nm, and it is more preferably in a range of 3 nm to 100 nm. In the case the reactive liquid crystal layer is thicker than the above-mentioned range, the anisotropy is generated excessively, and in the case it is thinner than the above-mentioned range, the adhesiveness to the spacer side substrate and to the counter substrate may become insufficient.

Figure 2:
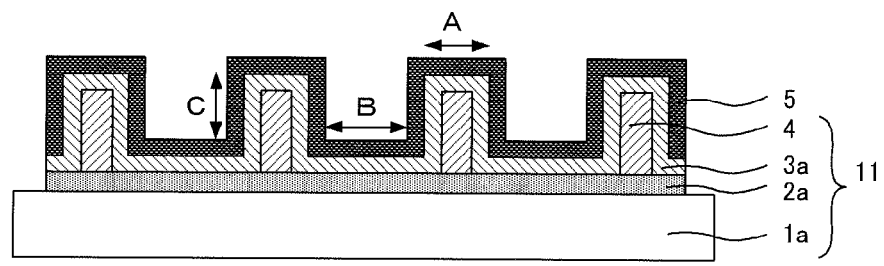
FIG. 2 is a schematic sectional view illustrating an example of a spacer side substrate used in the liquid crystal display of the first embodiment of the invention.

In the embodiment, the thickness of the reactive alignment layer may be even or uneven. As illustrated in, for example, FIG. 2, when the reactive alignment layer is formed on the first alignment layer of the spacer side substrate, the reactive alignment layer thicknesses in regions A where the reactive alignment layer is formed on the spacers 4, regions B where the layer is formed between any two of the spacers 4, and regions C where the layer is formed on walls of the spacers 4 may be equal to each other, or may be different from each other as long as the thicknesses are each within the above-mentioned range.

(3) Others

The reactive alignment layer in the embodiment has a function of bonding the spacer side substrate and the counter substrate to each other. The "bonding" referred to herein means that the spacer side substrate and the counter substrate contact each other so that they are not separated from each other, more specifically, they contact each other while they have such an adhesive force that they are not separated from each other by their self-weights.

2. Spacer Side Substrate

Next, the spacer side substrate used in the embodiment is described. The spacer side substrate used in the embodiment is a substrate having a first substrate, a first electrode formed on the first substrate, one or more spacers formed on the first electrode, and a first alignment layer formed on the first electrode and the spacer(s). Each of the constituents of the spacer side substrate will be described herein after.

(1) Spacer(s)

The spacer(s) used in the spacer side substrate is/are a member or members formed on the first substrate and having a function of keeping the cell gap between the spacer side substrate and the counter substrate even. In the liquid crystal display of the embodiment, the spacer side substrate and the counter substrate are bonded to each other in one or more regions where the spacer(s) is/are formed.

Figure 3A:
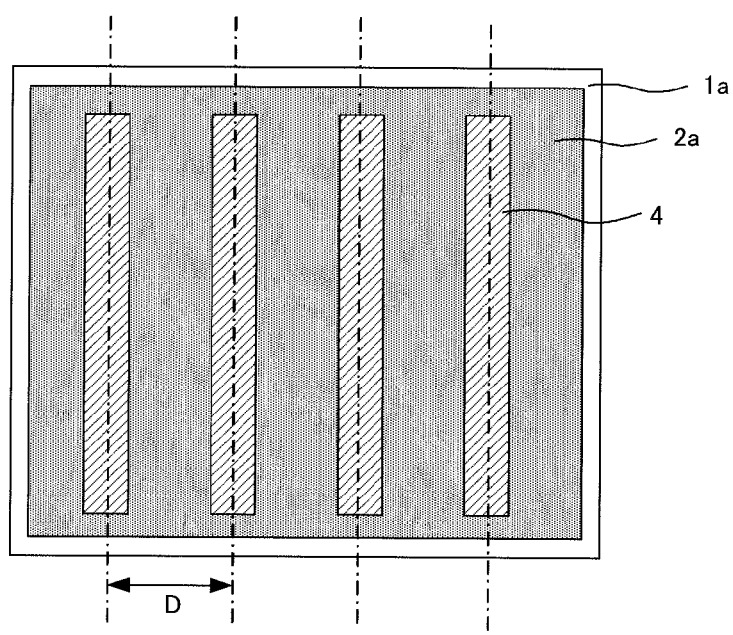
FIGS. 3A and 3B are each a schematic plan view illustrating a different example of the spacer side substrate used in the liquid crystal display of the first embodiment of the invention.
Figure 3B:
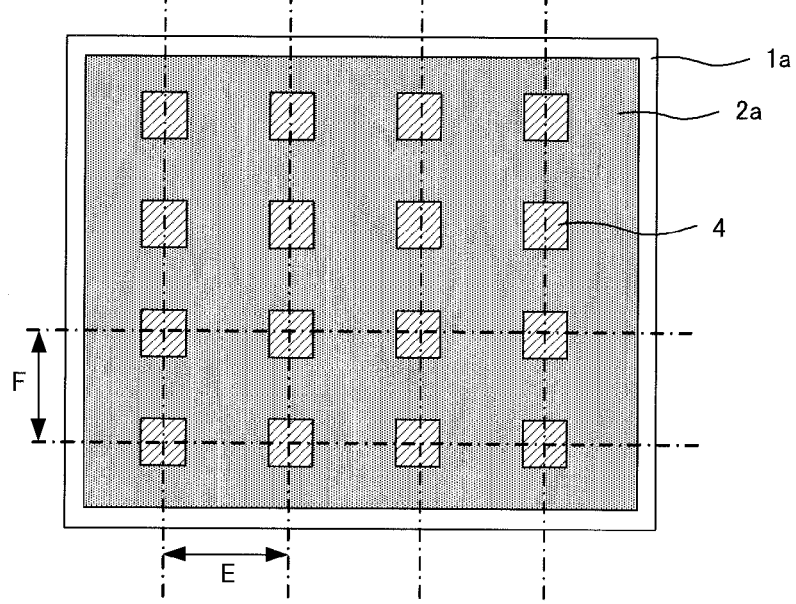

The shape of the spacer(s) used in the spacer side substrate is not particularly limited as long as the shape permits the spacer side substrate and the counter substrate to be bonded to each other in the spacer region(s). A shape permitting a necessary adhesive force to be expressed can be decided at will in accordance with the number of the spacer(s) formed on the first substrate, and others. About the shape of the spacer(s) used in the embodiment, for example, the sectional shape of its/their planes perpendicular to the first substrate is square, rectangular, or trapezoidal, and the sectional shape of its/their planes parallel to the first substrate is circular, polygonal, square, rectangular, or trapezoidal. About the shape, specifically, wall-shaped spacers illustrated in FIG. 3A and column-shaped spacers illustrated in FIG. 3B can be given as examples. In FIGS. 3A and 3B, illustration of the first alignment layer and the reactive alignment layer is omitted.

The spacer(s) is/are usually formed in plural positions on the first substrate. Preferably, the plural spacers are regularly formed at predetermined positions. If the positions where the spacers are formed are out of order, the force for keeping the cell gap against external force becomes uneven so that the quality of display may fall by a fluctuation in the cell gap in accordance with the position.

When the spacers are regularly formed, it is advisable to decide the pitch between the spacers appropriately in accordance with the method for driving the liquid crystal display of the embodiment, and others. For example, when the liquid crystal display of the embodiment is driven by an active matrix system using a thin film transistor (TFT), the pitch between the spacers is preferably integer times the pitch of the pixel electrodes. In particular, the pitch between the spacers is preferably 2-50 times, more preferably 5-20 times the pitch of the pixel electrodes, and is further in the range of 50 µm to 3 mm.

The pitch between the spacers means the distance between the centers of any adjacent ones of the spacers. When the spacers are, for example, in the form of walls as illustrated in FIG. 3A, it is sufficient that the distance between the centers of any adjacent ones of the spacers (the distance represented by D in FIG. 3A) is in the above-mentioned ranges. In the meantime, when the spacers are in the form of columns, it is sufficient that the distance between the center of any one of the spacers and the center of at least one of the plural spacers adjacent to the spacer is in the above-mentioned ranges. For example, when spacers in the form of columns are regularly provided as illustrated in FIG. 3B, it is sufficient that either one of distance represented by E or that represented by F is in the above-mentioned ranges.

The width of the spacers is not particularly limited as long as the width permits the spacer side substrate and the counter substrate to be bonded to each other and does not cause a fall in the display quality. In particular, in the embodiment, the width of the spacers is preferably from 1 µm to 20 µm, more preferably from 2 µm to 10 µm. If the spacer width is narrower than the range, it may be difficult that the spacers are formed with a high precision. If the spacer width is broader than the range, at the time of driving the liquid crystal display of the embodiment by an active matrix system using a thin film transistor TFT the effective pixel area thereof becomes small so that the numerical aperture of the whole of the liquid crystal display unfavorably becomes small. As a result, the display quality may fall.

Furthermore, the height of the spacers is not particularly limited as long as the height is smaller than the thickness of a liquid crystal layer, which will be described later, and does not permit damage to the alignment properties of the liquid crystal material which constitutes the liquid crystal layer. The height of the spacers is preferably substantially equal to the thickness of the liquid crystal layer. This manner makes it possible to improve the impact resistance effectively. Specifically, the height is preferably from 1 µm to 20 µm, more preferably from 1 µm to 10 µm, in particular preferably from 1.2 µm to 5 µm.

The pitch, the width, and the height of the spacers are values obtained by measurement based on observation by use of a scanning electron microscope (SEM).

About the positions where the spacers are formed, the spacers are preferably formed to stay away from the pixel regions. Poorness in the alignment of the liquid crystal material is easily generated near the spacers; it is therefore preferred that the spacers are formed in regions which do not produce any effect onto the image display.

The surface where the spacers are to be formed on/over the first substrate is not particularly limited as long as the spacers can be fixed and bonded to the surface. Accordingly, the spacers may be formed on the surface of the first substrate, or may be formed on the first electrode surface. In the embodiment, the spacers are preferably on the surface of the first electrode. When the spacers are formed on the first electrode surface, a short circuit is not generated between the first and second electrodes and further the producing process can be made simple.

The number of the spacers formed on the first substrate is not particularly limited as long as the number is two or more. The number may be decided at will in accordance with the size of the liquid crystal display, the shape of the spacers, the adhesive force required between the spacer side substrate and the counter substrate, and others.

The material for forming the spacers is not particularly limited as long as the material is a material used generally as spacers of a liquid crystal display. Specifically, the material may be a resin. A photosensitive resin is in particular preferably used since the photosensitive resin can easily be patterned. The photosensitive resin used in the embodiment is not particularly limited as long as the resin is a photosensitive resin used generally as spacers of a liquid crystal display. For example, materials described in the item of "A-2. Process for producing the liquid crystal display", which will be described later, may be used.

(2) First Substrate

Next, the first substrate used in the present embodiment will be explained. The first substrate used in the embodiment is not limited to any especial kind if the substrate can be generally used as the substrate of liquid crystal displays. Preferred examples thereof include glass plates and plastic plates. The surface roughness (RSM value) of the first substrate is preferably 10 nm or less, more preferably 3 nm or less, even more preferably 1 nm or less. The surface roughness in the invention can be measured with an atomic force microscope (AFM).

(3) First Electrode

Next, the first electrode used in the spacer side substrate will be explained. The first electrode used in the spacer side substrate is not limited to any especial kind if the first electrode is an electrode which is generally used as the electrode of liquid crystal displays. At least one of the electrodes of the first electrode and the second electrode, which will detailed later, is preferably made of a transparent conductor. Preferred examples of the material of the transparent conductor include such as indium oxide, tin oxide, and indium tin oxide (ITO). In particular, in the case of rendering the liquid crystal display of the embodiment a liquid crystal display of an active matrix system using TFT, one of the electrodes of the first electrode of the spacer side substrate and the second electrode of the counter substrate is rendered a full-face common electrode made of the transparent conductor and the other is rendered an electrode in which x electrodes and y electrodes are provided in a matrix form and a TFT element and a pixel electrode are provided in a region surrounded by each of the x electrodes and each of the y electrodes. In this case, the difference between concave and convex portions of an electrode layer made of the pixel electrodes, the TFT elements, the x electrodes and the y electrodes is preferably 0.2 µm or less. If the difference between the concave and convex portions of the electrode layer is over 0.2 µm, alignment disturbance is easily generated.

(4) First Alignment Layer

Next, the first alignment layer used in the spacer side substrate is described. The first alignment layer used in the spacer side substrate is not particularly limited. When a reactive liquid crystal is used as the above-mentioned curable resin, the layer is preferably a layer having an aligning power for the reactive liquid crystal. The use of the layer having the aligning power for the reactive liquid crystal makes it possible to improve the aligning power of the liquid crystal molecules of the reactive alignment layer to improve the alignment stability of the liquid crystal material which constitutes the liquid crystal layer. As such first alignment layer, for example, those having the rubbing process, the photo alignment treatment, or the like applied can be used. In the present embodiment, it is preferable to use a photo alignment layer with the photo alignment treatment applied. Since the photo alignment treatment is a non contact alignment treatment, it is effective in that the quantitative alignment process can be controlled without generation of the static electricity or the dusts. Hereinafter, such a photo alignment layer will be explained.

The photo alignment layer provides anisotropy obtained by directing a light beam with the polarization controlled to the first substrate coated with the constituent materials of the photo alignment layer to be described later so as to generate the photo-excitation reaction (decomposition, isomerization, dimerization).

The constituent material for the photo alignment layer used as the first alignment layer of the present embodiment is not particularly limited as long as it exhibits anisotropy to the first alignment layer by generating the photo-excitation reaction with light irradiation. Such materials can be roughly classified into the photoreactive type materials to exhibit the anisotropy to the photo alignment layer by generating the photoreaction and the photo-isomerizable type materials to exhibit the anisotropy to the photo alignment layer by generating the photo-isomerization reaction. The wavelength range of light which causes photo-excitation reaction in the constituent materials of the photo alignment layers is preferably within the wavelength range of ultraviolet rays, that is, the range of 10 nm to 400 nm, more preferably within the range of 250 nm to 380 nm. Hereinafter, each of the photoreactive type and the photo-isomerization type will be explained.

(Photoreaction Type)

First, the photoreaction type constituent materials will be explained. As mentioned above, the photoreaction type constituent material is a material to exhibit the anisotropy to the photo alignment layer by generating the photoreaction. The photoreactive type constituent materials used in the present embodiment are not particularly limited as long as they have such properties. Among them, a material to exhibit the anisotropy to the above-mentioned photo alignment layer by generating the photo-dimerization reaction or the photo-decomposition reaction is preferable.

The photo-dimerization reaction is a reaction that two molecules are polymerized by radical polymerization of their reactive sites aligned in the direction of polarization through the light irradiation. This reaction makes it possible to stabilize the alignment in the polarization direction to give anisotropy to the photo alignment layer. On the other hand, the photo-decomposition reaction is a reaction which decomposes a molecule chain of polyimide or the like which is aligned in the direction of polarization by the light irradiation. This reaction makes it possible to give anisotropy to the photo alignment layer in the state that the molecule chain aligned in the direction perpendicular to the polarization direction remains. It is more preferable in the embodiment to use, out of these photoreactive materials, a material which gives anisotropy to the first alignment layer by the photo-dimerization reaction since the material is high in exposure sensitivity and the scope of material-selection is wide.

The photoreactive material using the photo-dimerization reaction is not limited to any especial kind if the material can give anisotropy to the first photo alignment layer by photo-dimerization reaction. The material preferably comprises a photo-dimerization-reactive compound having a radically-polymerizable functional group and showing dichroism having different absorptions depending on the polarization direction thereof. This is because the alignment of the photo-dimerization-reactive compound is stabilized and anisotropy can easily be given to the first alignment layer by radically-polymerizing its reactive sites aligned in the polarization direction.

Examples of the photo-dimerization-reactive compound having such properties include dimerization-reactive polymers each having, as its side chain, at least one reactive site selected from cinnamic acid ester, coumalin, quinoline, a chalcone group and a cinnamoyl group.

Of these, the following is preferred as the photo-dimerization-reactive compound having such properties: a dimerization-reactive polymer having, as its side chain, any one of cinnamic acid ester, coumalin and quinoline. This is because the compound is radically-polymerized in the state that the double bonds in the α,β-unsaturated ketone aligned in the polarization direction function as reactive sites, whereby anisotropy can easily be given to the first alignment layer.

The main chain of the dimerization-reactive polymer is not limited to any especial kind if the main chain is a chain that is generally known as a polymer main chain, and is preferably a chain which does not have a substituent containing many π electrons, which hinder interactions between the reactive sites of the above-mentioned side chain, an example of the substituent being an aromatic hydrocarbon group.

The weight-average molecular weight of the dimerization-reactive polymer is not especially limited, and is preferably from 5,000 to 40,000, more preferably from 10,000 to 20,000. The weight-average molecular weight can be measured by gel permeation chromatography (GPC). If the weight-average molecular weight of the dimerization-reactive polymer is too small, appropriate anisotropy may not be given to the first alignment layer. Conversely, if it is too large, the viscosity of the coating solution at the time of the formation of the first alignment layer is so high that a homogeneous coat film may not easily be formed.

As the dimerization-reactive polymer, a compound represented by the following formula can be illustrated:

[Chemical Formula 10]

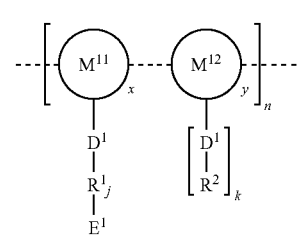

In the formula, $M^{11}$ and $M^{12}$ each independently represent a monomer unit of a homopolymer or a copolymer. Examples thereof include ethylene, acrylate, methacrylate, 2-chloroacrylate, acrylamide, methacrylamide, 2-chloroacrylamide, styrene derivatives, maleic acid derivatives, and siloxane. $M^{12}$ may be acrylonitrile, methacrylonitrile, methacrylate, methyl methacrylate, hydroxyalkyl acrylate or hydroxyalkyl methacrylate; x and y each represents the mole ratio of each of the monomer units when the units are polymerized into a copolymer, and are each a number satisfying: $0 < x \leq 1$, $0 \leq y < 1$, and $x+y=1$; and n represents an integer of 4 to 30,000. $D^1$ and $D^2$ each represent a spacer unit.

$R^1$ is a group represented by $-A^1-(Z^1-B^1)_z-Z^2-$, and $R^2$ is a group represented by $-A^1-(Z^1-B^1)_z-Z^3-$, in which $A^1$ and $B^1$ each independently represent a covalent single bond, pyridine-2,5-diyl, pyrimidine-2,5-diyl, 1,4-cyclohexylene, 1,3-dioxane-2,5-diyl, or 1,4-phenylene which may have a substituent; $Z^1$ and $Z^2$ each independently represent a covalent single bond, —CH$_2$—CH$_2$—, —CH$_2$O—, —OCH$_2$—, —CONR—, —RNCO—, —COO— or —OOC—, in which R is a hydrogen atom or a lower alkyl group; $Z^3$ is a hydrogen atom, alkyl or alkoxy which has 1 to 12 carbon atoms and may have a substituent, cyano, nitro or halogen; z is an integer of 0 to 4; $E^1$ represents a photo dimerization-reactive site, examples of which include cinnamic acid ester, coumalin, quinoline, chalcone group and cinnamoyl group; and j and k are each independently 0 or 1.

More preferable examples of this dimerization-reactive polymer include compounds represented by the following formulae:

[Chemical Formula 11]

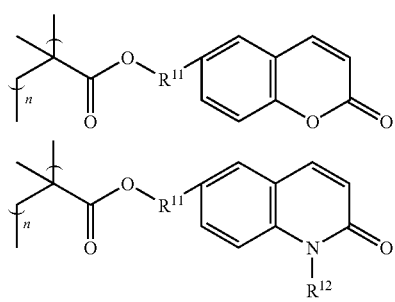

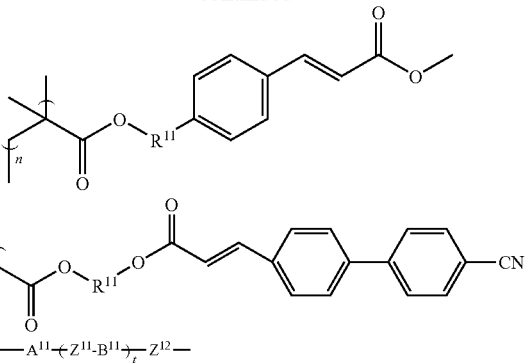

$R^{11}$: —A$^{11}$—(Z$^{11}$-B$^{11}$)$_t$—Z$^{12}$— in which A$^{11}$ and B$^{11}$: 1,4-phenylene, a covalent single bond, pyridine-2,5-diyl, pyrimidine-2,5-diyl, 1,4-cyclohexylene or 1,3-dioxane-2,5-diyl;

Z$^{11}$ and Z$^{12}$: —CH$_2$—CH$_2$—, —COO—, —OOC—, or a covalent single bond;

t: an integer of 0 to 4;

R$^{12}$: a lower alkyl; and n: an integer of 4 to 30,000.

Of the above-mentioned dimerization-reactive polymers, particularly preferable is at least one of compounds 1 to 4 represented by the following formulae:

[Chemical Formula 12]

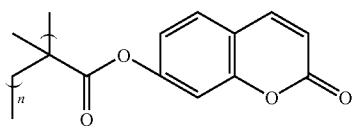

1

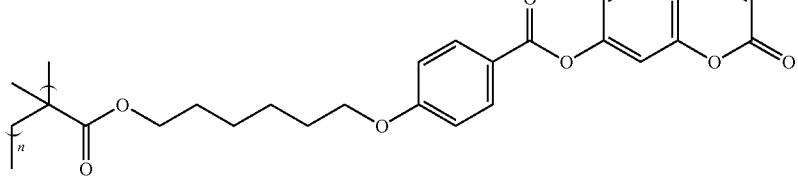

2

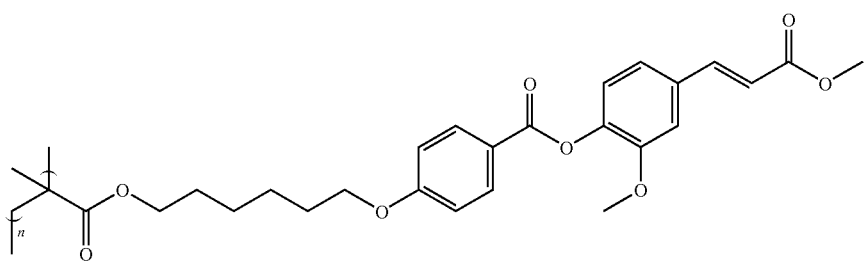

3

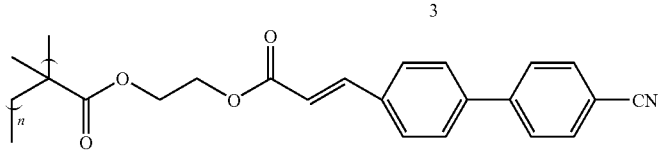

4

In the present embodiment, a photo dimerization-reactive site or substituent can be variously selected as the photo-dimerization-reactive compound from the above-mentioned compounds in accordance with required properties for the first alignment layer. One kind of the photo-dimerization-reactive compound may be used alone or a combination of two or more kinds thereof can be used.

The photoreactive material using photo-dimerization reaction may contain additives besides the above-mentioned photo-dimerization-reactive compound as long as the photo-aligning of the first alignment layer is not hindered. Examples of the additives include a polymerization initiator and a polymerization inhibitor.

It is advisable to select the polymerization initiator or the polymerization inhibitor appropriately from generally-known compounds in accordance with the kind of the photo-dimerization-reactive compound and then use the selected one. The added amount of the polymerization initiator or the polymerization inhibitor is preferably from 0.001 to 20% by weight, more preferably from 0.1 to 5% by weight of the photo-dimerization-reactive compound. If the added amount of the polymerization initiator or the polymerization inhibitor is too small, the polymerization may not be initiated (or inhibited). Conversely, if the amount is too large, the reaction may be hindered.

The photoreactive type material utilizing the photo-decomposing reaction is not particularly limited as long as it is a material generating the reaction for decomposing the molecular chain of a polyimide or the like aligned in the polarizing direction by the light irradiation. As such a photo-reactive type material, for example, polyimide "RN1199" manufactured by NISSAN CHEMICAL INDUSTRIES, LTD., or the like can be presented.

(Photo-Isomerization Type)

Next, the photo-isomerization type material will be explained. The photo-isomerization type material here is a material to exhibit the anisotropy to the first alignment layer by generating the photo-isomerization reaction as mentioned above. It is not particularly limited as long as it is a material having such properties. In the present embodiment, those including the photo-isomerization-reactive compound to exhibit the anisotropy to the first alignment layer by generating the photo-isomerization reaction are preferable. Since such a photo-isomerization-reactive compound is included, stable isomers are increased out of a plurality of isomers by the light irradiation, and thereby the anisotropy can be exhibited easily to the first photo alignment layer.

The photo-isomerization-reactive compound is not limited to any especial kind if the compound is a material having such properties mentioned above, and is preferably a compound which shows dichroism having different absorptions depending on the polarization direction thereof and generates photo-isomerization reaction by the light irradiation. By generating the isomerization of the reactive site aligned in the polarization direction of the photo-isomerization-reactive compound having such properties, anisotropy can easily be given to the first alignment layer.

For the photo-isomerization reaction generated by the photo-isomerization-reactive compound is preferably the cis-trans isomerization reaction. This is because any one of the cis-isomer and the trans-isomer increases by the light irradiation, whereby anisotropy can be given to the first alignment layer.

Examples of the photo-isomerization-reactive compound used in the invention may be monomolecular compounds or polymerizable monomers polymerizable with light or heat. These should be appropriately selected in accordance with the kind of the used liquid crystal. It is preferable to use any one of the polymerizable monomers since the monomer gives anisotropy to the first photo alignment layer by the light irradiation and subsequently the monomer is polymerized, whereby the anisotropy can be made stable. Of such polymerizable monomers, preferable is an acrylate monomer or a methacrylate monomer since the monomer gives anisotropy to the first alignment layer and subsequently the monomer can easily be polymerized in the state that the anisotropy is kept good.

The polymerizable monomer may be a monofunctional monomer or a polyfunctional monomer. A bifunctional monomer is preferable since the anisotropy of the first alignment layer, based on the polymerization, becomes more stable.

Specific examples of such a photo-isomerization-reactive compound include compounds having a cis-trans isomerization-reactive skeleton, such as an azobenzene skeleton or a stilbene skeleton.

In this case, the number of the cis-trans isomerization-reactive skeleton(s) may be one or more, and is preferably two since the alignment of the liquid crystal material is easily controlled.

The cis-trans isomerization-reactive skeleton(s) may have a substituent in order to make interaction thereof with the liquid crystal molecules higher. The substituent is not limited to any especial kind if the substituent can make the interaction with the liquid crystal molecules high and further does not hinder the alignment of the cis-trans isomerization-reactive skeleton(s). Examples thereof include a carboxyl group, a sodium sulfonate group, and a hydroxyl group. These skeleton structures can be appropriately selected in accordance with the kind of the used liquid crystal material.

The photo-isomerization-reactive compound may have a group containing many $\pi$ electrons in the molecule, such as an aromatic hydrocarbon group, besides the cis-trans isomerization-reactive skeleton in order to make the interaction with the liquid crystal molecules higher. The cis-trans isomerization-reactive skeleton and the aromatic hydrocarbon group may be bonded to each other through a bonding group. The bonding group is not limited to any especial kind if the group can make the interaction with the liquid crystal molecules high. Examples thereof include —COO—, —OCO—, —O—, —C≡C—, —CH$_2$—CH$_2$—, —CH$_2$O—, and —OCH$_2$—.

In the case of using a polymerizable monomer as the photo-isomerization-reactive compound, it is preferable that the monomer has, as its side chain, the above-mentioned cis-trans isomerization-reactive skeleton. When the monomer has, as its side chain, the cis-trans isomerization-reactive skeleton, the advantageous effect of the anisotropy given to the first alignment layer becomes larger and this compound becomes particularly suitable for the control of the alignment of the liquid crystal material constituting the liquid crystal layer. In this case, it is preferable that the above-mentioned aromatic hydrocarbon group and the bonding group contained in the molecule are contained, together with the cis-trans isomerization-reactive skeleton, in the side chain so as to make the interaction with the liquid crystal molecules high.

The side chain of the polymerizable monomer may have, as a spacer, an aliphatic hydrocarbon group such as an alkylene group so that the cis-trans isomerization-reactive skeleton can easily be aligned.

Of the above-mentioned photo-isomerization-reactive compounds of monomolecular compounds and polymerizable monomers as described above, any compound having in the molecule thereof an azobenzene skeleton is preferable as the photo-isomerization-reactive compound used in the present embodiment. This is because the azobenzene skeleton interacts highly with the liquid crystal molecules and is particularly suitable for the control of the alignment of the liquid crystal material constituting the liquid crystal layer since the skeleton contains many π electrons.

Hereinafter, the reason why the anisotropy can be exhibited to the first alignment layer by generating the photo-isomerization reaction with the azobenzene skeleton will be explained. First, when the azobenzene skeleton is irradiated with linearly polarized ultraviolet rays, the azobenzene skeleton of a trans isomer, as shown in the below formula, in which its molecule long axis is aligned in the polarization direction, is changed to the cis isomer thereof.

[Chemical Formula 13]

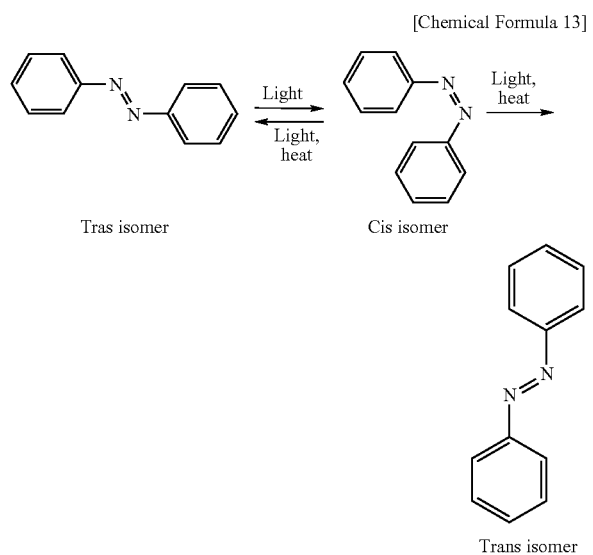

Tras isomer        Cis isomer

Since the cis isomer of the azobenzene skeleton is more chemically unstable than trans isomers thereof, the cis isomer returns thermally to any one of the trans isomers or absorbs visible rays to returns thereto. At this time, it happens with the same possibility whether the cis isomer turns to the trans isomer at the left side or the trans isomer at the right side in above formula. Accordingly, when the azobenzene skeleton continues to absorb ultraviolet rays, the ratio of the trans isomer at the right side increases so that the average alignment direction of the azobenzene skeleton becomes perpendicular to the polarized ultraviolet ray direction. In the present embodiment, this phenomenon is used to make polarization directions of azobenzene skeletons consistent with each other, thereby giving anisotropy to the first alignment layer to control the alignment of liquid crystal molecules on the layer.

An example of a monomolecular compound out of the compounds each having in the molecule thereof an azobenzene skeleton may be a compound represented by the following formula:

In the above formula, each $R^{41}$ independently represents a hydroxy group; $R^{42}$ represents a linking group represented by $-(A^{41}-B^{41}-A^{41})_m-(D^{41})_n-$ and $R^{43}$ represents a linking group represented by $(D^{41})_n-(A^{41}-B^{41}-A^{41})_m-$, in which $A^{41}$ represents a bivalent hydrocarbon group, $B^{41}$ represents —O—, —COO—, —OCO—, —CONH—, —NHCO—, —NHCOO— or —OCONH—, m represents an integer of 0 to 3, $D^{41}$ represents a bivalent hydrocarbon group when m is 0 and represents —O—, —COO—, —OCO—, —CONH—, —NHCO—, —NHCOO— or —OCONH— when m is an integer of 1 to 3, and n represents 0 or 1; each $R^{44}$ independently represents a halogen atom, a carboxy group, a halogenated methyl group, a halogenated methoxy group, a cyano group, a nitro group, a methoxy group, or a methoxycarbonyl group provided that the carboxy group may be combined with an alkali metal to form a salt; and each $R^{45}$ independently represents a carboxy group, a sulfo group, a nitro group, an amino group or a hydroxy group provided that the carboxy group or the sulfo group may be combined with an alkali metal to form a salt.

Specific examples of the compound represented by the above-mentioned formula include the following compounds:

[Chemical Formula 15]

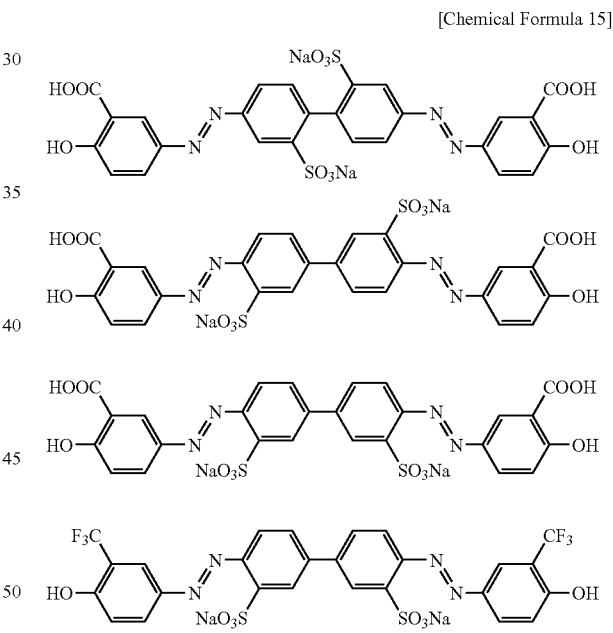

As the polymerizable monomer having the azobenzene skeleton as a side chain can be exemplified by a compound represented by the below formula:

[Chemical Formula 14]

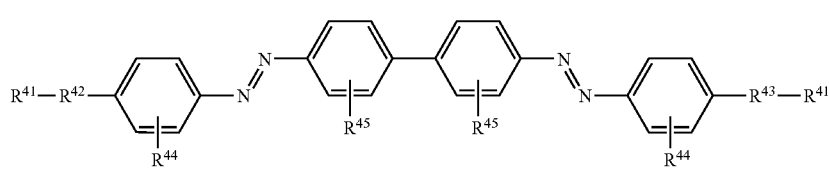

[Chemical Formula 16]

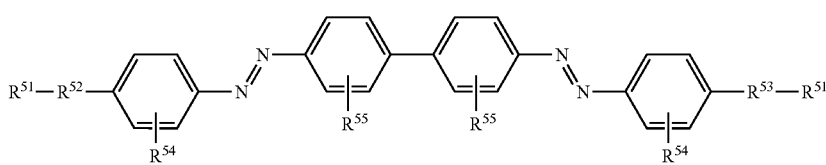

In the above formula, each $R^{51}$ independently represents a (meth)acryloyloxy group, a (meth)acrylamide group, a vinyloxy group, a vinyloxycarbonyl group, a vinyliminocarbonyl group, a vinyliminocarbonyloxy group, a vinyl group, an isopropenyloxy group, an isopropenyloxycarbonyl group, an isopropenyliminocarbonyl group, an isopropenyliminocarbonyloxy group, an isopropenyl group or an epoxy group; $R^{52}$ represents a linking group represented by -$(A^{51}$-$B^{51}$-$A^{51})_m$-$(D^{51})_n$- and $R^{53}$ represents a linking group represented by $(D^{51})_n$-$(A^{51}$-$B^{51}$-$A^{51})_m$- in which $A^{51}$ represents a bivalent hydrocarbon group, $B^{51}$ represents —O—, —COO—, —OCO—, —CONH—, —NHCO—, —NHCOO— or —OCONH—, m represents an integer of 0 to 3, $D^{51}$ represents a bivalent hydrocarbon group when m is 0 and represents —O—, —COO—, —OCO—, —CONH—, —NHCO—, —NHCOO— or —OCONH— when m is an integer of 1 to 3, and n represents 0 or 1; each $R^{54}$ independently represents a halogen atom, a carboxy group, a halogenated methyl group, a halogenated methoxy group, a cyano group, a nitro group, a methoxy group, or a methoxycarbonyl group provided that the carboxy group may be combined with an alkali metal to form a salt; and each $R^{55}$ independently represents a carboxy group, a sulfo group, a nitro group, an amino group or a hydroxy group provided that the carboxy group or the sulfo group may be combined with an alkali metal to form a salt.

A specific example of the compound represented by the above-mentioned formula is the following compound:

[Chemical Formula 17]

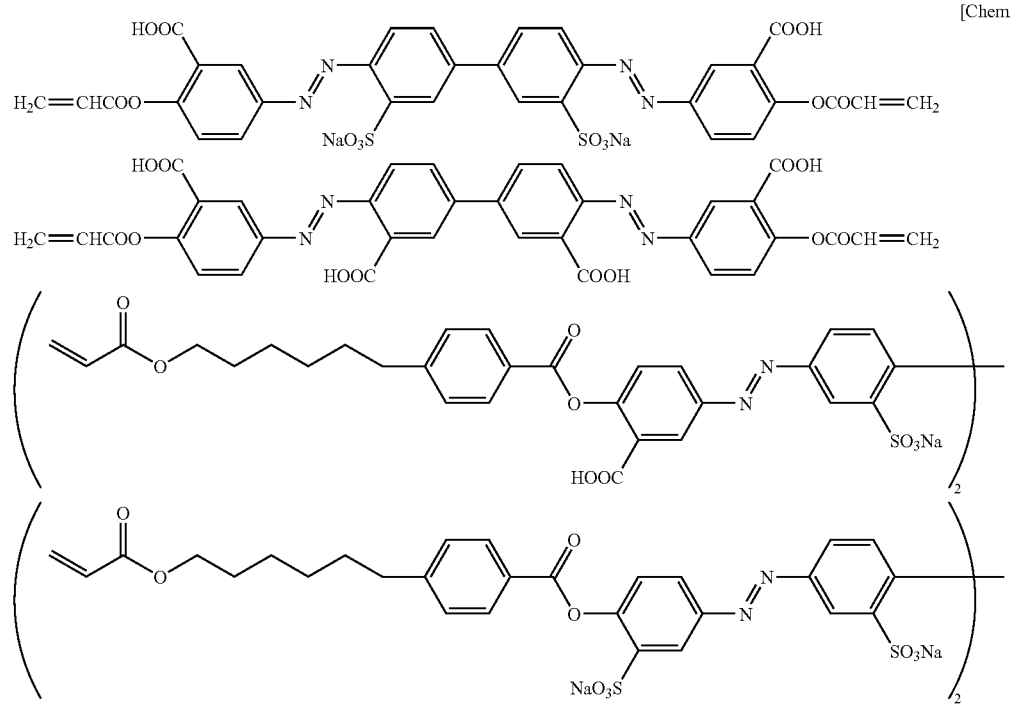

In the present embodiment, the cis-trans isomerization-reactive skeleton or substituent can be variously selected from the above-mentioned photo-isomerization-reactive compounds in accordance with required properties. One kind of the photo-isomerization-reactive compound may be used alone or a combination of two or more kinds thereof can be used.

Additives, besides the above-mentioned photo-isomerization-reactive compound, may be contained as constituent materials of the photo alignment layer used in the present embodiment as long as the photoaligning of the photo alignment layer is not hindered. In the case of using a polymerizable monomer as the photo-isomerization-reactive compound, examples of the additives include a polymerization initiator and a polymerization inhibitor.

It is advisable to select the polymerization initiator or the polymerization inhibitor appropriately from generally-known compounds in accordance with the kind of the photo-isomerization-reactive compound and then use the selected one. The added amount of the polymerization initiator or the polymerization inhibitor is preferably from 0.001 to 20%, more preferably from 0.1 to 5% by weight of the photo-isomerization-reactive compound. If the added amount of the polymerization initiator or the polymerization inhibitor is too small, the polymerization may not be initiated (or inhibited). Conversely, if the amount is too large, the reaction may be hindered.

(5) Reactive Alignment Layer

A reactive alignment layer may be formed on the first alignment layer of the spacer side substrate. The reactive alignment layer used in the spacer side substrate is the same as described in the above-mentioned item of "1. Reactive alignment layer". Thus, the description thereof is omitted.

3. Counter Substrate

Next, the counter substrate used in the embodiment is described. The counter substrate in the embodiment is a substrate having a second substrate, a second electrode formed on the second substrate, and a second alignment layer formed on the second electrode. A reactive alignment layer may be formed on the second alignment layer.

The second substrate, the second electrode, and the second alignment layer used in the counter substrate are identical with the first substrate, the first electrode and the first alignment layer, respectively, described in the above-mentioned item of "2. Spacer side substrate". Thus, the description thereof is omitted. The reactive alignment layer used in the counter substrate is identical with that described in the above-mentioned item of "1. Reactive alignment layer". Thus, the description thereof is omitted.

4. Liquid Crystal Layer

The liquid crystal layer which the liquid crystal display of the embodiment has is a layer comprising a liquid crystal material. The liquid crystal material which constitutes the liquid crystal layer is not particularly limited, and may be a liquid crystal material used generally in a liquid crystal display.

The thickness of the liquid crystal layer is preferably from 1 μm to 20 μm, more preferably from 1 μm to 10 μm, even more preferably from 1.2 μm to 5 μm. If the thickness of the liquid crystal layer is too small, the contrast may fall. If the thickness of the liquid crystal layer is too large, the liquid crystal material may not be aligned with ease.

5. Others

The liquid crystal display in the embodiment may have a constituent different from the spacer side substrate, the counter substrate, and the liquid crystal layer. Examples of the different constituent include a polarizing plate and a sealing agent.

In the embodiment, the spacer side substrate and the counter substrate preferably have, therebetween, a sealing agent. When they have the sealing agent, leakage of the liquid crystal material from the liquid crystal layer can be prevented. The constituent material of the sealing agent used in the embodiment may be a material used generally for a sealing agent of a liquid crystal display. An example of such a material is resin. Any one of thermosetting resin and ultraviolet curable resin may be used. In the embodiment, it is particularly preferred that the sealing agent is made of an ultraviolet curing resin. When the sealing agent is made of an ultraviolet curing resin, for example, an ultraviolet curable resin may be used as the curable resin which constitutes the reactive alignment layer; in this case, the sealing agent and the reactive alignment layer can be simultaneously cured, thereby making it possible to simplify the producing process of the liquid crystal display of the embodiment. The sealing agent used in the embodiment is, for example, a UV curable sealing agent (trade name: LCB 610, manufactured by EHC).

The polarizing plate used in the embodiment is not particularly limited as long as the plate transmits only a wave motion along a specified direction out of wave motions of light, and the polarizing plate may be a polarizing plate used generally as a polarizing plate of a liquid crystal display.

The method for driving the liquid crystal display device of the embodiment is preferably based on an active matrix system using a thin film transistor (TFT). The adoption of the active matrix system using TFT makes it possible to turn on and off target pixels certainly, so that high-quality display can be attained.

Figure 4:
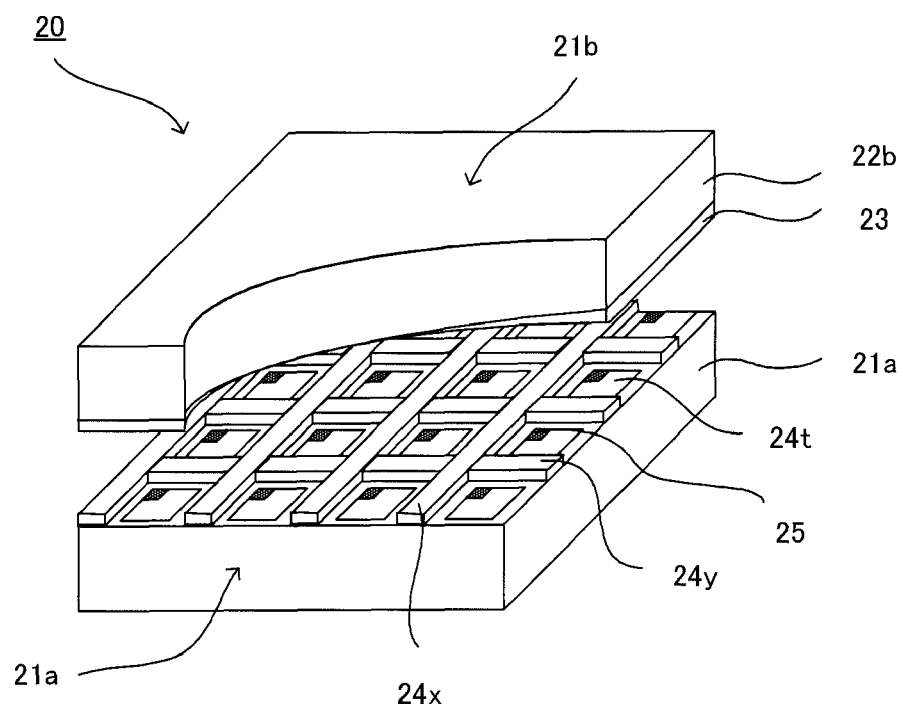
FIG. 4 is a schematic perspective view illustrating another example of the liquid crystal display of the first embodiment of the invention.

An example of the liquid crystal display of the embodiment based on an active matrix system using TFT is illustrated, as a schematic perspective view, in FIG. 4. A liquid crystal display 20 illustrated in FIG. 4 has: a TFT substrate 21a in which TFTs 25 are provided into a matrix form on one substrate 22a, and a common electrode substrate 21b in which a common electrode 23 is formed on another substrate 22b. In the TFT substrate 21a, x electrodes 24x, y electrodes 24y and pixel electrodes 24t are formed. In the liquid crystal display 20, the x electrodes 24x and y electrodes 24y are arranged vertically and laterally for operating the TFT elements 25 by applying a signal to the electrodes 24x and 24y for driving the ferroelectric liquid crystal. Although it is not shown in the figure, the portions with the x electrodes 24x and the y electrodes 24y crossing with each other are insulated with an insulating layer so that the signal of the x electrodes 24x and the signal of the y electrodes 24y can be operated independently. The portions surrounded by the x electrodes 24x and the y electrodes 24y are each a pixel as the minimum unit for driving the liquid crystal display of this embodiment, with at least one TFT element 25 and at least one pixel electrode 24t are formed in each pixel. In the liquid crystal display 20 of this embodiment, by successively applying a signal voltage to the x electrodes 24x and the y electrodes 24y, the TFT element 25 of each pixel can be operated.

In FIG. 4, a liquid crystal layer and alignment layer are omitted.

When the liquid crystal display of the embodiment is driven by the above-mentioned TFT-used active matrix system, the spacer side substrate and the counter substrate may be rendered the TFT substrate and the common electrode substrate, respectively. The counter substrate and the spacer side substrate may be rendered the TFT substrate and the common electrode substrate, respectively.

Next, the usage of the liquid crystal display of the embodiment is described. The liquid crystal display of the embodiment may be used as a liquid crystal color display by driving this display by means of the above-mentioned thin film transistor (TFT) used active matrix system and adopting a color filter system or a field sequential color system.

The process for producing the liquid crystal display of the embodiment is not particularly limited as long as the process is a process making it possible to produce its individual constituents, the contents of which have been described above. The display can be produced by, for example, a producing process that will be described in the item of "A-2. Process for producing the liquid crystal display".

A-2. Process for Producing the Liquid Crystal Display

Next, a process for producing the liquid crystal display of the first embodiment in the present invention will be explained. The process for producing a liquid crystal display of the present embodiment has: a spacer side substrate having a first substrate, a first electrode formed on the first substrate, a spacer formed on the first electrode, and a first alignment layer formed on the first electrode and the spacer; and a counter substrate having a second substrate, a second electrode formed on the second substrate, and a second alignment layer formed on the second electrode.

The process for producing the liquid crystal display of the embodiment can be roughly classified to two sub-embodiments in accordance with the method for forming the liquid crystal layer. Hereinafter, each of the classified sub-embodiments of the process for producing the liquid crystal display of the embodiment will be described.

A-2-1. First Sub-Embodiment

First, the liquid crystal display producing process of the first sub-embodiment in the present embodiment will be explained. The process for producing a liquid crystal display of this sub-embodiment uses a spacer side substrate having a first substrate, a first electrode formed on the first substrate, a spacer formed on the first electrode, and a first alignment layer formed on the first electrode and the spacer; and a counter substrate having a second substrate, a second electrode formed on the second substrate, and a second alignment layer formed on the second electrode, comprising steps of: an uncured reactive alignment layer forming step of forming an uncured reactive alignment layer containing a curable resin that is not yet cured on at least one of the first alignment layer or the second alignment layer; a liquid crystal display substrate pair-forming step of bringing the spacer side substrate and the counter substrate into contact with each other to oppose the first alignment layer and the second alignment layer to each other with the uncured reactive alignment layer interposed therebetween, and then curing the curable resin, thereby bonding the spacer side substrate and the counter substrate to each other to form a liquid crystal display substrate pair; and a liquid crystal layer forming step of forming a liquid crystal layer between the spacer side substrate and the counter substrate of the liquid crystal display substrate pair formed in the liquid crystal display substrate pair-forming step.

Figure 5A:
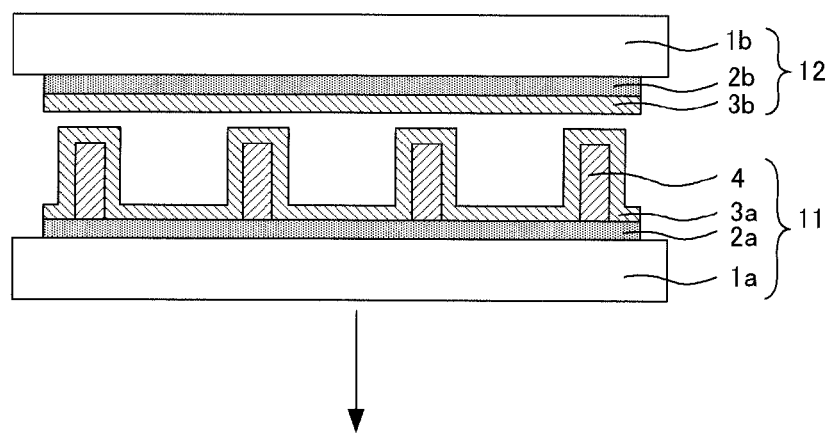
FIGS. 5A to 5D are process charts illustrating an example of a process for producing the liquid crystal display of the first embodiment of the invention.

The liquid crystal display producing process of the sub-embodiment is described with reference to the drawings. FIGS. 5A to 5D are process charts of an example of the liquid crystal display producing process according to the sub-embodiment. As illustrated in FIGS. 5A to 5D, in the producing process of the sub-embodiment, prepared are first a spacer side substrate 11 having a first substrate 1a, a first electrode 2a formed on the first substrate 1a, spacers 4 formed on the first electrode 2a and a first alignment layer 3a formed on the first electrode 2a and the spacers 4; and a counter substrate 12 having a second substrate 2a, a second electrode 2b formed on the second substrate 2a and a second alignment layer 3b formed on the second electrode 2b (FIG. 5A).

Figure 5B:
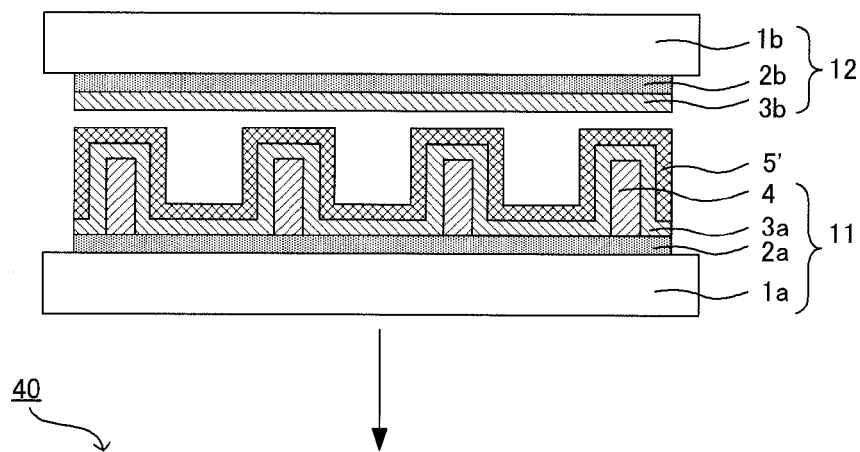

Next, an uncured reactive alignment layer 5' made of a curable resin that is not yet cured is formed on the first alignment layer 3a of the spacer side substrate 11 (an uncured reactive alignment layer forming step: FIG. 5B).

Figure 5C:
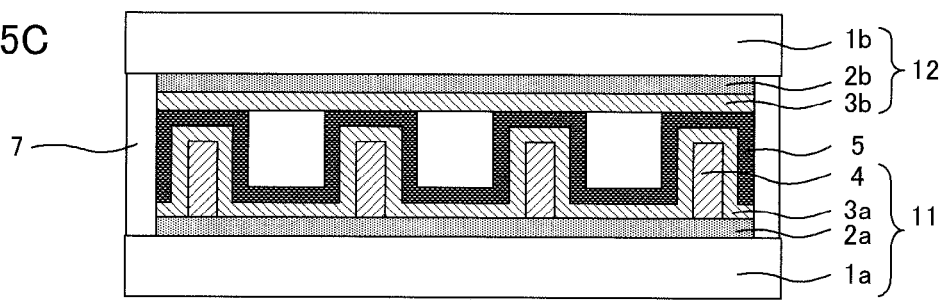

Next, the uncured reactive alignment layer 5' formed on the first alignment layer 3a of the spacer side substrate 11 and the second alignment layer 3b of the counter substrate 12 are brought into contact with each other so as to be opposed to each other. Thereafter, uncured curable resin contained in the uncured reactive alignment layer 5' is cured to form a reactive alignment layer 5, thereby bonding the spacer side substrate 11 and the counter substrate 12 to each other to form a liquid crystal display substrate pair 40 (a liquid crystal display substrate pair-forming step: FIG. 5C). When the uncured curable resin is cured to form the reactive alignment layer 5, a sealing agent made of an uncured curable resin may be simultaneously cured to form a sealing agent 7 between the spacer side substrate 11 and the counter substrate 12.

Figure 5D:
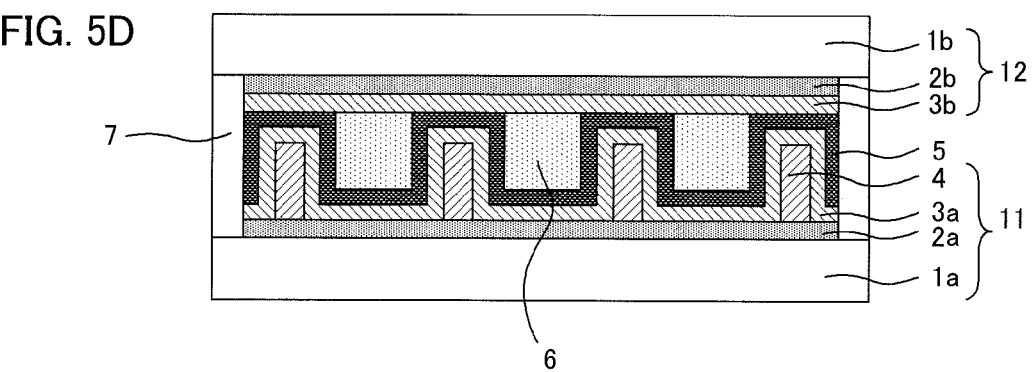

Next, a liquid crystal material is injected to between the spacer side substrate 11 and the counter substrate 12 of the liquid crystal display substrate pair 40, thereby forming a liquid crystal layer 6 (a liquid crystal layer forming step: FIG. 5D). In the sub-embodiment, a liquid crystal display is produced through the above-mentioned steps.

According to the sub-embodiment, the spacer side substrate and the counter substrate can be strongly fixed to each other with the reactive alignment layer interposed therebetween; thus, a liquid crystal display in which the cell gap is not fluctuated to exhibit an excellent display quality can be produced.

The liquid crystal display producing process of the sub-embodiment will be described in detail herein after.
1. Uncured Reactive Alignment Layer Forming Step First, the uncured reactive alignment layer forming step in the sub-embodiment is described. The uncured reactive alignment layer forming step in the sub-embodiment is a step of forming an uncured reactive alignment layer comprising a curable resin that is not yet cured on at least one of the first alignment layer of the spacer side substrate or the second alignment layer of the counter substrate.

The uncured reactive alignment layer formed in the present step will be a reactive alignment layer by curing the uncured curable resin in the liquid crystal display substrate pair-forming step, which will be described later.

The uncured reactive alignment layer forming step in the sub-embodiment will be described herein after.
(1) Spacer Side Substrate Forming Step The spacer side substrate forming step of forming a spacer side substrate used in the sub-embodiment is described. The spacer side substrate forming step is a step of forming a spacer side substrate having a first substrate, a first electrode formed on the first substrate, one or more spacers formed on the first electrode, and a first alignment layer formed on the first electrode and the spacer(s). Usually, the spacer side substrate forming step is composed of a first electrode forming step of forming a first electrode on a first substrate, a spacer forming step of forming one or more spacers on the first electrode formed in the first electrode forming step, and a first alignment layer forming step of subsequently forming a first alignment layer on the first electrode and the spacer(s) after the spacer forming step.
i) First Electrode Forming Step First, the first electrode forming step is described. The first electrode forming step is a step of forming a first electrode layer on a first substrate.

The method for forming the first electrode on the first substrate in the step is not particularly limited as long as the method is a method making it possible to form the first electrode having an even thickness. Examples of the first electrode forming method include a chemical vapor deposition (CVD) method, and physical vapor deposition (PVD) methods such as a sputtering method, an ion plating method, and vacuum evaporation. The method for patterning the electrode layer may be a general electrode patterning method.

Other matters of the first substrate and the first electrode used in the step are the same as described in the above-mentioned item of "A-1. Liquid crystal display 2. Spacer side substrate". Thus, the description thereof is omitted.
ii) Spacer Forming Step Next, the spacer forming step is described. The spacer forming step is a step of forming one or more spacers on the first electrode formed in the first electrode forming step.

The method for forming the spacer(s) on the first electrode is not particularly limited as long as the method is a method making it possible to form the spacer(s) which has/have a desired shape on a predetermined position or predetermined positions with a high precision. A general patterning method can be applied thereto. The patterning method may be a known method such as a 2P (photo polymerization) method, a photolithographic method, an ink-jetting method, or a screen printing method. In the 2P method, a resin composition of a photo crosslinking polymer and the like is coated onto a substrate, a spacer-forming original master is compressed onto the coated film, in this state the coated film is irradiated with ultraviolet rays to cure the film, and subsequently the original master is peeled off, thereby forming the spacer(s); examples of the photocrosslinking polymer include ethylene glycol (meth)acrylate, diethylene glycol di(meth)acrylate, propylene glycol di(meth)acrylate, dipropylene glycol di(meth)acrylate, polyethylene glycol di(meth) acrylate, polypropylene glycol di(meth)acrylate, hexane glycol di(meth)acrylate, neopentyl glycol di(meth)acrylate, glycerin di(meth)acrylate, glycerin tridi(meth)acrylate, trimethylolpropane di(meth)acrylate, 1,4-butanediol diacrylate, pentaerythritol (meth)acrylate, dipentaerythritol tri(meth) acrylate, pentaerythritol tetra(meth)acrylate, dipentaerythritol hexa(meth)acrylate, dipentaerythritol penta(meth)acrylate, and other ultraviolet curable monomers; urethane acrylate, epoxy acrylate, polyester acrylate, epoxy, vinyl ether and polyene/thiol oligomers, and other oligomers; and polyvinyl cinnamate resin, which can undergo photo-dimerization reaction, and other photo crosslinking polymers. In the photolithographic method, such a material as exemplified above about the 2P method is coated onto a substrate, the coated film is exposed to light through a desired spacer-forming photomask, and subsequently the resultant is developed to form the spacer(s). The above-mentioned "(meth) acrylate" means acrylate or methacrylate.

Other matters of the spacer(s) are the same as described in the item of "A-1. Liquid crystal display 2. Spacer side substrate". Thus, the description thereof is omitted.

iii) First Alignment Layer Forming Step

Next, the first alignment layer forming step is described. The first alignment layer forming step is a step of forming a first alignment layer on the first electrode and the spacer(s) formed in the first electrode forming step and the spacer forming step. In the first alignment layer forming step, a rubbing alignment film may be formed or a photo alignment layer may be formed.

a. Method for Forming the Photo Alignment Layer

In order to form the photo alignment layer in the first alignment layer forming step, a photo alignment layer forming solution in which constituent materials of the photo alignment layer are diluted with an organic solvent is first coated onto the electrode layer, and then dried. In this case, the content by percentage of a photo-dimerization-reactive compound or a photo-isomerization-reactive compound in the photo alignment layer forming solution is preferably from 0.05 to 10% by mass, more preferably from 0.2 to 2% by mass. If the content is smaller than the range, appropriate anisotropy is not easily given to the first alignment layer. Conversely, if the content is larger than the range, the viscosity of the photo alignment layer forming solution becomes high so that an evenly coated film is not easily formed.

The method for coating the photo alignment layer forming solution may be, for example, a spin coating, roll coating, rod bar coating, spray coating, air knife coating, slot die coating, or wire bar coating method.

The thickness of the film obtained by coating the photo alignment layer forming solution is preferably from 1 nm to 2000 nm, more preferably from 3 nm to 100 nm. If the thickness of the film is smaller than the range, sufficient photo arrangement properties may not be obtained. Conversely, if the thickness is larger than the range, disadvantages may be produced in terms of costs.

The resultant film is subjected to photo alignment treatment, thereby giving anisotropy thereto. Specifically, the resultant film is irradiated with light having controlled polarization, thereby generating photo-excitation reaction so that anisotropy can be given thereto. The wavelength range of the radiated light should be selected in accordance with the constituent material of the first photo alignment layer. The wavelength is preferably in the range of ultraviolet wavelengths, that is, in the range of 100 nm to 400 nm, more preferably in the range of 250 nm to 380 nm.

Furthermore, in the case of using, as the constituent material of the photo alignment layer, a polymerizable monomer out of photo-isomerization-reactive compounds, it is possible to subject the monomer to photo alignment treatment, and then heating the monomer, thereby polymerizing the monomer so that the anisotropy given to the first alignment layer can be stabilized.

b. Method for Forming the Rubbing Film

The method for forming the above-mentioned rubbing film in the first alignment layer forming step is not particularly limited, and may generally be a method for forming a rubbing film for a liquid crystal display.

c. Others

The constituent material and other matters of the first alignment layer are the same as described in the above-mentioned item of "A-1. Liquid crystal display 2. Spacer side substrate". Thus, the description thereof is omitted.

(2) Counter Substrate Forming Step

Next, the counter substrate forming step of forming a counter substrate used in the liquid crystal display producing process of the sub-embodiment is described. The counter substrate forming step is a step of forming a counter substrate having a second substrate, a second electrode formed on the second substrate, and a second alignment layer formed on the second electrode. Usually, the counter substrate forming step is composed of a second electrode forming step of forming a second electrode on a second substrate, and a second alignment layer forming step of forming a second alignment layer on the second electrode formed in the second electrode forming step.

i) Second Electrode Forming Step

The second electrode forming step is a step of forming a second electrode on a second substrate. The method for forming the second electrode in the second electrode forming step is equivalent to the step described in the above-mentioned item of "(1) Spacer side substrate forming step i) First electrode forming step". Thus, the description thereof is omitted.

The second substrate used in the second electrode forming step, and the constituent material and other matters of the second electrode are the same as described in the above-mentioned item of "A-1. Liquid crystal display 3. Counter substrate". Thus, the description thereof is omitted.

ii) Second Alignment Layer Forming Step

The second alignment layer forming step is a step of forming a second alignment layer on the second electrode formed in the second electrode forming step. The method for forming the second alignment layer in the second alignment layer forming step is equivalent to the step described in the above-mentioned item of "(1) Spacer side substrate forming step iii) First alignment layer". Thus, the description thereof is omitted.

The constituent material and other matters of the second alignment layer are the same as described in the above-mentioned item of "A-1. Liquid crystal display 3. Counter substrate". Thus, the description thereof is omitted.

(3) Method for Forming an Uncured Reactive Alignment Layer

Next, described is the method for forming an uncured reactive alignment layer comprising a curable resin that is not yet cured on at least one of the first alignment layer of the spacer side substrate and the second alignment layer of the counter substrate in the present step.

The method for forming an uncured reactive alignment layer in the step may be a method of coating a reactive alignment layer forming solution containing a curable resin that is not yet cured, and subjecting the resultant to alignment treatment, or a method of forming, in advance, a dry film containing a curable resin that is not yet cured, and then laminating this. In the sub-embodiment, preferred is the method of coating a reactive alignment layer forming solution containing a curable resin that is not yet cured, and subjecting the resultant to alignment treatment. This method has an advantage that the uncured reactive alignment layer step can be made simple.

The solvent used in the reactive alignment layer forming solution is not particularly limited as long as the solution is a solution in which the above-mentioned curable resin and the like can be dissolved without hindering the aligning power of the first alignment layer or that of the second alignment layer. Examples thereof include hydrocarbons such as benzene, toluene, xylene, n-butylbenzene, diethylbenzene, and tetralin; ethers such as methoxybenzene, 1,2-dimethoxybenzene, and diethylene glycol dimethylether; ketones such as acetone, methyl ethyl ketone, methyl isobutyl ketone, cyclohexanone, and 2,4-pentanedione; esters such as ethyl acetate, propylene glycol monomethyl ether acetate, propylene glycol monoethyl ether acetate, and γ-butyrolactone; amide solvents such as 2-pyrrolidone, N-methyl-2-pyrrolidone, dimethylformamide, and dimethylacetoamide; alcohols such as t-butyl alcohol, diacetone alcohol, glycerin, monoacetin, ethylene glycol, triethylene glycol, and hexylene glycol; phenols such as phenol, and p-chlorophenol; and cellosolves such as methylcellosolve, ethylcellosolve, butylcellosolve, and ethylene glycol monomethyl ether acetate. One or more of these solvents may be used.

Only by using a single solvent, the solubility of the above-mentioned curable resin and the like therein may be insufficient, or the first alignment layer may be eroded therewith as described above. However, this convenience can be avoided by use of two or more solvents in a mixture form. Out of the above-mentioned solvents, hydrocarbons and glycol monoether acetate solvents are each preferred as the single solvent. A mixed system composed of an ether or ketone and a glycol solvent is preferred as the mixed solvent.

The concentration of the reactive alignment layer forming solution cannot be specified without reservation since the concentration depends on the solubility of the curable resin, and the thickness of the reactive alignment layer to be formed. The concentration is adjusted usually into the range of 0.1 to 40% by mass, preferably into the range of 1 to 20% by mass. If the concentration in the reactive alignment layer forming solution is lower than the range, at the time of using a reactive liquid crystal as the curable resin, for example, this reactive liquid crystal may not be aligned with ease. Conversely, if the concentration in the reactive alignment layer forming solution is higher than the range, the viscosity of the reactive alignment layer forming solution becomes high so that an evenly coated film is not easily formed.

Furthermore, compounds as descried below may be added to the reactive alignment layer forming solution as long as the objects of the invention are not damaged. Examples of the compounds which may be added include a polyester (meth) acrylate, which is obtained by causing (meth) acrylic acid to react with a polyester prepolymer yielded by condensing a polyhydric alcohol and a monobasic or polybasic acid; a polyurethane (meth)acrylate, which is obtained by causing compounds each having a polyol group and two isocyanate groups to react with each other, and then causing the reaction product to react with (meth) acrylic acid; a photopolymerizable compound, such as an epoxy(meth)acrylate, which is obtained by causing (meth) acrylic acid to react with an epoxy resin, such as bisphenol A type epoxy resin, bisphenol F type epoxy resin, novolak type epoxy resin, a polyglycidyl ester of polycarboxylic acid, polyol polyglycidyl ether, an aliphatic or alicyclic epoxy resin, amineepoxy resin, triphenolmethane type epoxy resin, or dihydroxybenzene type epoxy resin; and a photopolymerizable liquid crystal compound having an acrylic group or a methacrylic group. The amount of the compound(s) added to the reactive liquid crystal is selected as long as the objects of the invention are not damaged. The addition of the compound(s) causes an improvement in the curability of the curable resin, an increase in the mechanical strength of the reactive alignment layer to be obtained, and an improvement in the stability thereof.

Examples of the method for coating reactive alignment layer forming solution include spin coating, roll coating, printing, dip coating, curtain coating (die coating), casting, bar coating, blade coating, spray coating, gravure coating, reverse coating, and extrusion coating methods.

After the reactive alignment layer forming solution is coated, the solvent is removed. This removal of the solvent is performed by removal under reduced pressure or removal by heating, a combination thereof, or the like.

The coated curable resin is subjected to alignment treatment, thereby expressing aligning power for the liquid crystal material in the liquid crystal layer. Examples of the alignment treatment include methods based on rubbing treatment, the application of an electric field, the application of a magnetic field, and radiation of light.

In the case of using a reactive liquid crystal as the curable resin, the coated reactive liquid crystal is aligned by action of the first alignment layer, thereby making the liquid crystal into a state that the liquid crystal has liquid crystal regularity. This is usually performed by a method of conducting thermal treatment at not higher than the N—I transition point, or some other method. The N—I transition point means the temperature at which the liquid crystal phase is transited to the isotropic phase.

The thickness of the uncured reactive alignment layer is preferably from 1 nm to 1000 nm, more preferably from 3 nm to 100 nm. If the uncured reactive alignment layer becomes thick over the range, the uncured reactive alignment layer may not be formed with ease to have an excellent flatness. If the layer is thinner than the range, the adhesive force between the spacer side substrate and the counter substrate may be low when a liquid crystal display is formed therefrom.

The curable resin used in the step and other matters are the same as described in the above-mentioned item of "A-1. Liquid crystal display 1. Reactive alignment layer". Thus, the description thereof is omitted.

2. Liquid Crystal Display Substrate Pair-Forming Step

Next, the liquid crystal display substrate pair-forming step in the sub-embodiment is described. The liquid crystal display substrate pair-forming step in the sub-embodiment is a step of bringing the spacer side substrate and the counter substrate into contact with each other to oppose the first alignment layer and the second alignment layer to each other with the uncured reactive alignment layer, which is formed on at least one of the spacer side substrate and the counter substrate, interposed therebetween, and then curing the curable resin, thereby bonding the spacer side substrate and the counter substrate to each other so as to form a liquid crystal display substrate pair.

In the step, the method for curing the curable resin contained in the uncured reactive alignment layer should be decided in accordance with the nature of the curable resin. Accordingly, in the case of using, as the curable resin, an ultraviolet curable resin, an ultraviolet ray having a wavelength permitting the curable resin to be cured is radiated, whereby the curable resin can be cured. In the case of using, as the curable resin, are active liquid crystal, such a curing treatment may be conducted under the condition of the temperature at which the reactive liquid crystal turns into a liquid crystal phase, or at a temperature lower than the temperature at which the reactive liquid crystal turns into a liquid crystal phase. Once the polymerizable liquid crystal material turns into a liquid crystal phase, the alignment state is not suddenly disturbed even if the temperature is made low thereafter.

When the curable resin is cured to form the reactive alignment layer in the step, a sealing agent made of a resin that is not yet cured and formed on at least one of the spacer side substrate and the counter substrate may be simultaneously cured to form the sealing agent between the spacer side substrate and the counter substrate. When the reactive alignment layer and the sealing agent are simultaneously formed by curing treatment in this way, the producing process of the sub-embodiment can be made simple.

3. Liquid Crystal Layer Forming Step

Next, the liquid crystal layer forming step in the sub-embodiment is described. The liquid crystal layer forming step is a step of forming a liquid crystal layer comprising a liquid crystal material between the spacer side substrate and the counter substrate of the liquid crystal display substrate pair formed in the liquid crystal display substrate pair-forming step.

In the step, a liquid crystal material is injected to between the spacer side substrate and the counter substrate of the liquid crystal display substrate pair formed in the liquid crystal display substrate pair-forming step, and then the liquid crystal material is aligned, whereby a liquid crystal layer can be formed. The method for injecting the liquid crystal material in the step is not particularly limited, and may be a method used generally as a method for producing a liquid crystal cell. The method which can be used is, for example, a method of heating the liquid crystal material to turn the material to an isotropic liquid, using a capillary effect to inject the liquid, and sealing the liquid crystal with an adhesive agent. The injected liquid crystal material can be aligned by cooling the material slowly.

The liquid crystal material and other matters of the liquid crystal layer forming composition are the same as described in the above-mentioned item of "A-1. Liquid crystal display 5. Others". Thus, the description thereof is omitted.

4. Others

The driving method and the usage of the liquid crystal display obtained by the liquid crystal display producing process according to the sub-embodiment are the same as described in the item of "A-1. Liquid crystal display". Thus, the description thereof is omitted.

A-2-2. Second Sub-Embodiment

Next, the liquid crystal display producing process of the second sub-embodiment in the present embodiment will be explained. The process for producing a liquid crystal display of this sub-embodiment uses a spacer side substrate having a first substrate, a first electrode formed on the first substrate, a spacer formed on the first electrode, and a first alignment layer formed on the first electrode and the spacer; and a counter substrate having a second substrate, a second electrode formed on the second substrate, and a second alignment layer formed on the second electrode, comprising steps of: an uncured reactive alignment layer forming step of forming an uncured reactive alignment layer containing a curable resin that is not yet cured on at least one of the first alignment layer or the second alignment layer, a liquid crystal dropping step of dropping a liquid crystal material on at least one of the first alignment layer or the second alignment layer after the uncured reactive alignment layer forming step, and a substrate bonding step of bringing the spacer side substrate and the counter substrate into contact with each other to oppose the first alignment layer and the second alignment layer to each other with the uncured reactive alignment layer interposed therebetween, and then curing the curable resin, thereby bonding the spacer side substrate and the counter substrate to each other.

Figure 6A:
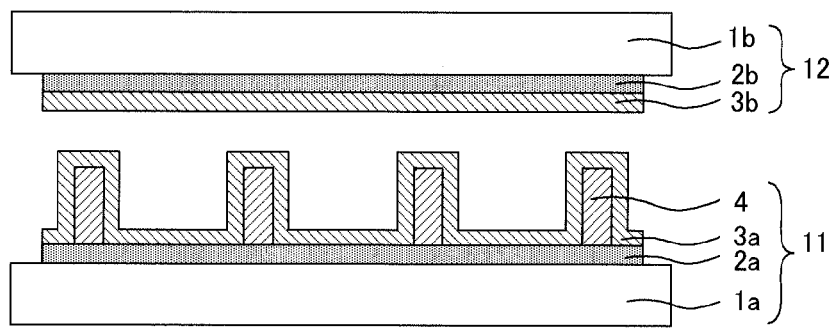
FIGS. 6A to 6D are process charts illustrating another example of a process for producing the liquid crystal display of the first embodiment of the invention.

Referring to the drawings, the liquid crystal display producing process of the sub-embodiment is described. FIGS. 6A to 6D are process charts illustrating an example of the liquid crystal display producing process according to the sub-embodiment. As illustrated in FIGS. 6A to 6D, in the liquid crystal display producing process of the sub-embodiment, the following are first prepared: a spacer side substrate 11 having a first substrate 1a, a first electrode 2a formed on the first substrate 1a, spacers 4 formed on the first electrode 2a, and a first alignment layer 3a formed on the first electrode 2a and the spacers 4; and a counter substrate 12 having a second substrate 2a, a second electrode 2b formed on the second substrate 2a, and a second alignment layer 3b formed on the second electrode 2b (FIG. 6A).

Figure 6B:
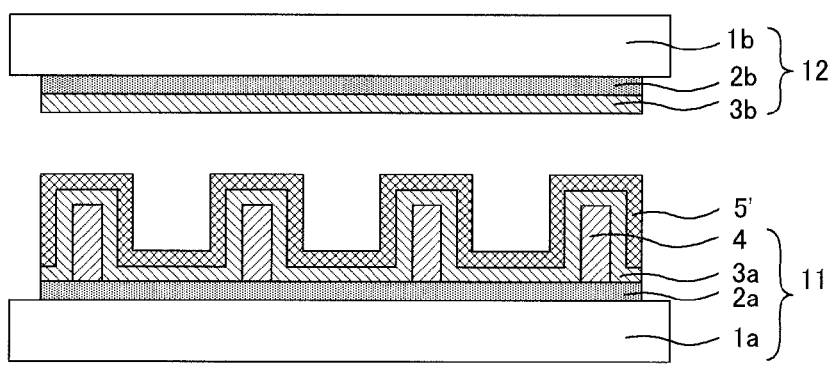

Next, an uncured reactive alignment layer 5' made of a curable resin that is not yet cured is formed on the first alignment layer 3a of the spacer side substrate 11 (an uncured reactive alignment layer forming step: FIG. 6B).

Figure 6C:
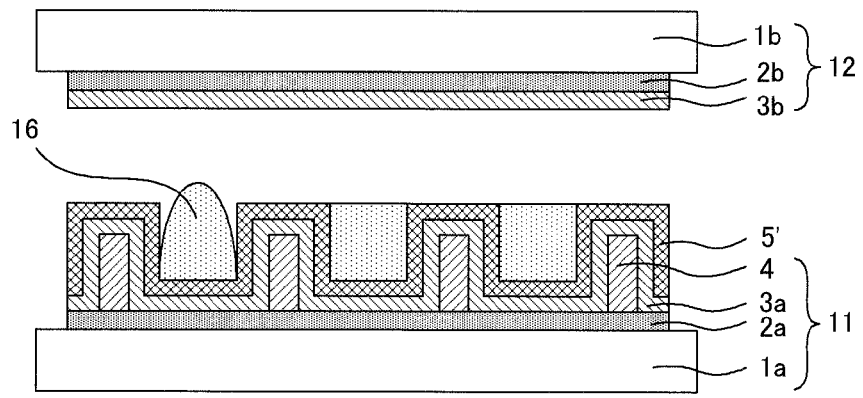

Next, a dispenser in which a liquid crystal material is put into a syringe is used to drop the liquid crystal material 16 in an isotropic liquid state onto the uncured reactive alignment layer 5' (a liquid crystal dropping step: FIG. 6(c)). At this time, the liquid crystal material 16 flows in a region spaced with the spacers 4 so that the region spaced with the spacers 4 is filled with the liquid crystal material 16.

Figure 6D:
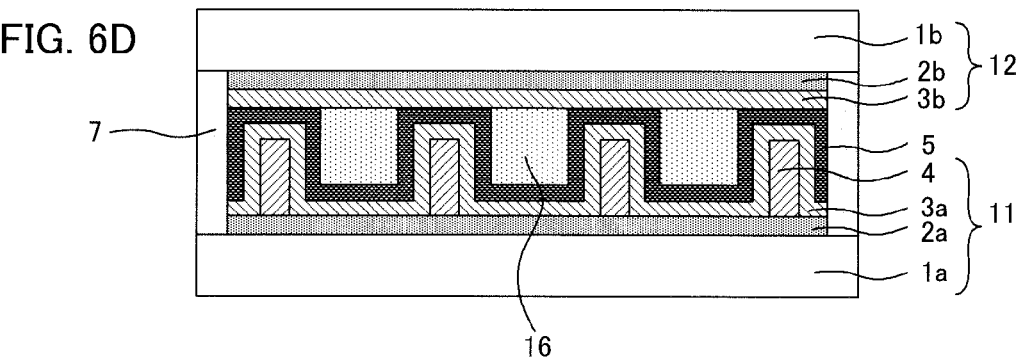

Next, the spacer side substrate 11 on which the liquid crystal material 16 is dropped and the counter substrate 12 are opposed to face the first alignment layer 3a and the second alignment layer 3b to each other with the uncured reactive alignment layer 5' interposed therebetween, and then a pressure in the gap between the spacer side substrate 11 and the counter substrate 12 is sufficiently reduced. Under the reduced pressure, the spacer side substrate 11 and the counter substrate 12 are put onto each other, and a predetermined pressure is applied thereto. In this way, the cell gal is made even. Furthermore, the pressure is returned to normal pressure, thereby applying a pressure further to between the spacer side substrate 11 and the counter substrate 12. The uncured curable resin contained in the uncured reactive alignment layer 5' is cured to render the layer 5' a reactive alignment layer 5, thereby bonding the spacer side substrate 11 and the counter substrate 12 to each other (substrate bonding step: FIG. 6D). When the uncured curable resin is cured to form the reactive alignment layer 5, a sealing agent made of an uncured curable resin may be simultaneously cured to form a sealing agent 7 between the spacer side substrate 11 and the counter substrate 12.

Thereafter, the sealed-in liquid crystal material is aligned, which is not illustrated. In the sub-embodiment, a liquid crystal display is produced through the above-mentioned steps.

According to the sub-embodiment, the spacer side substrate and the counter substrate can be strongly fixed to each other with the reactive alignment layer interposed therebetween; therefore, a liquid crystal display in which the cell gap is not fluctuated to exhibit an excellent display quality can be produced.

The liquid crystal display producing process of the sub-embodiment will be described in detail herein after. The uncured reactive alignment layer forming step is the same as in the above-mentioned item of "A-2-1. First sub-embodiment". Thus, the description thereof is omitted.

1. Liquid Crystal Dropping Step

The liquid crystal dropping step in the sub-embodiment is a step of dropping a liquid crystal material on either one of the first alignment layer or the second alignment layer after the uncured reactive alignment layer forming step.

When the liquid crystal material is dropped, the liquid crystal material may be heated up to a temperature at which the material turns into an isotropic phase. At this time, the substrate on which the liquid crystal material is to be dropped may be heated in advance.

The method for dropping the liquid crystal material is not particularly limited as long as the method makes it possible to drop a predetermined amount thereof which permits the material to be sealed in. The method may be, for example, a method of dropping the material intermittently or a method of dropping the material continuously.

The substrate on which the liquid crystal material is to be drooped may be the spacer side substrate or the counter substrate. For example, in the case that the uncured reactive alignment layer is formed only on the first alignment layer of the spacer side substrate, the liquid crystal material may be dropped on the uncured reactive alignment layer of the spacer side substrate or on the second alignment layer of the counter substrate. For example, in the case that the uncured reactive alignment layer is formed only on the second alignment layer of the counter substrate, the liquid crystal material may be dropped on the first alignment layer of the spacer side substrate or on the uncured reactive alignment layer of the counter substrate. Furthermore, for example, in the case that the uncured reactive alignment layer is formed on each of the first alignment layer of the spacer side substrate and the second alignment layer of the counter substrate, the liquid crystal material may be dropped on the uncured reactive alignment layer of the spacer side substrate or on the uncured reactive alignment layer of the counter substrate. In particular, it is preferred to drop the liquid crystal material on the spacer side substrate since the positioning between the spacer side substrate and the counter substrate is easily attained.

2. Substrate Bonding Step

The substrate bonding step in the sub-embodiment is a step of bringing the spacer side substrate and the counter substrate into contact with each other to oppose the first alignment layer and the second alignment layer with the uncured reactive alignment layer interposed therebetween, and then curing the curable resin, thereby bonding the spacer side substrate and the counter substrate to each other.

When the spacer side substrate and the counter substrate are opposed to each other, it is preferred to discharge the gas in the chamber to reduce the pressure in the gap between the spacer side substrate and the counter substrate sufficiently. This makes it possible to prevent an air gap from remaining in the liquid crystal cell.

After the spacer side substrate and the counter substrate are opposed to each other, it is preferred to bring the spacer side substrate and the counter substrate into contact with each other under a reduced pressure and apply a predetermined pressure thereto so as to make the cell gap even. It is preferred to apply a further pressure to between the spacer side substrate and the counter substrate by returning the pressure in the chamber to normal pressure. This makes it possible to make the cell gap even.

The method for curing the curable resin of the uncured reactive alignment layer, and others are the same as described about the liquid crystal display substrate pair-forming step in the above-mentioned item of "A-2-1. First sub-embodiment". Thus, the description thereof is omitted.

B. Second Embodiment

B-1. Liquid Crystal Display

Next, the liquid crystal display of the second embodiment of the invention is described. The liquid crystal display of the embodiment is roughly classified further into two sub-embodiments in accordance with the structure of its reactive liquid crystal layer obtained by fixing a reactive liquid crystal.

Hereinafter, the liquid crystal display of the embodiment will be described in detail in accordance with each of the classified sub-embodiments.

B-1-1. First Sub-Embodiment

First, a liquid crystal display of the first sub-embodiment will be explained. The liquid crystal display of the present sub-embodiment, comprises: a spacer side substrate having a first substrate, a first electrode formed on the first substrate, a spacer formed on the first electrode, and a first alignment layer formed on the first electrode and the spacer; and a counter substrate having a second substrate, a second electrode formed on the second substrate, and a second alignment layer formed on the second electrode; in which the spacer side substrate and the counter substrate are provided to oppose the first alignment layer and the second alignment layer to each other; and in which a liquid crystal layer comprising a ferroelectric liquid crystal are held between the spacer side substrate and the counter substrate; characterized in that a reactive liquid crystal layer obtained by fixing a reactive liquid crystal is formed on at least one of the first alignment layer and the second alignment layer, and further characterized in that the spacer side substrate and the counter substrate are bonded to each other with the reactive liquid crystal layer interposed therebetween.

Figure 7A:
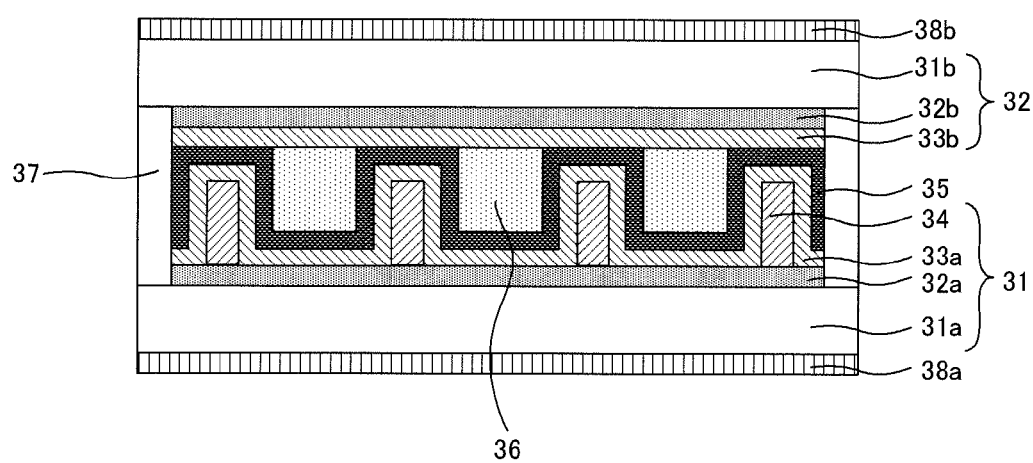
FIGS. 7A to 7C are each a schematic sectional view illustrating an example of the liquid crystal display of a second embodiment of the invention.

Next, the liquid crystal display of the sub-embodiment is described with reference to the drawings. FIG. 7A is a schematic sectional view illustrating an example of the liquid crystal display of the sub-embodiment. As illustrated in FIG. 7A, in a liquid crystal display 30*a* of the sub-embodiment, a spacer side substrate 31 having a first substrate 31*a*, a first electrode 32*a* formed on the first substrate 31*a*, spacers 34 formed on the first electrode 32*a*, a first alignment layer 33*a* formed on the first electrode 32a and the spacers 34 and a reactive liquid crystal layer 35 formed on the first alignment layer 33a and obtained by fixing a reactive liquid crystal, and a counter substrate 32 having a second substrate 31b, a second electrode 32b formed on the second substrate 31b, and a second alignment layer 33b formed on the second electrode 32b are provided to bond the reactive liquid crystal layer 35 and the second alignment layer 33b to each other, and a liquid crystal layer 36 made of a ferroelectric liquid crystal is held between the spacer side substrate 31 and the counter substrate 32. As illustrated in FIG. 7A, the liquid crystal display of the sub-embodiment may have a sealing agent 37 for preventing the ferroelectric liquid crystal from leaking off, and polarizing plates 38a and 38b.

In the liquid crystal display of the sub-embodiment, either one of the spacer side substrate or the counter substrate has the reactive liquid crystal layer, which is obtained by fixing the reactive liquid crystal, and the spacer side substrate and the counter substrate are bonded to each other with the reactive liquid crystal layer interposed therebetween, whereby the spacer side substrate and the counter substrate can be strongly fixed to each other with an even cell gap. According to the sub-embodiment, therefore, a liquid crystal display in which the cell gap is not fluctuated by external force so as to exhibit an excellent display quality can be obtained.

The reactive liquid crystal layer in the sub-embodiment is formed on the first alignment layer of the spacer side substrate, or on the second alignment layer of the counter substrate; therefore, the reactive liquid crystal, which constitutes the reactive liquid crystal layer, can be regularly arranged by action of the first alignment layer or the second alignment layer. When the reactive liquid crystal is fixed in the state that the reactive liquid crystal is regularly arranged in this way, the reactive liquid crystal layer can function as an alignment layer for aligning the ferroelectric liquid crystal. Since the reactive liquid crystal is relatively similar to the ferroelectric liquid crystal in structure, interaction between the reactive liquid crystal and the ferroelectric liquid crystal becomes strong. Accordingly, in the liquid crystal display of the sub-embodiment, the alignment of the ferroelectric liquid crystal can be more effectively controlled than in the case of using only the alignment layers since the liquid crystal display of the sub-embodiment has the above-mentioned reactive liquid crystal layer.

Furthermore, the liquid crystal display of the sub-embodiment has the reactive liquid crystal layer on either one of the first alignment layer or the second alignment layer, thereby making the ferroelectric liquid crystal which constitutes the liquid crystal layer into a mono-stability state easily; therefore, the generation of alignment defects, such as zigzag defects, hairpin defects or double domains, is restrained, and an operation mode of mono-stability can be realized, using a ferroelectric liquid crystal. The mechanism that the liquid crystal display has the reactive liquid crystal layer, whereby the ferroelectric liquid crystal can be made into a mono-stability state is unclear, but would be as follows: when the reactive liquid crystal layer is formed on either one of the first alignment layer or the second alignment layer, the above-mentioned liquid crystal layer is held between the alignment layers which have an aligning power for the ferroelectric liquid crystal and are different from each other in composition; for this reason, the interaction between the ferroelectric liquid crystal and the alignment layer above the liquid crystal layer and that below the liquid crystal layer are different from each other so that the polarization directions of the ferroelectric liquid crystal are unified into one direction; thus, the ferroelectric liquid crystal would be made into a mono-stability state.

Each of the constituents of the liquid crystal display of the sub-embodiment will be described in detail herein after.

1. Reactive Liquid Crystal Layer

First, the reactive liquid crystal layer which the liquid crystal display of the sub-embodiment has is described. The reactive liquid crystal layer which the liquid crystal display of the sub-embodiment has is formed on either one of the first alignment layer of the spacer side substrate or the second alignment layer of the counter substrate, and has a function of bonding the spacer side substrate and the counter substrate to each other. The reactive liquid crystal can be aligned by action of the first alignment layer or the second alignment layer; thus, for example, when the reactive liquid crystal is irradiated with ultraviolet rays to be polymerized so that the alignment state thereof is fixed, the resultant layer can function as an alignment layer for aligning the ferroelectric liquid crystal. Moreover, the reactive liquid crystal has an advantage of not being affected by temperature and the like since the liquid crystal is fixed. Furthermore, the reactive liquid crystal is relatively similar to the ferroelectric liquid crystal in structure to interact strongly with the ferroelectric liquid crystal; thus, the alignment of the ferroelectric liquid crystal can be more effectively controlled than in the case of using only the alignment layers.

Hereinafter, the reactive liquid crystal layer used in the sub-embodiment will be described.

(1) Reactive Liquid Crystal

The reactive liquid crystal used in the reactive liquid crystal layer is not particularly limited as long as the liquid crystal exhibits adhesive properties to the spacer side substrate and the counter substrate and further exhibits an aligning power for the ferroelectric liquid crystal which constitutes the liquid crystal layer by regular arrangement.

The reactive liquid crystal used in the sub-embodiment is the same as described in the above-mentioned item of "A-1. Liquid crystal display 1. Reactive alignment layer". Thus, the description thereof is omitted.

(2) Reactive Liquid Crystal Layer

Figure 7B:
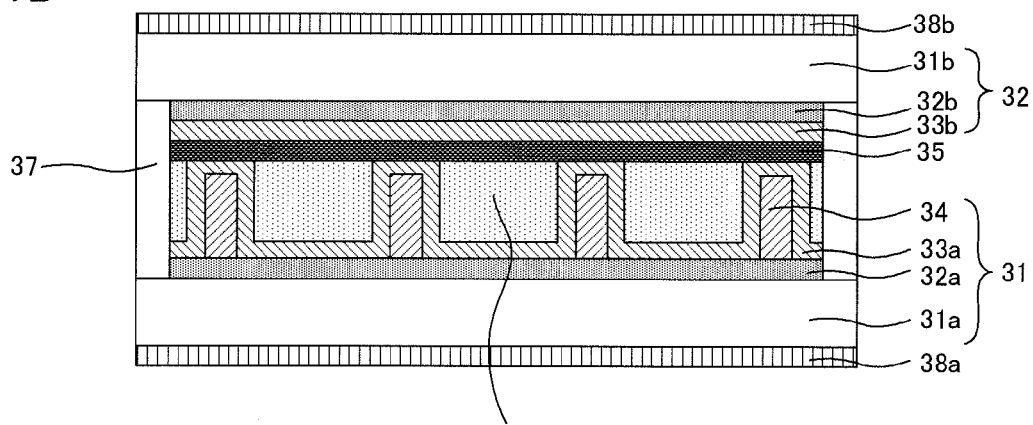

It is sufficient that the reactive liquid crystal layer which the liquid crystal display of the sub-embodiment has is formed on either one of the first alignment layer of the spacer side substrate or the second alignment layer of the counter substrate. Each form in which the reactive liquid crystal layer is formed on at least one of the first alignment layer of the spacer side substrate and the second alignment layer of the counter substrate in this way is specifically described with reference to the drawings. FIG. 7A illustrates a form in which the reactive liquid crystal layer 35 is formed on the first alignment layer 33a of the spacer side substrate 31, as described above. Besides this form, the form of the reactive liquid crystal layer in the sub-embodiment is a form in which the reactive liquid crystal layer 35 is formed on the second alignment layer 33b of the counter substrate 32, as illustrated in FIG. 7B.

The reactive liquid crystal layer in the sub-embodiment may be in a form in which the layer is formed on the first alignment layer of the spacer side substrate, or in a form in which the layer is formed on the second alignment layer of the counter substrate. In particular, the reactive liquid crystal layer in the sub-embodiment is preferably in the form in which the layer is formed on the second alignment layer of the counter substrate. If the reactive liquid crystal layer is formed on the spacer side substrate, the film thickness of the reactive liquid crystal layer may be made uneven or the curing unevenness of the curable resin may be generated by the existence of the spacers; however, when the reactive liquid crystal layer is present on the counter substrate, such a problem is not caused.

The thickness of the reactive liquid crystal layer is preferably from nm 1 to 1000 nm, more preferably from 3 nm to 100 nm. If the reactive liquid crystal layer becomes thick over this range, more anisotropy than required may be generated. If the reactive liquid crystal is thinner than the range, the adhesive force between the spacer side substrate and the counter substrate may become insufficient.

Figure 8:
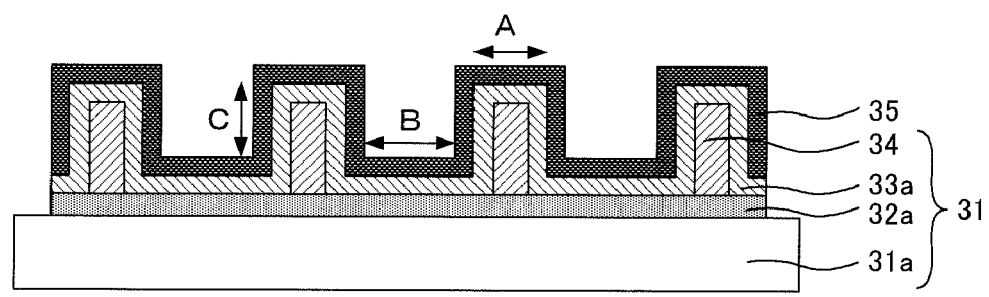
FIG. 8 is a schematic sectional view illustrating an example of a spacer side substrate used in the liquid crystal display of the second embodiment of the invention.

In the sub-embodiment, the thickness of the reactive liquid crystal layer may be even or uneven. For example, when the reactive liquid crystal layer is formed on the first alignment layer of the spacer side substrate as illustrated in FIG. 8, the thicknesses of the reactive liquid crystal layer in regions A where the spacers 34 are formed, regions B formed between any two of the spacers 34, and regions C formed on walls of the spacers 34 may be the same or different from each other as long as the thicknesses are each in the above-mentioned range.

(3) Others

The reactive liquid crystal layer in the sub-embodiment has a function of bonding the spacer side substrate and the counter substrate to each other, and the bonding referred to herein means that the spacer side substrate and the counter substrate contact each other without being separated from each other, and more specifically means that they contact each other to have such an adhesive force that they are not separated from each other by their self-weights.

2. Spacer Side Substrate

Next, the spacer side substrate used in the sub-embodiment is described. The spacer side substrate used in the sub-embodiment has a substrate having a first substrate, a first electrode formed on the first substrate, one or more spacers formed on the first electrode, and a first alignment layer formed on the first electrode and the spacer(s). The spacer side substrate in the sub-embodiment may have the above-mentioned reactive liquid crystal layer on the first alignment layer.

The spacer(s), the first substrate, the first electrode, and the first alignment layer in the spacer side substrate used in the sub-embodiment are the same as described in the above-mentioned item of "A-1. Liquid crystal display 2. Spacer side substrate". Thus, the description thereof is omitted.

The reactive liquid crystal layer used in the spacer side substrate is the same as described in the above-mentioned item of "1. Reactive liquid crystal layer". Thus, the description thereof is omitted.

3. Counter Substrate

Next, the counter substrate used in the sub-embodiment is described. The counter substrate in the sub-embodiment is a substrate having a second substrate, a second electrode formed on the second substrate, and a second alignment layer formed on the second electrode. The counter substrate in the sub-embodiment may have the above-mentioned reactive liquid crystal layer on the first alignment layer.

The second substrate, the second electrode and the second alignment layer used in the counter substrate are equivalent to the first substrate, the first electrode and the first alignment layer as described in the above-mentioned item of "2. Spacer side substrate", respectively. Thus, the description thereof is omitted. The reactive liquid crystal layer used in the counter substrate is the same as described in the above-mentioned item of "1. Reactive liquid crystal layer". Thus, the description thereof is omitted.

4. Liquid Crystal Layer

The liquid crystal layer used in the sub-embodiment is constructed to hold a ferroelectric liquid crystal between the spacer side substrate and the counter substrate. The phase sequence of the ferroelectric liquid crystal used in the present sub-embodiment is not particularly limited as long as a chiral smectic phase (SmC*) is expressed. Examples thereof include a phase sequence where a phase change of nematic phase (N)-cholesteric phase (Ch)-chiral smectic C phase (SmC*) advances; a phase sequence where a phase change of nematic phase (N)-chiral smectic C phase (SmC*) advances; a phase sequence where a phase change of nematic phase (N)-smectic A phase (SmA)-chiral smectic C phase (SmC*) advances; and a phase sequence where a phase change of nematic phase (N)-cholesteric phase (CH)-smectic A phase (SmA)-chiral smectic C phase (SmC*) advances.

Figure 14:
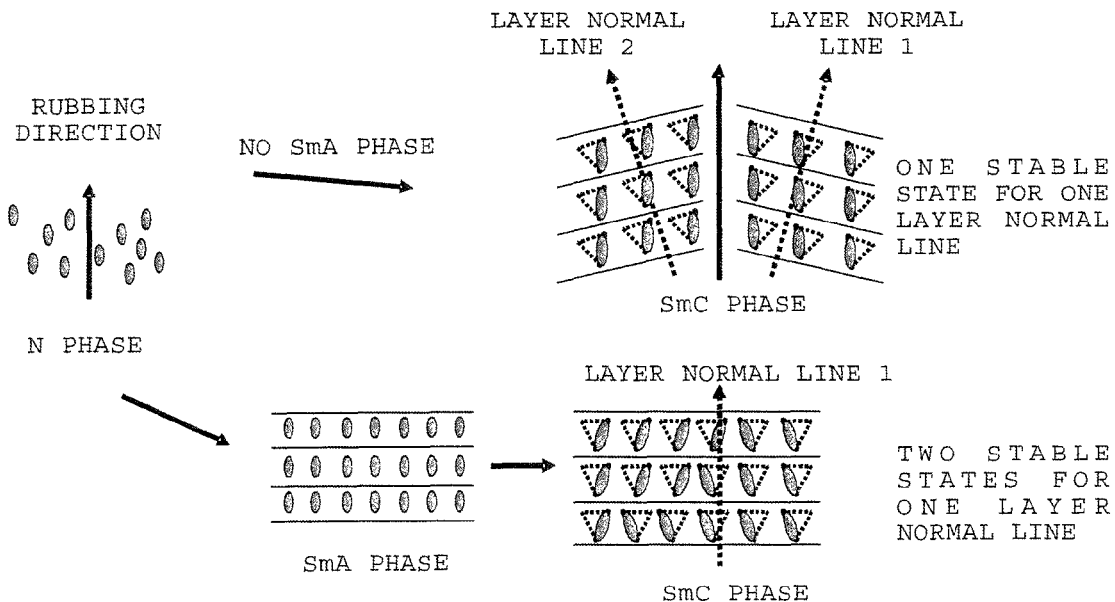
FIG. 14 is a view illustrating a difference of alignment defects based on a difference of the phase sequence that ferroelectric liquid crystal has.
Figure 15:
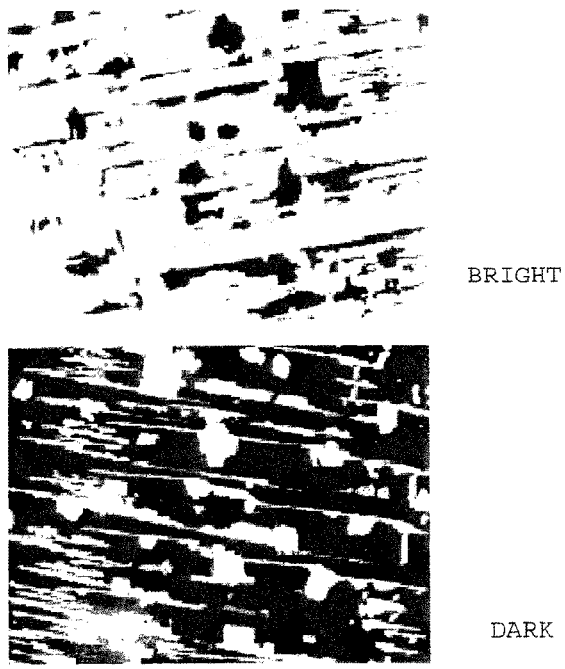
FIG. 15 is a photograph showing double domains which are alignment defects of ferroelectric liquid crystal.

In general, the ferroelectric liquid crystal having the phase sequence passing through SmA phase as exemplified in the lower part of FIG. 14 has the layer interval of the smectic layer shorten in the phase change process so as to have a chevron structure with the smectic layer bent for compensating the volume change. According to the bent direction, a domain having a different longer axis direction of the liquid crystal molecule is formed so as to easily generate the alignment defect called the zigzag defect or the hairpin defect in the boundary surface, and thus it is problematic. Generally, in a ferroelectric liquid crystal having a phase sequence which exists by way of no SmA phase as illustrated in the upper part of FIG. 14, two domains (double domains) in which their layer normal lines are different from each other are easily generated. In the sub-embodiment, the alignment of a ferroelectric liquid crystal can be made into a mono-stability state without generating such alignment defects.

When the liquid crystal display of the sub-embodiment is displayed by a field sequential color system, it is preferred to use a liquid crystal material exhibiting mono-stability. The use of the liquid crystal material exhibiting mono-stability makes it possible to drive the liquid crystal display by an active matrix system using a thin film transistor (TFT) and attain gray scale control based on voltage modulation. Thus, highly precise and high-quality display can be realized.

Figure 16:
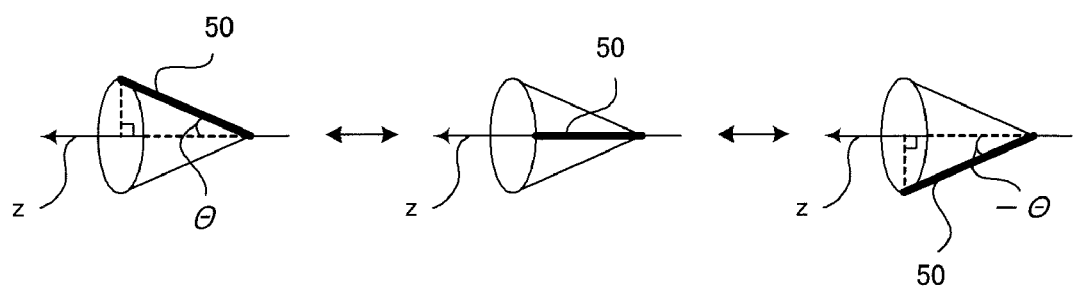
FIG. 16 is a schematic view each illustrating the behavior of liquid crystal molecules.

Here, "show the mono-stability" denotes the state of the ferroelectric liquid crystal at the time of the voltage non application stabilized as one state. Specifically, as shown in FIG. 16, the ferroelectric liquid crystal 50 can be operated on the cone between the two states inclined by a tilt angle ±θ with respect to the layer normal line z, and the ferroelectric liquid crystal 50 is stabilized in one state on the above-mentioned cone when no voltage is applied.

Figure 13:
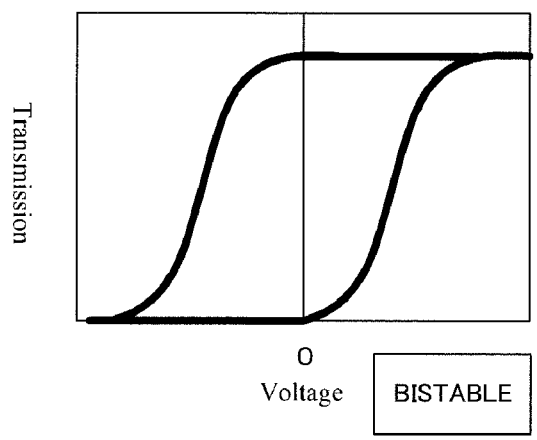
FIG. 13 is a graph showing changes in transmission to voltage applied to ferroelectric liquid crystals.
Figure 13:
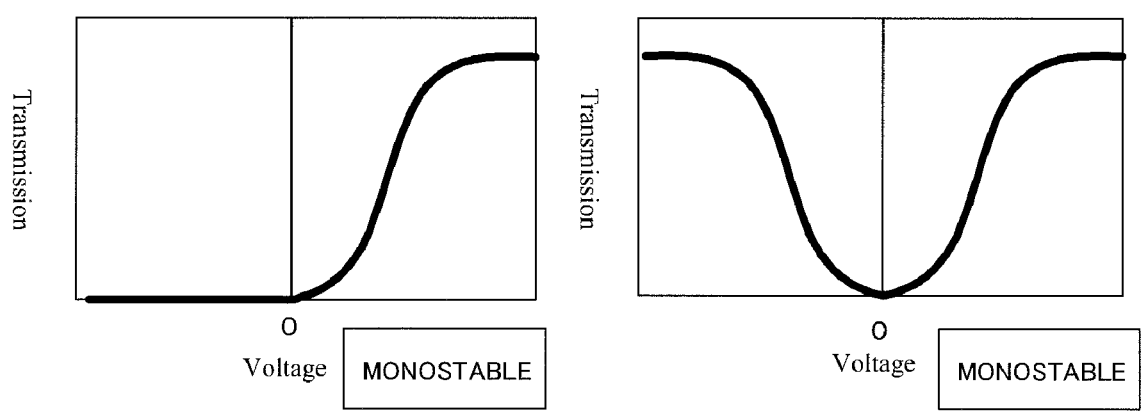

Out of liquid crystal materials exhibiting mono-stability, in particular preferred is a liquid crystal material having half-V shaped switching (referred to as "HV shaped switching herein after) properties, in which the liquid crystal molecules operate only when either one of a positive or negative voltage, as illustrated in the lower left in FIG. 13, is applied thereto. When such a ferroelectric liquid crystal exhibiting HV shaped switching properties is used, the opening time can be made sufficient long as a black and white shutter so that individual colors which can be switched with time can be displayed more brightly. Thus, a liquid crystal display attaining bright color display can be realized.

The "HV shaped switching properties" means electrooptical properties of exhibiting an asymmetric light transmission in response to applied voltage.

Such a ferroelectric liquid crystal can be variously selected from generally-known liquid crystal materials in accordance with required properties.

The liquid crystal material which expresses a SmC* phase from a Ch phase by way of no SmA phase is particularly preferable. Such liquid crystal material is suitable as a material exhibiting HV-shaped switching characteristics. A specific example thereof is "R2301" manufactured by AZ Electronic Materials.

The liquid crystal material which exists by way of a SmA phase is preferably a liquid crystal material which expresses a SmC* phase from a Ch phase by way of a SmA phase since the material can be selected from wide range. In this case, as such a ferroelectric liquid crystal, although a single material expressing the SmC* phase can be used, a material expressing the above-mentioned phase sequence by adding a small amount of a optically active substance not expressing the SmC phase itself but capable of inducing large spontaneous polarization and an appropriate spiral pitch to a low viscosity non-chiral liquid crystal easily expressing the SmC phase (herein after, it may be referred to as the host liquid crystal) is preferable. This is because it has low viscosity and is capable of realizing a faster response.

As the host liquid crystal mentioned above, a material expressing the SmC phase in a wide temperature range is preferable. Those commonly known as a host liquid crystal for a ferroelectric liquid crystal can be used without limitation particularly. For example, a compound represented by the below-mentioned general formula:

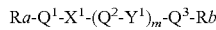

$Ra\text{-}Q^1\text{-}X^1\text{-}(Q^2\text{-}Y^1)_m\text{-}Q^3\text{-}Rb$ (in the formula, Ra and Rb are each a straight chain or branched alkyl group, an alkoxy group, an alkoxy carbonyl group, an alkanoyloxy group or an alkoxy carbonyloxy group; $Q^1$, $Q^2$ and $Q^3$ are each a 1,4-phenylene group, a 1,4-cyclohexylene group, a pyridine-2,5-diyl group, a pyridine-2,5-diyl group, a pyridazine-3,6-diyl group or a 1,3-dioxane-2,5-diyl group, in which these groups may have a substituent group such as a halogen atom, a hydroxyl group and a cyano group; $X^1$ and $Y^1$ are each —COO—, —OCO—, —CH$_2$O—, —OCH$_2$—, —CH$_2$CH$_2$—, —C≡C— or a single bond; and m is 0 or 1) can be used. As the host liquid crystal, the above-mentioned compounds can be used either alone by one kind or as a combination of two or more kinds.

The optically active substance to be added to the above-mentioned host liquid crystal is not particularly limited as long as it is a material having the large spontaneous polarization and the ability capable of inducing an appropriate spiral pitch. Those commonly known as a material to be added to a liquid crystal composition expressing the SmC phase can be used. In particular, a material capable of inducing the large spontaneous polarization by a small addition amount is preferable. As such an optically active substance, for example, a compound represented by the below-mentioned general formula:

$Rc\text{-}Q^1\text{-}Za\text{-}Q^2\text{-}Zb\text{-}Q^3\text{-}Zc\text{-}Rd$ (in the formula, each Rd, $Q^1$, $Q^2$, $Q^3$ denote the same things as in the above-mentioned general formula; Za and Zb are each —COO—, —OCO—, —CH$_2$O—, —OCH$_2$—, —CH$_2$CH$_2$—, —C≡C—, —CH=N—, —N=N—, —N(→O)=N—, —C(=O)S— or a single bond; Rc is a straight chain or branched alkyl group, which may have an asymmetric carbon atom, an alkoxy group, an alkoxy carbonyl group, an alkanoyloxy group or an alkoxy carbonyloxy group; Rd is a straight chain or branched alkyl group having an asymmetric carbon atom, an alkoxy group, an alkoxy carbonyl group, an alkanoyloxy group or an alkoxy carbonyloxy group, and Rc and Rd each may be substituted with a halogen atom, a cyano group or a hydroxyl group) can be used. As the optically active substance, the above-mentioned compounds can be used either alone by one kind or as a combination of two or more kinds.

As the ferroelectric liquid crystal by way of the SmA phase, specifically, "FELIXM4851-100" commercially available from AZ Electronic Materials, or the like can be presented.

The ferroelectric liquid crystal is preferably made into a mono-stability state in the liquid crystal layer. Since the ferroelectric liquid crystal is made into a mono-stability state in the liquid crystal layer, the light transmission can be analogue-modulated by varying the director of the liquid crystal continuously on the basis of a voltage change. Consequently, gray scale display can be attained.

The thickness of the liquid crystal layer is preferably from 1 μm to 5 μm, more preferably from 1.2 μm to 2 μm, even more preferably from 1.2 μm to 1.5 μm. If the thickness of the liquid crystal layer is too small, the contrast may fall. If the thickness of the liquid crystal layer is too large, the liquid crystal material may not be aligned with ease.

5. Others

The liquid crystal display in the sub-embodiment may have a constituent different from the spacer side substrate, the counter substrate, and the liquid crystal layer. Such different constituent are similar to those explained in the item of "A-1. Liquid crystal display" and the explanation thereof are omitted herein.

The method for driving the liquid crystal display device of the sub-embodiment is preferably based on an active matrix system using a thin film transistor (TFT). The adoption of the active matrix system using TFT makes it possible to turn on and off target pixels certainly, so that high-quality display can be attained.

Specific example of the active matrix can be represented by the one shown in FIG. 4.

When the liquid crystal display of the embodiment is driven by the above-mentioned TFT-used active matrix system, the spacer side substrate and the counter substrate may be rendered the TFT substrate and the common electrode substrate, respectively. The counter substrate and the spacer side substrate may be rendered the TFT substrate and the common electrode substrate, respectively.

The liquid crystal display of the sub-embodiment may be used as a liquid crystal color display by adopting a color filter system or a field sequential color system. In, e.g., the liquid crystal display illustrated in FIG. 4, a color micro-filter is provided on the side of its TFT substrate or on the side of its common electrode substrate, whereby color display can be attained.

It is preferable that the liquid crystal display of the sub-embodiment is displayed by the field sequential color system. In the field sequential color system, one pixel is processed by time sharing so that high speed response properties is particularly needed for obtaining preferable moving image display properties. In the sub-embodiment, the use of the high speed response properties of the ferroelectric liquid crystal makes it possible to attain color display by a combination thereof with an LED light source without using any color micro-filter, and further align the ferroelectric liquid crystal without generating any alignment defect. As a result, the liquid crystal display has a wide viewing angle and high speed response properties, and can realize highly precise color display. According to a field sequential color system, it is unnecessary to form a black matrix on the side of the common electrode substrate; therefore, the reactive liquid crystal layer is easily formed in a process for producing the liquid crystal display of the sub-embodiment, which will be described later. Thus, an advantage is produced from the viewpoint of productivity.

When the liquid crystal display of the sub-embodiment is displayed by a field sequential color system, it is preferred to use, as the ferroelectric liquid crystal, a liquid crystal material which expresses a chiral smectic C phase from a cholesteric phase by way of no smectic A phase, so as to exhibit mono-stability. Such a liquid crystal material exhibits HV-shaped switching properties, as described above, and can make the opening time long as a black and white shutter. As a result, individual colors which can be switched with time can be displayed more brightly. Thus, a liquid crystal display attaining bright full color display can be realized.

In the case that the ferroelectric liquid crystal exhibits mono-stability, the liquid crystal display of the sub-embodiment is basically driven by an active matrix system using TFT. However, the liquid crystal display may be driven by a segment system.

The process for producing the liquid crystal display of the sub-embodiment is not particularly limited as long as the process is a process making it possible to produce its individual constituents, the contents of which have been described above. The liquid crystal display may be produced by, for example, a producing process described in the item of "B-2. Process for producing the liquid crystal display".

B-1-2. Second Sub-Embodiment

Next, the second sub-embodiment of the liquid crystal display of the present embodiment is described. The liquid crystal display of the sub-embodiment is a liquid crystal display comprising: a spacer side substrate having a first substrate, a first electrode formed on the first substrate, a spacer formed on the first electrode, a first alignment layer formed on the first electrode and the spacer, and a first reactive liquid crystal layer formed on the first alignment layer and obtained by fixing a reactive liquid crystal, and a counter substrate having a second substrate, a second electrode formed on the second substrate, a second alignment layer formed on the second electrode, and a second reactive liquid crystal layer formed on the second alignment layer and obtained by fixing a reactive liquid crystal; the spacer side substrate and the counter substrate being provided to oppose the first reactive liquid crystal layer and the second reactive liquid crystal layer to each other; and a liquid crystal layer comprising a ferroelectric liquid crystal being held between the spacer side substrate and the counter substrate; in which the reactive liquid crystal which constitutes the first reactive liquid crystal layer and the reactive liquid crystal which constitutes the second reactive liquid crystal layer are different from each other in composition.

Figure 7C:
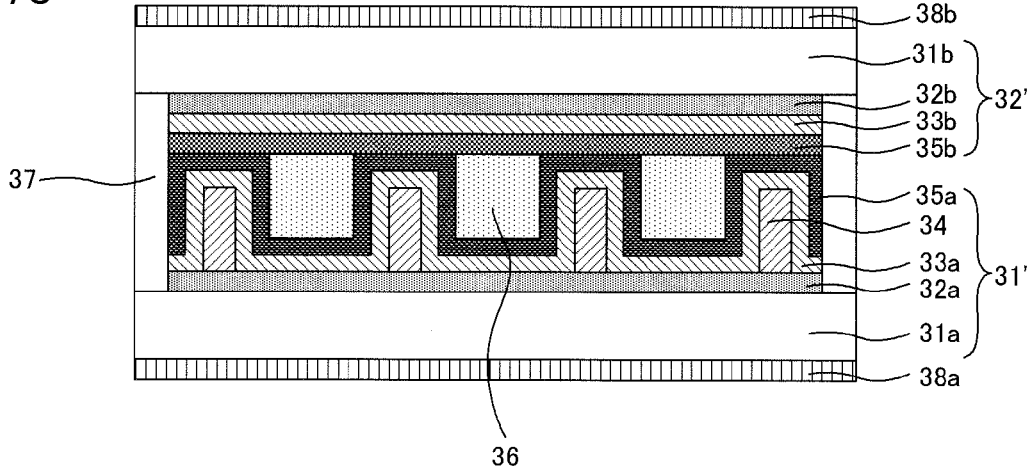

Referring the drawings, the liquid crystal display of the sub-embodiment is described. FIG. 7C is a schematic sectional view illustrating an example of the liquid crystal display of the sub-embodiment. As illustrated in FIG. 7C, a liquid crystal display 30b of the sub-embodiment is a liquid crystal display in which a spacer side substrate 31' having a first substrate 31a, a first electrode 32a formed on the first substrate 31a, spacers 34 formed on the first electrode 32a, a first alignment layer 33a formed on the first electrode 32a and the spacers 34, and a first reactive liquid crystal layer 35a formed on the first alignment layer 33a and obtained by fixing a reactive liquid crystal, and a counter substrate 32' having a second substrate 31b, a second electrode 32b formed on the second substrate 31b, a second alignment layer 33b formed on the second electrode 32b, and a second reactive liquid crystal layer 35b formed on the second alignment layer 33b and obtained by fixing a reactive liquid crystal are bonded to each other so as to oppose the first reactive liquid crystal layer 35a and the second reactive liquid crystal layer 35b to each other, and further a liquid crystal layer 36 made of a ferroelectric liquid crystal is held between the spacer side substrate 31' and the counter substrate 32', characterized in that the reactive liquid crystal which constitutes the first reactive liquid crystal layer 35a and the reactive liquid crystal which constitutes the second reactive liquid crystal layer 35b are different from each other in composition. As illustrated in FIG. 7C, the liquid crystal display of the sub-embodiment may have a sealing agent 37 for preventing the ferroelectric liquid crystal from leaking off, and polarizing plates 38a and 38b.

In the liquid crystal display of the sub-embodiment, the spacer side substrate and the counter substrate are bonded to each other with the first and second reactive liquid crystal layers interposed therebetween, whereby the spacer side substrate and the counter substrate can be strongly fixed to each other with an even cell gap. According to the sub-embodiment, therefore, a liquid crystal display in which the cell gap is not fluctuated by external force to exhibit an excellent display quality can be obtained.

Moreover, in the liquid crystal display of the sub-embodiment, the spacer side substrate and the counter substrate have the reactive liquid crystal layers, respectively, whereby the alignment of the ferroelectric liquid crystal can be more effectively controlled than in the case that the spacer side substrate and the counter substrate have only the alignment layers. In the case that the reactive liquid crystal which constitutes the first reactive liquid crystal layer formed on the first alignment layer is different in composition from the reactive liquid crystal which constitutes the second reactive liquid crystal layer formed on the second alignment layer, the generation of alignment defects, such as zigzag defects, hairpin defects, and double domains, is restrained, and an operation mode of mono-stability can be realized using the ferroelectric liquid crystal.

Each of the constituents of the liquid crystal display of the sub-embodiment will be described herein after.
1. Spacer Side Substrate The spacer side substrate used in the liquid crystal display of the sub-embodiment is a substrate having a first substrate, a first electrode formed on the first substrate, one or more spacers formed on the first electrode, a first alignment layer formed on the first electrode and the spacer(s), and a first reactive liquid crystal layer formed on the first alignment layer and obtained by fixing a reactive liquid crystal. The first substrate, the first electrode, the spacer(s), and the first alignment layer are the same as described in the above-mentioned item of "B-1-1. First sub-embodiment 2. Spacer side substrate". Thus, the description thereof is omitted.

The reactive liquid crystal which constitutes the first reactive liquid crystal layer is not particularly limited as long as the liquid crystal is a liquid crystal different in composition from the reactive liquid crystal which constitutes the second reactive liquid crystal layer, which will be described later. The reactive liquid crystal which constitutes the first reactive liquid crystal layer, and other matters about the first reactive liquid crystal layer are the same as described in the above-mentioned item of "B-1-1. First sub-embodiment 1. Reactive liquid crystal layer". Thus, the description thereof is omitted.
2. Counter Substrate The counter substrate used in the liquid crystal display of the sub-embodiment is a substrate having a second substrate, a second electrode formed on the second substrate, a second alignment layer formed on the second electrode, and a second reactive liquid crystal layer formed on the second alignment layer and obtained by fixing a reactive liquid crystal. The second substrate, the second electrode, and the second alignment layer are the same as described in the above-mentioned item of "B-1-1. First sub-embodiment 3. Counter substrate". Thus, the description thereof is omitted.

The reactive liquid crystal which constitutes the second reactive liquid crystal layer is not particularly limited as long as the liquid crystal is a liquid crystal which is different in composition from the reactive liquid crystal which constitutes the first reactive liquid crystal. The reactive liquid crystal which constitutes the second reactive liquid crystal layer, and other matters about the second reactive liquid crystal layer are the same as described in the above-mentioned item of "B-1-1. First sub-embodiment 1. Reactive liquid crystal layer". Thus, the description thereof is omitted.

3. Liquid Crystal Layer

The liquid crystal layer used in the liquid crystal display of the sub-embodiment is the same as described in the above-mentioned item of "B-1-1. First sub-embodiment 4. Liquid crystal layer". Thus, the description thereof is omitted.

4. Others

Other matters about the liquid crystal display of the sub-embodiment are the same as described in the above-mentioned item of "B-1-1. First sub-embodiment 5. Others". Thus, the description thereof is omitted.

B-2. Process for Producing the Liquid Crystal Display

Next, the process for producing the liquid crystal display of the second embodiment will be explained. The process for producing a liquid crystal display of the second embodiment has: a spacer side substrate having a first substrate, a first electrode formed on the first substrate, a spacer formed on the first electrode, and a first alignment layer formed on the first electrode and the spacer; and a counter substrate having a second substrate, a second electrode formed on the second substrate, and a second alignment layer formed on the second electrode.

The liquid crystal display producing process of the embodiment can be roughly classified into four sub-embodiments in accordance with the form of its uncured reactive liquid crystal layer forming step and the method for forming the liquid crystal layer.

The liquid crystal display producing process of the embodiment will be described herein after in accordance with the classified sub-embodiments.

B-2-1. First Sub-Embodiment

First, the liquid crystal display producing process of the first sub-embodiment will be explained. The process for producing a liquid crystal display of the sub-embodiment, uses a spacer side substrate having a first substrate, a first electrode formed on the first substrate, a spacer formed on the first electrode, and a first alignment layer formed on the first electrode and the spacer; and a counter substrate having a second substrate, a second electrode formed on the second substrate, and a second alignment layer formed on the second electrode, comprising steps of: an uncured reactive liquid crystal layer forming step of forming an uncured reactive liquid crystal layer containing a reactive liquid crystal on either one of the first alignment layer or the second alignment layer; a liquid crystal display substrate pair-forming step of bringing the spacer side substrate and the counter substrate into contact with each other to oppose the first alignment layer and the second alignment layer to each other with the uncured reactive liquid crystal layer, which is formed in the uncured reactive liquid crystal layer forming step, therebetween, and then fixing the reactive liquid crystal resin, thereby bonding the spacer side substrate and the counter substrate to each other to form a liquid crystal display substrate pair; and a liquid crystal layer forming step of forming a liquid crystal layer comprising a ferroelectric liquid crystal between the spacer side substrate and the counter substrate of the liquid crystal display substrate pair formed in the liquid crystal display substrate pair-forming step.

Figure 9A:
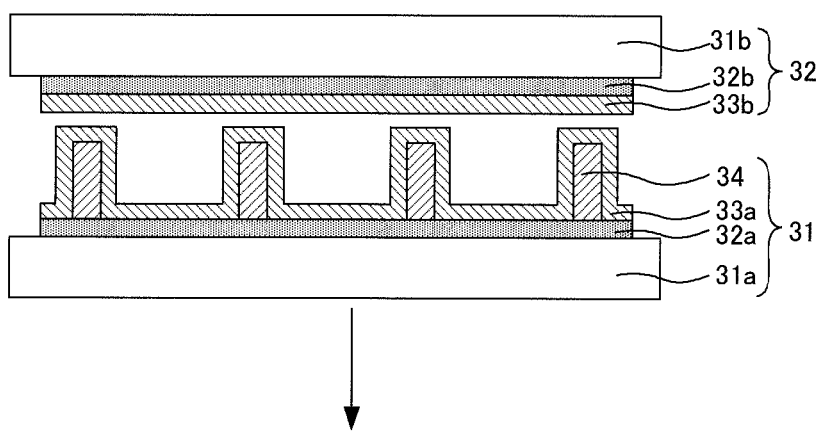
FIGS. 9A to 9D are process charts illustrating an example of a process for producing the liquid crystal display of the second embodiment of the invention.

Next, the liquid crystal display producing process of the sub-embodiment is described with reference to the drawings. FIGS. 9A to 9D are process charts illustrating an example of the producing process of the sub-embodiment. As illustrated in FIGS. 9A to 9D, in the producing process of the sub-embodiment, prepared are first a spacer side substrate 31 having a first substrate 31a, a first electrode 32a formed on the first substrate 31a, spacers 34 formed on the first electrode 32a and a first alignment layer 33a formed on the first electrode 32a and the spacers 34, and a counter substrate 32 having a second substrate 31b, a second electrode 32b formed on the second substrate 31b and a second alignment layer 33b formed on the second electrode 32b (FIG. 9A).

Figure 9B:
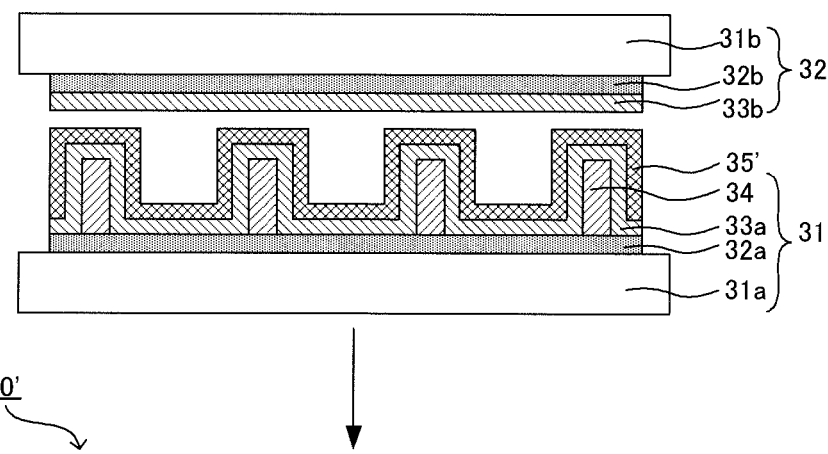

Next, an uncured reactive liquid crystal layer 35' containing a reactive liquid crystal is formed on the first alignment layer 33a of the spacer side substrate 31 (an uncured reactive liquid crystal layer forming step: FIG. 9B).

Figure 9C:
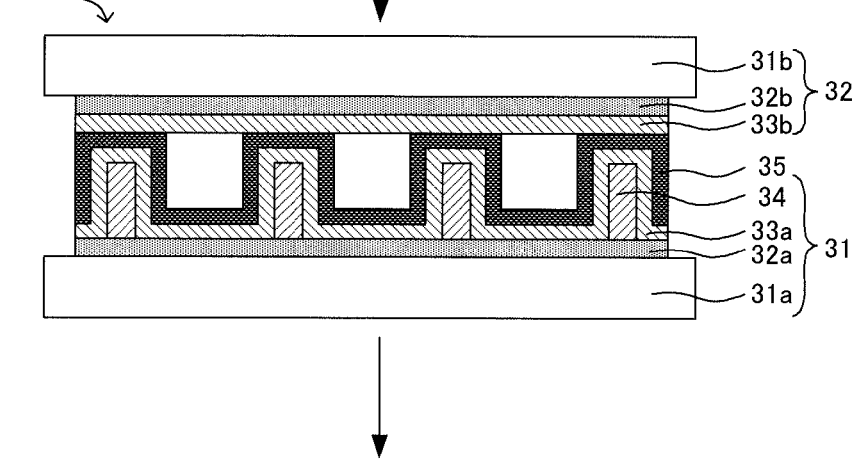

Next, the spacer side substrate 31' and the counter substrate 32 are brought into contact with each other to oppose the first alignment layer 33a and the second alignment layer 33b to each other with the uncured reactive liquid crystal layer 35' interposed therebetween, and then the reactive liquid crystal is fixed by irradiation with ultraviolet rays or the like, thereby bonding the spacer side substrate and the counter substrate to each other to form a liquid crystal display substrate pair 40' (a liquid crystal display substrate pair-forming step: FIG. 9C).

Figure 9D:
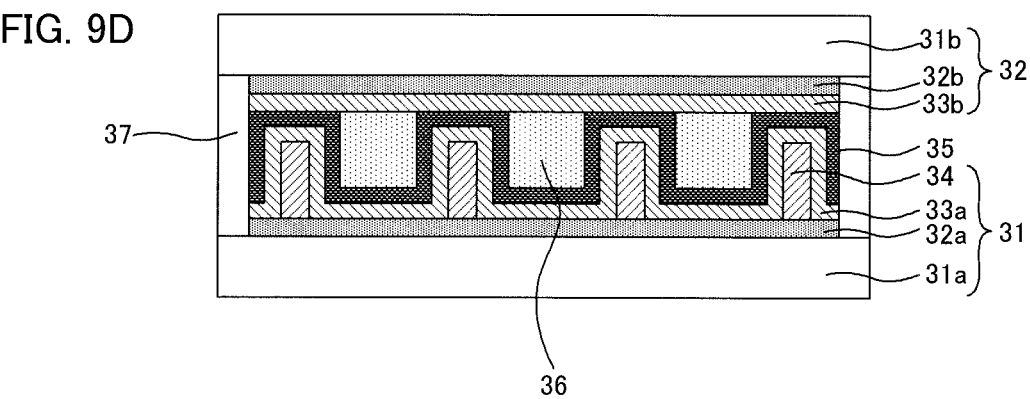

Next, a liquid crystal layer made of a ferroelectric liquid crystal is injected to between the spacer side substrate 31 and the counter substrate 32 of the liquid crystal display substrate pair 40', and then the liquid crystal is sealed up with a sealing agent 37, thereby forming a liquid crystal layer 36 (a liquid crystal layer forming step: FIG. 9D). In the sub-embodiment, a liquid crystal display is produced through the above-mentioned steps.

According to the sub-embodiment, the spacer side substrate and the counter substrate can be strongly fixed to each other with the reactive alignment layer interposed therebetween; thus, a liquid crystal display in which the cell gap is not fluctuated to exhibit an excellent display quality can be produced.

The liquid crystal display produced according to the sub-embodiment has the reactive liquid crystal layer on either one of the first alignment layer or the second alignment layer, thereby restraining alignment defects of the ferroelectric liquid crystal, such as zigzag defects, hairpin defects or double domains. Thus, a liquid crystal display in which an operation mode of mono-stability can be realized using a ferroelectric liquid crystal can be obtained.

Hereinafter, the liquid crystal display producing process of the sub-embodiment will be described in detail.

1. Uncured Reactive Alignment Layer Forming Step

First, the uncured reactive alignment layer forming step in the sub-embodiment is described. The uncured reactive alignment layer forming step in the sub-embodiment is a step of forming an uncured reactive alignment layer comprising a reactive liquid crystal on at least one of the first alignment layer of the spacer side substrate or the second alignment layer of the counter substrate.

The uncured reactive alignment layer formed in the present step will be a reactive alignment layer by fixing the reactive liquid crystal in the liquid crystal display substrate pair-forming step, which will be described later.

The uncured reactive alignment layer forming step in the sub-embodiment will be described herein after.

(1) Spacer Side Substrate Forming Step

The spacer side substrate forming step of forming a spacer side substrate used in the liquid crystal display producing process of the sub-embodiment is described. The spacer side substrate forming step is a step of forming a spacer side substrate having a first substrate, a first electrode formed on the first substrate, one or more spacers formed on the first electrode, and a first alignment layer formed on the first electrode and the spacer(s). Usually, the spacer side substrate forming step is composed of a first electrode forming step of forming a first electrode on a first substrate, a spacer forming step of forming one or more spacers on the first electrode formed in the first electrode forming step, and a first alignment layer forming step of forming a first alignment layer on the first electrode and the spacer(s) after the spacer forming step.

i) First Electrode Forming Step

First, the first electrode forming step is described. The first electrode forming step is a step of forming a first electrode layer on a first substrate.

a. First Substrate

The first substrate used in the first electrode forming step is same as the one described in the item of "B-1-1. First Sub-embodiment 2. Spacer side substrate", and the explanation thereof is omitted.

b. Method for Forming the First Electrode

The method for forming the first electrode on the first substrate in the step is not particularly limited as long as the method is a method making it possible to form the first electrode having an even thickness. The method is same as the one described in the item of "A-2. Process for producing the liquid crystal display", and the explanation thereof is omitted.

Other matters of the first electrode used in the step are the same as described in the item of "B-1-1. First Sub-embodiment 2. Spacer side substrate". Thus, the description thereof is omitted.

ii) Spacer Forming Step

Next, the spacer forming step is described. The spacer forming step is a step of forming one or more spacers on the first electrode formed in the first electrode forming step.

The method for forming the spacer(s) on the first electrode is not particularly limited as long as the method is a method making it possible to form the spacer(s) which has/have a desired shape on a predetermined position or predetermined positions with a high precision. A general patterning method can be applied. Such patterning method is same as the one described in the item of "A-2. Process for producing the liquid crystal display", and the explanation thereof is omitted.

Other matters of spacer(s) are the same as described in the item of "B-1-1. First Sub-embodiment 2. Spacer side substrate". Thus, the description thereof is omitted.

iii) First Alignment Layer Forming Step

Next, the first alignment layer forming step is described. The first alignment layer forming step is a step of forming a first alignment layer on the first electrode and the spacer(s) formed in the first electrode forming step and the spacer forming step. In the first alignment layer forming step, a rubbing alignment layer may be formed or a photo alignment layer may be formed.

Here, in this step, the methods of forming the photo alignment layer and the rubbing alignment layer are same as the one described in the item of "A-2. Process for producing the liquid crystal display", and the explanation thereof is omitted.

The constituent materials and other matters of the first alignment layer are the same as described in the item of "B-1-1. First Sub-embodiment 2. Spacer side substrate". Thus, the description thereof is omitted.

(2) Counter Substrate Forming Step

Next, the counter substrate forming step of forming a counter substrate used in the liquid crystal display producing process of the sub-embodiment is described. The counter substrate forming step is a step of forming a counter substrate having a second substrate, a second electrode formed on the second substrate, and a second alignment layer formed on the second electrode. Usually, the counter substrate forming step is composed of a second electrode forming step of forming a second electrode on a second substrate, and a second alignment layer forming step of forming a second alignment layer on the second electrode formed in the second electrode forming step.

i) Second Electrode Forming Step

The second electrode forming step is a step of forming a second electrode on a second substrate. The method for forming the second electrode in the second electrode forming step is similar to the step described in the above-mentioned item of "1. Spacer side substrate forming step i) First electrode forming step". Thus, the description thereof is omitted.

The second substrate used in the second electrode forming step, and the constituent material and other matters of the second electrode are the same as described in the above-mentioned item of "B-1-1. First Sub-embodiment 3. Counter substrate". Thus, the description thereof is omitted.

ii) Second Alignment Layer Forming Step

The second alignment layer forming step is a step of forming a second alignment layer on the second electrode formed in the second electrode forming step. The method for forming the second alignment layer in the second alignment layer forming step is similar to the step described in the above-mentioned item of "1. Spacer side substrate forming step iii) First alignment layer forming step". Thus, the description thereof is omitted.

The constituent material and other matters of the second alignment layer are the same as described in the above-mentioned item of "B-1-1. First Sub-embodiment 3. Counter substrate". Thus, the description thereof is omitted.

(iii) Method of Forming Uncured Reactive Liquid Crystal Layer

In the step, the method of forming the uncured reactive liquid crystal layer is same as described in the above-mentioned item of "A-2. Liquid crystal display producing process". Thus, the description thereof is omitted.

2. Liquid Crystal Display Substrate Pair-Forming Step

Next, the liquid crystal display substrate pair-forming step in the sub-embodiment is described. The liquid crystal display substrate pair-forming step in the sub-embodiment is a step of bringing the spacer side substrate and the counter substrate into contact with each other to oppose the first alignment layer and the second alignment layer to each other with the uncured reactive liquid crystal layer, which is formed on either one of the spacer side substrate and the counter substrate, interposed therebetween, and then fixing the reactive liquid crystal contained in the uncured reactive liquid crystal layer, thereby bonding the spacer side substrate and the counter substrate to each other so as to form a liquid crystal display substrate pair.

In the step, the method for fixing the reactive liquid crystal contained in the uncured reactive liquid crystal layer is not particularly limited as long as the method is a method making it possible to fix the reactive liquid crystal and further bond the spacer side substrate and the counter substrate to each other in company with the fixation of the reactive liquid crystal. Usually, the reactive liquid crystal has a polymerizable liquid crystal material; thus, as such a method, a method of radiating an active radiation for activating the polymerizable liquid crystal material can be preferably used. The active radiation referred to herein means a radiation having a power for causing the polymerizable liquid crystal material to be polymerized.

The activating radiation is not particularly limited as long as it is a radiation capable of polymerizing the polymerizable liquid crystal material. In general, from the viewpoint of the device easiness, or the like, an ultraviolet ray or a visible light beam is used. An irradiation beam having a wavelength of 150 to 500 nm, preferably 250 to 450 nm, further preferably 300 to 400 nm is used.

According to the sub-embodiment, a method of directing an ultraviolet ray as the activating radiation to a polymerizable liquid crystal material to have the radical polymerization by generating a radical by the photo polymerization initiating agent with an ultraviolet ray is a preferable method. Since the method of using an ultraviolet ray as the activating radiation is a technique already established, it can be applied easily to the sub-embodiment including the photo polymerization initiating agent to be used.

As the light source of the irradiating light beam, a low pressure mercury lamp (a germicidal lamp, a fluorescent chemical lamp, a black light), a high pressure discharge lamp (a high pressure mercury lamp, a metal halide lamp), a short arc discharge lamp (an ultra high-pressure mercury lamp, a xenon lamp, a mercury xenon lamp), or the like can be presented as the examples. In particular, use of a metal halide lamp, a xenon lamp, a high pressure mercury lamp, or the like can be recommended. Moreover, the irradiation strength is adjusted optionally according to the composition of the reactive liquid crystal and the amount of the photo polymerization initiating agent.

The irradiation of such an activating radiation can be carried out by the temperature condition to have the above-mentioned polymerizable liquid crystal in a liquid crystal phase, or at a temperature lower than the temperature to have the liquid crystal phase. The polymerizable liquid crystal material once had the liquid crystal phase would not have the sudden disturbance of the aligned state even in the case the temperature is lowered thereafter.

As a method for fixing the aligned state of the polymerizable liquid crystal material, in addition to the above-mentioned method of directing the activating radiation, a method of polymerizing the polymerizable liquid crystal material by heating can be used as well. As the reactive liquid crystal used in this case, those having the polymerizable liquid crystal monomers contained in the reactive liquid crystal are thermally polymerized at the N—I transition point or lower of the reactive liquid crystal are preferable.

When the reactive liquid crystal is fixed to form the reactive liquid crystal layer in the step, a sealing agent made of a resin that is not yet cured and formed on at least one of the spacer side substrate and the counter substrate may be simultaneously cured to form the sealing agent between the spacer side substrate and the counter substrate. When the reactive liquid crystal layer and the sealing agent are simultaneously formed by curing treatment in this way, the producing process of the sub-embodiment can be made simple.

3. Liquid Crystal Layer Forming Step

Next, the liquid crystal layer forming step is described. The liquid crystal layer forming step is a step of forming a liquid crystal layer comprising a ferroelectric liquid crystal between the spacer side substrate and the counter substrate of the liquid crystal display substrate pair formed in the liquid crystal display substrate pair-forming step.

In the step, a ferroelectric liquid crystal is injected to between the spacer side substrate and the counter substrate of the liquid crystal display substrate pair, and a liquid crystal layer can be formed. The method for injecting the ferroelectric liquid crystal in the step is not particularly limited, and may be a method used generally as a method for producing a liquid crystal cell. The method which can be used is, for example, a method of heating the liquid crystal layer forming composition containing the ferroelectric liquid crystal to turn the composition to an isotropic liquid, using a capillary effect to inject the liquid, and sealing the liquid crystal with an adhesive agent. The injected ferroelectric liquid crystal can be aligned by cooling the liquid crystal layer forming composition slowly.

The ferroelectric liquid crystal and other matters used for the liquid crystal layer forming composition are the same as described in the above-mentioned item of "B-1-1. First Sub-embodiment 4. Liquid crystal layer". Thus, the description thereof is omitted.

4. Others

The driving method and the usage of the liquid crystal display obtained by the liquid crystal display producing process according to the sub-embodiment are the same as described in the item of "B-1-1. First Sub-embodiment 5. Others". Thus, the description thereof is omitted.

B-2-2. Second Sub-Embodiment

Next, the producing process of the liquid crystal display of second sub-embodiment will be explained. The process for producing a liquid crystal display of the sub-embodiment, uses a spacer side substrate having a first substrate, a first electrode formed on the first substrate, a spacer formed on the first electrode, and a first alignment layer formed on the first electrode and the spacer; and a counter substrate having a second substrate, a second electrode formed on the second substrate, and a second alignment layer formed on the second electrode, comprising steps of: an uncured reactive liquid crystal layer forming step of forming uncured reactive liquid crystal layers containing reactive liquid crystals different from each other in composition on the first alignment layer and the second alignment layer, respectively; a liquid crystal display substrate pair-forming step of bringing the uncured reactive liquid crystal layer formed on the first alignment layer formed in the uncured reactive liquid crystal layer forming step and the uncured reactive liquid crystal layer formed on the second alignment layer formed in the same step into contact with each other so as to be opposed to each other, and then fixing the reactive liquid crystals, thereby bonding the spacer side substrate and the counter substrate to each other to form a liquid crystal display substrate pair; and a liquid crystal layer forming step of forming a liquid crystal layer comprising a ferroelectric liquid crystal between the spacer side substrate and the counter substrate of the liquid crystal display substrate pair formed in the liquid crystal display substrate pair-forming step.

Figure 10A:
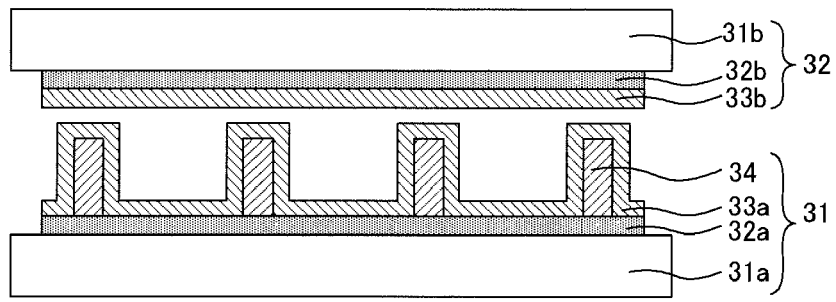
FIGS. 10A to 10D are process charts illustrating another example of a process for producing the liquid crystal display of the second embodiment of the invention

With reference to the drawings, the producing process of the sub-embodiment is described. FIGS. 10A to 10D are process charts illustrating an example of the producing process of the sub-embodiment. As illustrated in FIGS. 10A to 10D, in the producing process of the sub-embodiment, prepared are first a spacer side substrate 31 having a first substrate 31a, a first electrode 32a formed on the first substrate 31a, spacers 34 formed on the first electrode 32a and a first alignment layer 33a formed on the first electrode 32a and the spacers 34, and a counter substrate 32 having a second substrate 31b, a second electrode 32b formed on the second substrate 31b, and a second alignment layer 33b formed on the second electrode 32b (FIG. 10A).

Figure 10B:
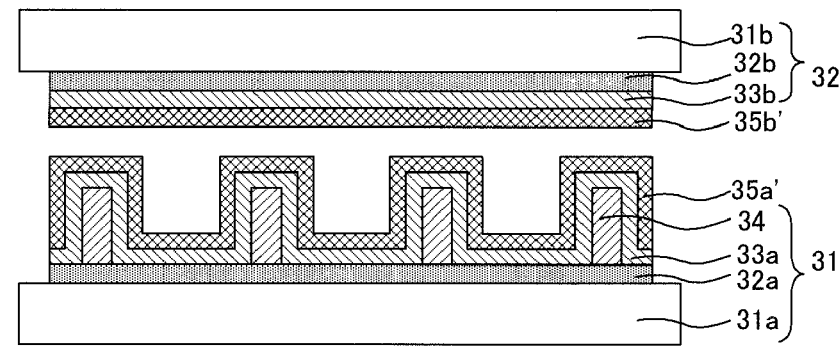

Next, uncured reactive liquid crystal layers (35a' and 35b') containing reactive liquid crystals different from each other in composition are formed on the first alignment layer 31a and the second alignment layer 32a, respectively (an uncured reactive liquid crystal layer forming step: FIG. 10B).

Figure 10C:
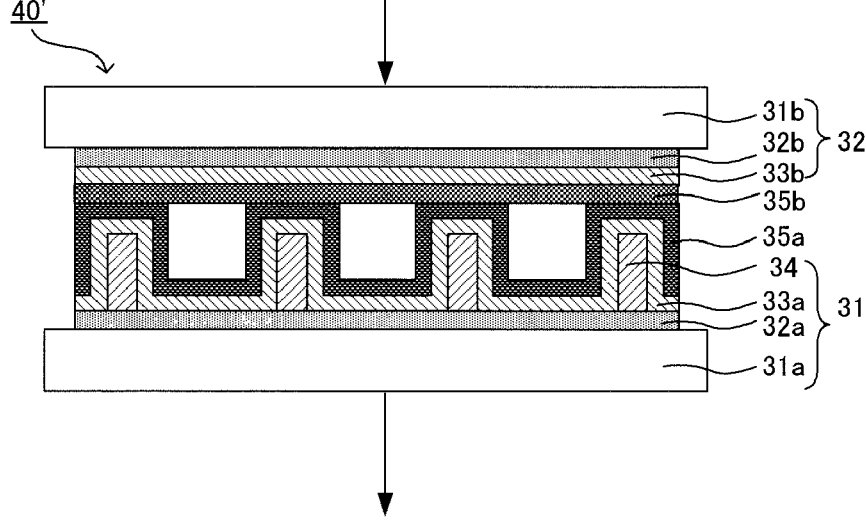

Next, the uncured reactive liquid crystal layer 35a' formed on the first alignment layer 33a and the uncured reactive liquid crystal layer 35b' formed on the second alignment layer 33b are opposed to each other, and brought into contact with each other, and then the reactive liquid crystals are fixed, thereby bonding the spacer side substrate and the counter substrate to each other to form a liquid crystal display substrate pair 40' (a liquid crystal display substrate pair-forming step: FIG. 10C).

Figure 10D:
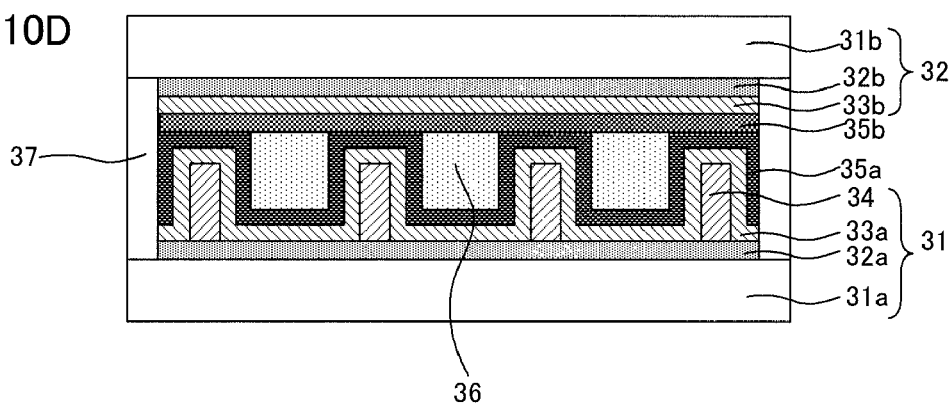

Next, a liquid crystal layer made of a ferroelectric liquid crystal is injected to between the spacer side substrate 31 and the counter substrate 32 of the liquid crystal display substrate pair 40', and then it is sealed up with a sealing agent 37, thereby forming a liquid crystal layer 36 (a liquid crystal layer forming step: FIG. 10D). In the sub-embodiment, a liquid crystal display is produced through the above-mentioned steps.

According to the liquid crystal display producing process of the sub-embodiment, the uncured reactive liquid crystal layers are formed on the first alignment layer and the second alignment layer, respectively, thereby making it possible to yield a liquid crystal display in which the alignment of the ferroelectric liquid crystal is more controlled than in the case of using only the alignment layers. Moreover, the reactive liquid crystal contained in the uncured reactive liquid crystal layer formed on the first alignment layer is different in composition from the reactive liquid crystal contained in the uncured reactive liquid crystal layer formed on the second alignment layer, thereby restraining the generation of alignment defects, such as zigzag defects, hairpin defects and double domains. Thus, a liquid crystal display in which a ferroelectric liquid crystal is used to realize an operation mode of mono-stability can be obtained.

Hereinafter, the liquid crystal display producing process of the sub-embodiment will be described.

1. Uncured Reactive Liquid Crystal Layer Forming Step

The reactive liquid crystal layer forming step in the sub-embodiment is a step of forming uncured reactive liquid crystal layers containing reactive liquid crystals different from each other in composition on the first alignment layer of the spacer side substrate and the second alignment layer of the counter substrate, respectively. In the reactive liquid crystal layer forming step in the sub-embodiment, uncured reactive liquid crystal layers are formed on the spacer side substrate and the counter substrate, and the reactive liquid crystal contained in the reactive liquid crystal layer formed for the spacer side substrate is different in composition from the reactive liquid crystal contained in the uncured reactive liquid crystal layer formed for the counter substrate. In this point, the present producing process is different from the liquid crystal display producing process of the first embodiment.

In the uncured reactive liquid crystal layer forming step in the sub-embodiment, the method for forming the uncured reactive liquid crystal layers on the first alignment layer of the spacer side substrate and the second alignment layer of the counter substrate, respectively, is the same as descried in the above-mentioned item of "B-2-1. First sub-embodiment 1. Uncured reactive liquid crystal layer forming step". Thus, the description thereof is omitted.

The spacer side substrate forming step of forming the spacer side substrate used in the sub-embodiment, and the counter substrate forming step of forming the counter substrate used in the sub-embodiment are the same as described in the above-mentioned item of "B-2-1. First sub-embodiment". Thus, the description thereof is omitted.

2. Others

The liquid crystal display substrate pair forming step and the liquid crystal layer forming step are the same as described in the above-mentioned item of "B-2-1. First Sub-embodiment". Thus, the description thereof is omitted.

The driving method and the application of the liquid crystal display obtained in the process for producing a liquid crystal display are the same as described in the above-mentioned item of "B-1-1. First Sub-embodiment 6. Others". Thus, the description thereof is omitted.

B-2-3. Third Sub-Embodiment

Next, the process for producing a liquid crystal display of the third sub-embodiment will be explained. The process for producing a liquid crystal display of the sub-embodiment, uses a spacer side substrate having a first substrate, a first electrode formed on the first substrate, a spacer formed on the first electrode, and a first alignment layer formed on the first electrode and the spacer; and a counter substrate having a second substrate, a second electrode formed on the second substrate, and a second alignment layer formed on the second electrode, comprising steps of: an uncured reactive liquid crystal layer forming step of forming an uncured reactive liquid crystal layer containing a reactive liquid crystal on either one of the first alignment layer or the second alignment layer; a liquid crystal dropping step of dropping a heated ferroelectric liquid crystal onto either one of the first alignment layer or the second alignment layer after the uncured reactive liquid crystal layer forming step; and a substrate bonding step of bringing the spacer substrate and the counter substrate to oppose the first alignment layer and the second alignment layer with the uncured reactive liquid crystal layer, which is formed in the uncured reactive liquid crystal layer forming step, interposed therebetween, and then fixing the reactive liquid crystal, thereby bonding the spacer side substrate and the counter substrate.

Figure 11A:
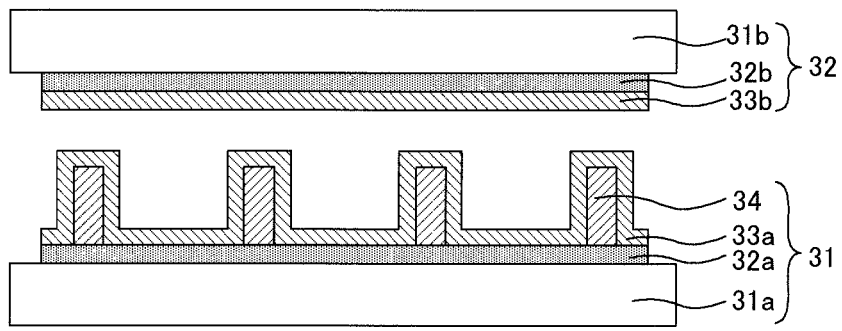
FIGS. 11A to 11D are process charts illustrating yet another example of a process for producing the liquid crystal display of the second embodiment of the invention.

Next, the liquid crystal display producing process of the sub-embodiment is described with reference to the drawings. FIGS. 11A to 11D are process charts illustrating an example of the liquid crystal display producing process of the sub-embodiment. As illustrated in FIGS. 11A to 11D, in the liquid crystal display producing process of the sub-embodiment, prepared are first a spacer side substrate 31 having a first substrate 31a, a first electrode 32a formed on the first substrate 31a, spacers 34 formed on the first electrode 32a and a first alignment layer 33a formed on the first electrode 32a and the spacers 34, and a counter substrate 32 having a second substrate 31b, a second electrode 32b formed on the second substrate 31b and a second alignment layer 33b formed on the second electrode 32b (FIG. 11A).

Figure 11B:
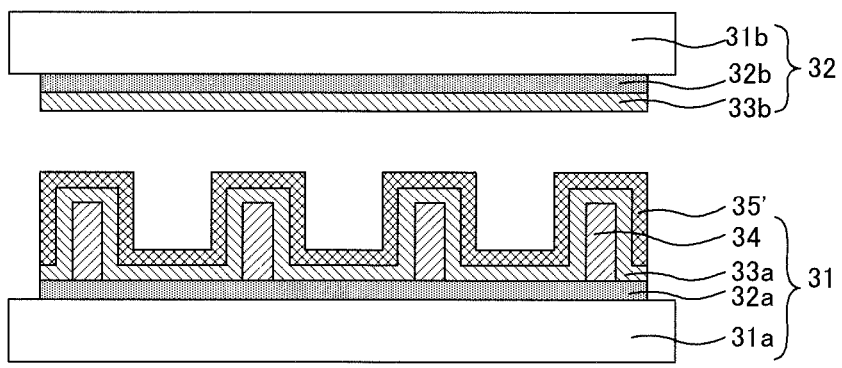

Next, an uncured reactive liquid crystal layer 35' containing a reactive liquid crystal is formed on the first alignment layer 33a of the spacer side substrate 31 (an uncured reactive liquid crystal layer forming step: FIG. 11B).

Figure 11C:
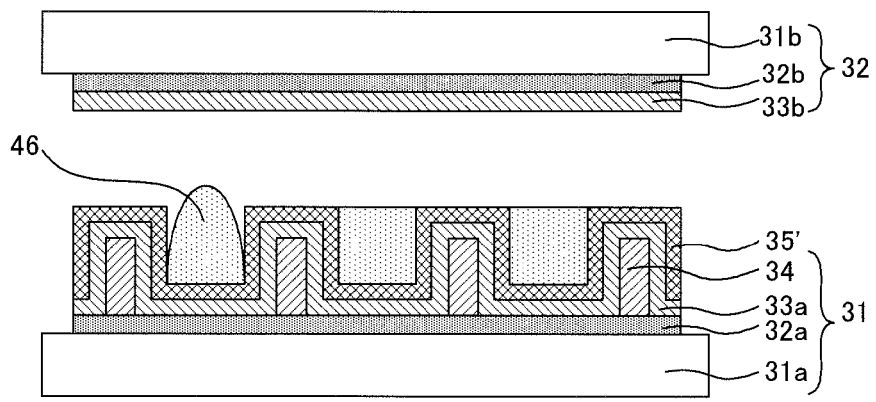

Next, the spacer side substrate 31 is heated up to a temperature at which a ferroelectric liquid crystal turns into an isotropic phase, and a disperser in which the ferroelectric liquid crystal is put in a heated syringe is used to drop the ferroelectric liquid crystal 46 in an isotropic liquid state onto the uncured reactive liquid crystal layer 35' (a liquid crystal dropping step: FIG. 11C). At this time, the ferroelectric liquid crystal 46 flows in the region spaced with the spacers 34 so that the region spaced with the spacers 34 is filled with the ferroelectric liquid crystal 46.

Figure 11D:
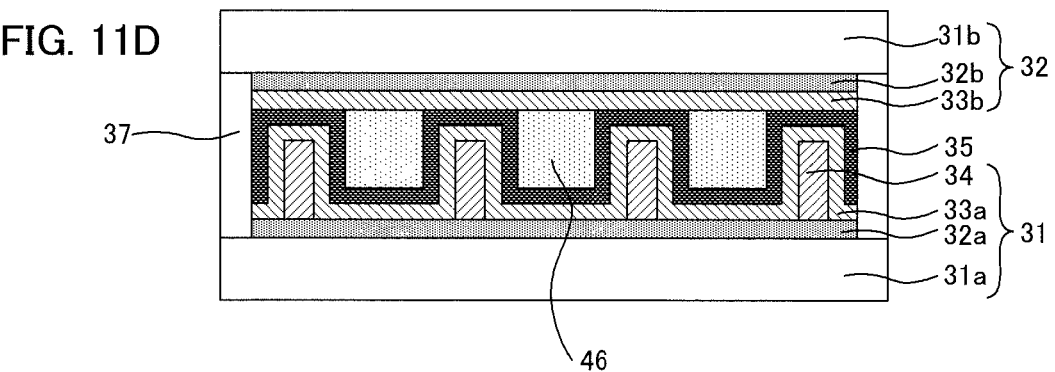

Next, the spacer side substrate 31 on which the ferroelectric liquid crystal 46 is dropped and the counter substrate 32 are opposed to each other to face the first alignment layer 33$a$ and the second alignment layer 33$b$ to each other with the uncured reactive liquid crystal layer 35' interposed therebetween. The pressure in the gap between the spacer side substrate 31 and the counter substrate 32 is sufficiently reduced. Under the reduced pressure, the spacer side substrate 31 and the counter substrate 32 are put onto each other, and a predetermined pressure is applied thereto, so as to make the cell gap even. Furthermore, the pressure is returned to normal pressure, thereby applying a pressure further to between the spacer side substrate 31 and the counter substrate 32. The reactive liquid crystal contained in the uncured reactive liquid crystal layer 35' is fixed by irradiation with ultraviolet rays or the like, thereby bonding the spacer side substrate 31 and the counter substrate 32 to each other (a substrate bonding step: FIG. 11D).

Thereafter, the system is slowly cooled to room temperature, thereby aligning the sealed-in ferroelectric liquid crystal, which is not illustrated. In the sub-embodiment, a liquid crystal display is produced through the above-mentioned steps.

According to the sub-embodiment, the spacer side substrate and the counter substrate can be strongly fixed to each other with the reactive liquid crystal layer interposed therebetween; thus, a liquid crystal display in which the cell gap is not fluctuated to exhibit an excellent display quality can be produced.

Furthermore, the liquid crystal display of the sub-embodiment has the reactive liquid crystal layer on either one of the first alignment layer or the second alignment layer, thereby the generation of alignment defects, such as zigzag defects, hairpin defects or double domains, is restrained, and an operation mode of mono-stability can be realized, using a ferroelectric liquid crystal.

Hereinafter, the liquid crystal display producing process of the sub-embodiment will be described in detail. The uncured reactive liquid crystal layer forming step is the same as described in the "B-2-1. First sub-embodiment". Thus, the description thereof is omitted.

1. Liquid Crystal Dropping Step

The liquid crystal dropping step in the sub-embodiment is a step of dropping a heated ferroelectric liquid crystal onto either one of the first alignment layer or the second alignment layer after the uncured reactive liquid crystal layer forming step.

In the step, the ferroelectric liquid crystal is dropped after the liquid crystal is heated up to a temperature at which the liquid crystal turns into an isotropic phase or a nematic phase. The temperature at this time may be set to, for example, a temperature near the nematic phase-isotropic phase transition temperature. At this time, it is preferred to heat the substrate onto which the ferroelectric liquid crystal is to be dropped, in advance, up to the above-mentioned temperature.

The ferroelectric liquid crystal is the same as described in the above-mentioned item of "B-1. Liquid crystal display". Thus, the description thereof is omitted. Moreover, the method for dropping the ferroelectric liquid crystal, and other matters are the same as described in the item of the second sub-embodiment in the "A-2. Process for producing the liquid crystal display". Thus, the description thereof is omitted.

2. Substrate Bonding Step

The substrate bonding step in the sub-embodiment is a step of bringing the spacer side substrate and the counter substrate into contact with each other to oppose the first alignment layer and the second alignment layer to each other with the uncured reactive liquid crystal layer, which is formed in the uncured reactive liquid crystal layer forming step, interposed therebetween, and then the reactive liquid crystal is fixed, thereby bonding the spacer side substrate and the counter substrate to each other.

The method for opposing the spacer side substrate and the counter substrate to each other is the same as described in the item of the second sub-embodiment in the "A-2. Process for producing the liquid crystal display". Thus, the description thereof is omitted. The method for fixing the reactive liquid crystal of the uncured reactive liquid crystal layer, and other matters are the same as described about the liquid crystal display substrate pair-forming step in the above-mentioned "B-2-1. First sub-embodiment". Thus, the description thereof is omitted.

B-2-4. Fourth Sub-Embodiment

The liquid crystal display producing process of the forth sub-embodiment will be explained. The process for producing a liquid crystal display of the sub-embodiment, uses a spacer side substrate having a first substrate, a first electrode formed on the first substrate, a spacer formed on the first electrode, and a first alignment layer formed on the first electrode and the spacer; and a counter substrate having a second substrate, a second electrode formed on the second substrate, and a second alignment layer formed on the second electrode, comprising steps of: an uncured reactive liquid crystal layer forming step of forming uncured reactive liquid crystal layers containing reactive liquid crystals different from each other in composition on the first alignment layer and the second alignment layer, respectively; a liquid crystal dropping step of dropping a heated ferroelectric liquid crystal onto either one of the first alignment layer or the second alignment layer after the uncured reactive liquid crystal layer forming step; and a substrate bonding step of bringing the uncured reactive liquid crystal layer formed on the first alignment layer formed in the uncured reactive liquid crystal layer forming step and the uncured reactive liquid crystal layer formed on the second alignment layer formed in the same step into contact with each other so as to be opposed to each other, and then fixing the reactive liquid crystals, thereby bonding the spacer side substrate and the counter substrate to each other.

Figure 12A:
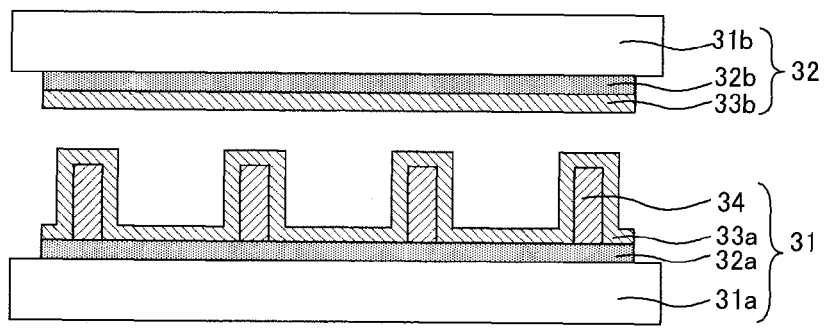
FIGS. 12A to 12D are process charts illustrating still another example of a process for producing the liquid crystal display of the second embodiment of the invention.

Next, the liquid crystal display producing process of the sub-embodiment is described with reference to the drawings. FIGS. 12 A to 12D are process charts of an example of the liquid crystal display producing process of the sub-embodiment. As illustrated in FIGS. 12A to 12D, prepared are first a spacer side substrate 31 having a first substrate 31$a$, a first electrode 32$a$ formed on the first substrate 31$a$, spacers 34 formed on the first electrode 32$a$ and a first alignment layer 33$a$ formed on the first electrode 32$a$ and the spacers 34, and a counter substrate 32 having a second substrate 31$b$, a second electrode 32$b$ formed on the second substrate 31$b$ and a second alignment layer 33$b$ formed on the second electrode 32$b$ (FIG. 12A).

Figure 12B:
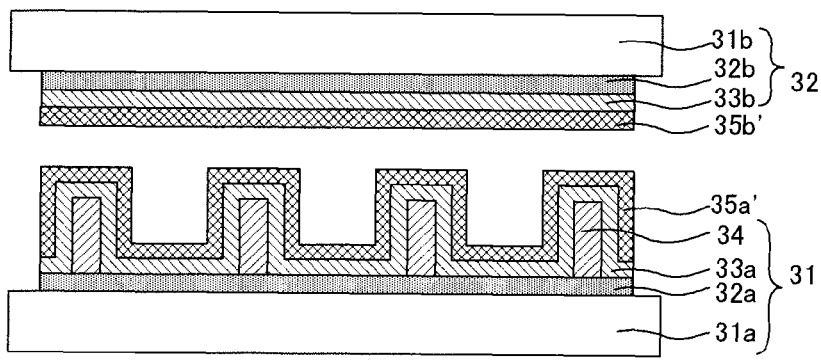

Next, uncured reactive liquid crystal layers 35$a$' and 35$b$' containing reactive liquid crystals different from each other in composition are formed on the first alignment layer 31$a$ and the second alignment layer 32$a$, respectively (an uncured reactive liquid crystal layer forming step: FIG. 12B).

Figure 12C:
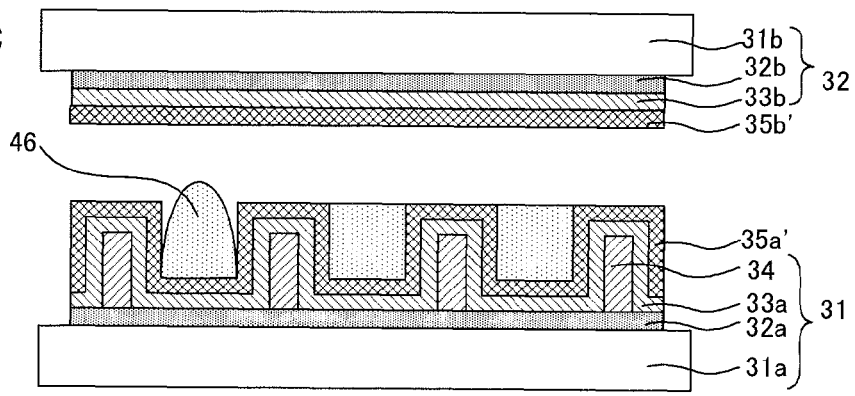

Next, the spacer side substrate 31 is heated up to a temperature at which a ferroelectric liquid crystal turns into an isotropic phase, and a disperser in which the ferroelectric liquid crystal is put in a heated syringe is used to drop the ferroelectric liquid crystal 46 in an isotropic liquid state onto the uncured reactive liquid crystal layer 35' (a liquid crystal dropping step: FIG. 12C). At this time, the ferroelectric liquid crystal 46 flows in the region spaced with the spacers 34 so that the region spaced with the spacers 34 is filled with the ferroelectric liquid crystal 46.

Next, the spacer side substrate 31 on which the ferroelectric liquid crystal 46 is dropped and the counter substrate 32 are opposed to each other to face the uncured reactive liquid crystal layer 35a' and the uncured reactive liquid crystal layer 35b' to each other. Then, the pressure in the gap between the spacer side substrate 31 and the counter substrate 32 is sufficiently reduced.

Figure 12D:
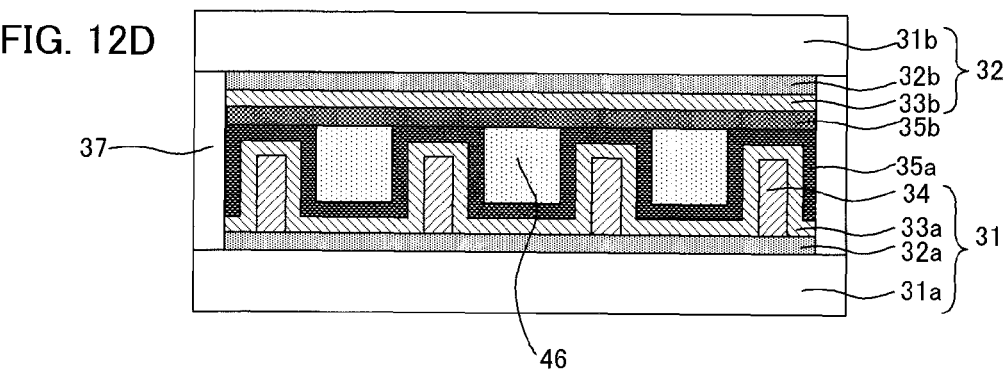

Next, the uncured reactive liquid crystal layer 35a formed on the first alignment layer 33a and the uncured reactive liquid crystal layer 35b formed on the second alignment layer 33b are opposed to each other and then brought into contact with each other. Thereafter, the reactive liquid crystals are fixed, thereby bonding the spacer side substrate and the counter substrate (a substrate bonding step: FIG. 12D).

Thereafter, the system is slowly cooled to room temperature, thereby aligning the sealed-in ferroelectric liquid crystal, which is not illustrated. In the sub-embodiment, a liquid crystal display is produced through the above-mentioned steps.

According to the liquid crystal display producing process of the sub-embodiment, the uncured reactive liquid crystal layers are formed on the first alignment layer and the second alignment layer, respectively, thereby making it possible to yield a liquid crystal display in which the alignment of the ferroelectric liquid crystal is more controlled than in the case of using only the alignment layers. Moreover, the reactive liquid crystal contained in the uncured reactive liquid crystal layer formed on the first alignment layer is different in composition from the reactive liquid crystal contained in the uncured reactive liquid crystal layer formed on the second alignment layer, thereby restraining the generation of alignment defects, such as zigzag defects, hairpin defects and double domains. Thus, a liquid crystal display in which a ferroelectric liquid crystal is used to realize an operation mode of mono-stability can be obtained.

The uncured reactive liquid crystal layer forming step is the same as in the above-mentioned "B-2-1. First sub-embodiment", and the liquid crystal dropping step and the substrate bonding step are the same as in the above-mentioned "B-2-3. Third sub-embodiment". Thus, the description thereof is omitted.

The present invention is not limited to the above-mentioned embodiments. The embodiments are examples, and all modifications having substantially the same structure and producing the same effects and advantages as the technical concept recited in the claims of the present invention are included in the technical scope of the invention.

EXAMPLES

Hereinafter, the invention will be specifically described by way of examples.

I. Liquid Crystal Display and Liquid Crystal Display Producing Process of the First Embodiment

I-1. Example 1

Two glass substrates (100 mm×100 mm×0.7 mm) each of which had, on its front surface, a formed indium tin oxide (ITO) thin film were prepared, and a photosensitive resin material (NN780, manufactured by JSR Corporation) was coated onto the ITO thin film of one of the substrates by spin coating (at 2000 rpm for 10 seconds). The resultant was vacuum-dried, and dried on a hot plate at 90° C. for 3 minutes. Thereafter, the resin film was patterned into the form of stripes of 10 μm width and 1 mm pitch by photolithography, and then fired at 230° C. for 30 minutes. In this way, spacers of 1.5 μm height were formed on the ITO thin film of the glass substrate.

Next, a solution in which a compound I represented by a formula illustrated below was dissolved (2% by mass) in cyclopentanone was coated onto each of the substrates by spin coating (at 1500 rpm for 15 seconds). The resultants were dried on a hot plate at 130° C. for 10 minutes. Thereafter, the resultants were exposed to polarized ultraviolet rays at 100 mJ, so as to be subjected to photo alignment treatment. In this way, a spacer side substrate and a counter substrate were formed.

A solution in which a compound II represented by a formula illustrated below was dissolved (5% by mass) in cyclopentanone was laminated onto the second alignment layer of the counter substrate by spin coating (at 1500 rpm for 15 seconds), and then dried on a hot plate at 55° C. for 3 minutes. Thereafter, a UV curable sealing material (LCB610, manufactured by EHC) was coated onto one of the substrates with a seal dispenser.

[Chemical Formula 18]

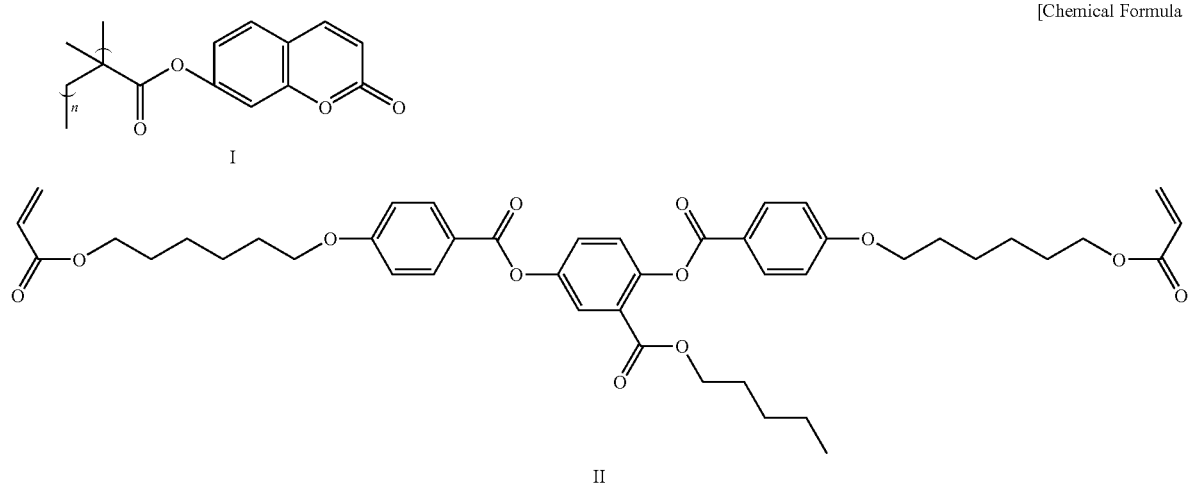

-continued

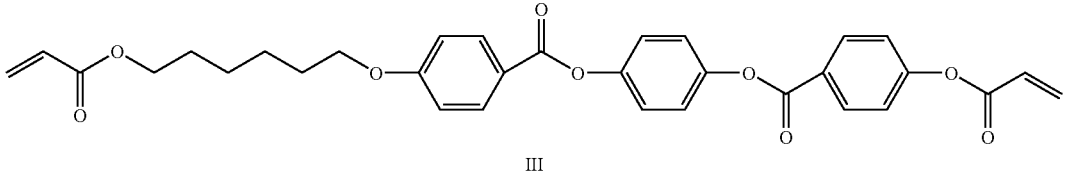

III

Next, the substrates were fabricated in parallel with the direction along which the polarized UV rays were radiated, and at 25° C. the resultant was exposed to non-polarized ultraviolet rays at 1000 mJ/cm² while a pressure was applied thereto. A liquid crystal "R2301" (manufactured by AZ Electronic Materials) was used, and the liquid crystal was caused to adhere onto the upper of the injecting opening. An oven was used to inject the liquid crystal thereto at a temperature 10 to 20° C. higher than the nematic phase-isotropic phase transition temperature, and then the system was slowly returned to room temperature.

The liquid crystal display thus produced was laid under a crossed nicol condition of a polarizing plate. The center of the liquid crystal display was pushed with a rod having a tip of 1 cm diameter at a load of 100 g. As a result, the displayed color was not changed and the liquid crystal alignment was not disturbed around the rod tip.

I-2. Comparative Example

Two glass substrates (100 mm×100 mm×0.7 mm) each of which had, on its front surface, a formed indium tin oxide (ITO) thin film were prepared, and a photosensitive resin material (NN780, manufactured by JSR Corporation) was coated onto the ITO thin film of one of the substrates by spin coating (at 2000 rpm for 10 seconds). The resultant was vacuum-dried, and dried on a hot plate at 90° C. for 3 minutes. Thereafter, the resin film was patterned into the form of stripes of 10 μm width and 1 mm pitch by photolithography, and then fired at 230° C. for 30 minutes. In this way, spacers of 1.5 μm height were formed on the ITO thin film of the glass substrate.

Next, a solution in which a compound I represented by the formula illustrated above was dissolved (2% by mass) in cyclopentanone was coated onto each of the substrates by spin coating (at 1500 rpm for 15 seconds). The resultants were dried on a hot plate at 130° C. for 10 minutes. Thereafter, the resultants were exposed to polarized ultraviolet rays at 100 mJ, so as to be subjected to photo alignment treatment. In this way, a spacer side substrate and a counter substrate were formed.

Next, a UV curable sealing material (LCB610, manufactured by EHC) was coated onto one of the substrates with a seal dispenser. The substrates were fabricated in parallel with the direction along which the polarized UV rays were radiated, and at 55° C. the resultant was exposed to non-polarized ultraviolet rays at 1000 mJ/cm² while a pressure was applied thereto. A liquid crystal "R2301" (manufactured by AZ Electronic Materials) was used, and the liquid crystal was caused to adhere onto the upper of the injecting opening. An oven was used to inject the liquid crystal thereto at a temperature 10 to 20° C. higher than the nematic phase-isotropic phase transition temperature, and then the system was slowly returned to room temperature.

The liquid crystal display thus produced was laid under a crossed nicol condition of a polarizing plate. The center of the liquid crystal display was pushed with a rod having a tip of 1 cm diameter at a load of 100 g. As a result, the displayed color was changed and the order of the liquid crystal alignment was broken around the rod tip.

I-3. Example 2

Two glass substrates (100 mm×100 mm×0.7 mm) each of which had, on its front surface, a formed indium tin oxide (ITO) thin film were prepared, and a photosensitive resin material (NN780, manufactured by JSR Corporation) was coated onto the ITO thin film of one of the substrates by spin coating (at 2000 rpm for 10 seconds). The resultant was vacuum-dried, and dried on a hot plate at 90° C. for 3 minutes. Thereafter, the resin film was patterned into the form of stripes of 10 μm width and 1 mm pitch by photolithography, and then fired at 230° C. for 30 minutes. In this way, spacers of 1.5 μm height were formed on the ITO thin film of the glass substrate.

Next, a solution in which a compound I represented by the formula illustrated above was dissolved (2% by mass) in cyclopentanone was coated onto each of the substrates by spin coating (at 1500 rpm for 15 seconds). The resultants were dried on a hot plate at 130° C. for 10 minutes. Thereafter, the resultants were exposed to polarized ultraviolet rays at 100 mJ, so as to be subjected to photo alignment treatment. In this way, a spacer side substrate and a counter substrate were formed.

A solution in which a compound III represented by the formula illustrated above was dissolved (5% by mass) in cyclopentanone was laminated onto the second alignment layer of the counter substrate by spin coating (at 1500 rpm for 15 seconds), and then dried on a hot plate at 55° C. for 3 minutes. Thereafter, a UV curable sealing material (LCB610, manufactured by EHC) was coated onto one of the substrates with a seal dispenser.

Next, the substrates were fabricated in parallel with the direction along which the polarized UV rays were radiated, and at 55° C. the resultant was exposed to non-polarized ultraviolet rays at 1000 mJ/cm² while a pressure was applied thereto. A liquid crystal "R2301" (manufactured by AZ Electronic Materials) was used, and the liquid crystal was caused to adhere onto the upper of the injecting opening. An oven was used to inject the liquid crystal thereto at a temperature 10 to 20° C. higher than the nematic phase-isotropic phase transition temperature, and then the system was slowly returned to room temperature.

The liquid crystal display thus produced was laid under a crossed nicol condition of a polarizing plate. The center of the liquid crystal display was pushed with a rod having a tip of 1 cm diameter at a load of 100 g. As a result, the displayed color was not changed and the liquid crystal alignment was not disturbed around the rod tip.

I-4. Example 3

A liquid crystal display was produced in the same way as in Example 1 except that the compound II was changed to ADEKA CHIRACOL PLC-7209 (manufactured by ASAHI DENKA CO., LTD.). The liquid crystal display thus produced was laid under a crossed nicol condition of a polarizing plate. The center of the liquid crystal display was pushed with a rod having a tip of 1 cm diameter at a load of 100 g. As a result, the displayed color was not changed and the liquid crystal alignment was not disturbed around the rod tip.

I-5. Example 4

A liquid crystal display was produced in the same way as in Example 1 except that the compound II was changed to ADEKA CHIRACOL PLC-7183 (manufactured by ASAHI DENKA CO., LTD.). The liquid crystal display thus produced was laid under a crossed nicol condition of a polarizing plate. The center of the liquid crystal display was pushed with a rod having a tip of 1 cm diameter at a load of 100 g. As a result, the displayed color was not changed and the liquid crystal alignment was not disturbed around the rod tip.

I-6. Example 5

A spacer side substrate and a counter substrate were formed in the same way as in Example 1. Next, a solution in which ADEKA CHIRACOL PLC-7209 (manufactured by ASAHI DENKA CO., LTD.) was dissolved (5% by mass) in cyclopentanone was laminated onto the first alignment layer of the spacer side substrate by spin coating (at 1500 rpm for 15 seconds). The resultant was dried on a hot plate at 55° C. for 3 minutes. On the other hand, a solution in which ADEKA CHIRACOL PLC-7183 (manufactured by ASAHI DENKA CO., LTD.) was dissolved (5% by mass) in cyclopentanone was laminated onto the second alignment layer of the counter substrate by spin coating (at 1500 rpm for 15 seconds). The resultant was dried on a hot plate at 55° C. for 3 minutes.

A UV curable sealing material (LCB610, manufactured by EHC) was coated onto either one of the spacer side substrate or the counter substrate with a seal dispenser. The substrates were fabricated in parallel with the direction along which the polarized UV rays were radiated, and at 55° C. the resultant was exposed to non-polarized ultraviolet rays at 1000 mJ/cm$^2$ while a pressure was applied thereto. A liquid crystal "R2301" (manufactured by AZ Electronic Materials) was used, and the liquid crystal was caused to adhere onto the upper of the injecting opening. An oven was used to inject the liquid crystal thereto at a temperature 10 to 20° C. higher than the nematic phase-isotropic phase transition temperature, and then the system was slowly returned to room temperature.

The liquid crystal display thus produced was laid under a crossed nicol condition of a polarizing plate. The center of the liquid crystal display was pushed with a rod having a tip of 1 cm diameter at a load of 100 g. As a result, the displayed color was not changed and the liquid crystal alignment was not disturbed around the rod tip.

II. Liquid Crystal Display and Liquid Crystal Display Producing Process of the Second Embodiment

II-1. Example 1

Formation of Spacers

Two glass substrates (100 mm×100 mm×0.7 mm) each of which had, on its front surface, a formed indium tin oxide (ITO) thin film were prepared, and a photosensitive resin material (NN780, manufactured by JSR Corporation) was coated onto the ITO thin film of one of the substrates by spin coating (at 2000 rpm for 10 seconds). The resultant was vacuum-dried, and dried on a hot plate at 90° C. for 3 minutes. Thereafter, the resin film was patterned into the form of stripes of 10 μm width and 1 mm pitch by photolithography, and then fired at 230° C. for 30 minutes. In this way, spacers of 1.5 μm height were formed on the ITO thin film of the glass substrate.

Next, a solution in which a compound I represented by the formula illustrated above was dissolved (2% by mass) in cyclopentanone was coated onto each of the substrates by spin coating (at 1500 rpm for 15 seconds). The resultants were dried on a hot plate at 130° C. for 10 minutes. Thereafter, the resultants were exposed to polarized ultraviolet rays at 100 mJ, so as to be subjected to photo alignment treatment. In this way, a spacer side substrate and a counter substrate were formed.

Next, a solution in which a compound II represented by the formula illustrated above was dissolved (5% by mass) in cyclopentanone was coated onto the second alignment layer of the counter substrates by spin coating (at 1500 rpm for 15 seconds). The resultants were dried on a hot plate at 55° C. for 3 minutes. Next, a UV curable sealing material (LCB610, manufactured by EHC) was coated onto one of the substrates with a seal dispenser.

The substrates were subsequently fabricated in parallel with the direction along which the polarized UV rays were radiated, and at 25° C. the resultant was exposed to non-polarized ultraviolet rays at 1000 mJ/cm$^2$ while a pressure was applied thereto. A liquid crystal "R2301" (manufactured by AZ Electronic Materials) was used, and the liquid crystal was caused to adhere onto the upper of the injecting opening. An oven was used to inject the liquid crystal thereto at a temperature 10 to 20° C. higher than the nematic phase-isotropic phase transition temperature, and then the system was slowly returned to room temperature.

The liquid crystal display thus produced was laid under a crossed nicol condition of a polarizing plate. The center of the liquid crystal display was pushed with a rod having a tip of 1 cm diameter at a load of 100 g. As a result, the displayed color was not changed and the liquid crystal alignment was not disturbed around the rod tip.

II-2. Comparative Example

Two glass substrates (100 mm×100 mm×0.7 mm) each of which had, on its front surface, a formed indium tin oxide (ITO) thin film were prepared, and a photosensitive resin material (NN780, manufactured by JSR Corporation) was coated onto the ITO thin film of one of the substrates by spin coating (at 2000 rpm for 10 seconds). The resultant was vacuum-dried, and dried on a hot plate at 90° C. for 3 minutes. Thereafter, the resin film was patterned into the form of stripes of 10 μm width and 1 mm pitch by photolithography, and then fired at 230° C. for 30 minutes. In this way, spacers of 1.5 μm height were formed on the ITO thin film of the glass substrate.

Next, a solution in which a compound I represented by the formula illustrated above was dissolved (2% by mass) in cyclopentanone was coated onto each of the substrates by spin coating (at 1500 rpm for 15 seconds). The resultants were dried on a hot plate at 130° C. for 10 minutes. Thereafter, the resultants were exposed to polarized ultraviolet rays at 100 mJ, so as to be subjected to photo alignment treatment. In this way, a spacer side substrate and a counter substrate were formed.

Next, a UV curable sealing material (LCB610, manufactured by EHC) was coated onto one of the substrates with a seal dispenser. The substrates were fabricated in parallel with the direction along which the polarized UV rays were radiated, and at 55° C. the resultant was exposed to non-polarized ultraviolet rays at 1000 mJ/cm$^2$ while a pressure was applied thereto. A liquid crystal "R2301" (manufactured by AZ Electronic Materials) was used, and the liquid crystal was caused to adhere onto the upper of the injecting opening. An oven was used to inject the liquid crystal thereto at a temperature 10 to 20° C. higher than the nematic phase-isotropic phase transition temperature, and then the system was slowly returned to room temperature.

The liquid crystal display thus produced was laid under a crossed nicol condition of a polarizing plate. The center of the liquid crystal display was pushed with a rod having a tip of 1 cm diameter at a load of 100 g. As a result, the displayed color was changed and the order of the liquid crystal alignment was broken around the rod tip.

II-3. Example 2

A liquid crystal display was produced in the same way as in Example 1 except that the compound II was changed to ADEKA CHIRACOL PLC-7209 (manufactured by ASAHI DENKA CO., LTD.). The liquid crystal display thus produced was laid under a crossed nicol condition of a polarizing plate. The center of the liquid crystal display was pushed with a rod having a tip of 1 cm diameter at a load of 100 g. As a result, the displayed color was not changed and the liquid crystal alignment was not disturbed around the rod tip.

II-4. Example 3

A liquid crystal display was produced in the same way as in Example 1 except that the compound II was changed to ADEKA CHIRACOL PLC-7183 (manufactured by ASAHI DENKA CO., LTD). The liquid crystal display thus produced was laid under a crossed nicol condition of a polarizing plate. The center of the liquid crystal display was pushed with a rod having a tip of 1 cm diameter at a load of 100 g. As a result, the displayed color was not changed and the liquid crystal alignment was not disturbed around the rod tip.

II-5. Example 4

A spacer side substrate and a counter substrate were formed in the same way as in Example 1. Next, a solution in which ADEKA CHIRACOL PLC-7209 (manufactured by ASAHI DENKA CO., LTD.) was dissolved (5% by mass) in cyclopentanone was laminated onto the first alignment layer of the spacer side substrate by spin coating (at 1500 rpm for 15 seconds). The resultant was dried on a hot plate at 55° C. for 3 minutes. On the other hand, a solution in which ADEKA CHIRACOL PLC-7183 (manufactured by ASAHI DENKA CO., LTD.) was dissolved (5% by mass) in cyclopentanone was laminated onto the second alignment layer of the counter substrate by spin coating (at 1500 rpm for 15 seconds). The resultant was dried on a hot plate at 55° C. for 3 minutes.

A UV curable sealing material (LCB610, manufactured by EHC) was coated onto either one of the spacer side substrate or the counter substrate with a seal dispenser. The substrates were fabricated in parallel with the direction along which the polarized UV rays were radiated, and at 55° C. the resultant was exposed to non-polarized ultraviolet rays at 1000 mJ/cm$^2$ while a pressure was applied thereto. A liquid crystal "R2301" (manufactured by AZ Electronic Materials) was used, and the liquid crystal was caused to adhere onto the upper of the injecting opening. An oven was used to inject the liquid crystal thereto at a temperature 10 to 20° C. higher than the nematic phase-isotropic phase transition temperature, and then the system was slowly returned to room temperature.

The liquid crystal display thus produced was laid under a crossed nicol condition of a polarizing plate. The center of the liquid crystal display was pushed with a rod having a tip of 1 cm diameter at a load of 100 g. As a result, the displayed color was not changed and the liquid crystal alignment was not disturbed around the rod tip.

The invention claimed is:

1. A liquid crystal display, comprising: a spacer side substrate having a first substrate, a first electrode formed on the first substrate, a spacer formed on the first electrode, and a first alignment layer formed on the first electrode and the spacer; and a counter substrate having a second substrate, a second electrode formed on the second substrate, and a second alignment layer formed on the second electrode;
   in which the spacer side substrate and the counter substrate are provided to oppose the first alignment layer and the second alignment layer to each other; and
   in which a liquid crystal layer comprising a ferroelectric liquid crystal are held between the spacer side substrate and the counter substrate;
   wherein a reactive liquid crystal layer obtained by fixing a reactive liquid crystal is formed on only one of the first alignment layer and the second alignment layer, and
   further wherein the spacer side substrate and the counter substrate are bonded to each other with the reactive liquid crystal layer interposed therebetween,
   wherein the ferroelectric liquid crystal, having a phase sequence via no Smectic A phase, is made into a mono-stability state, is capable of attaining gray scale display by a change in applied voltage, and has half-V shaped switching properties, and further wherein the ferroelectric liquid crystal shows mono domain alignment in the liquid crystal layer.

2. A liquid crystal display, comprising: a spacer side substrate having a first substrate, a first electrode formed on the first substrate, a spacer formed on the first electrode, a first alignment layer formed on the first electrode and the spacer, and a first reactive liquid crystal layer formed on the first alignment layer and obtained by fixing a reactive liquid crystal; and a counter substrate having a second substrate, a second electrode formed on the second substrate, a second alignment layer formed on the second electrode, and a second reactive liquid crystal layer formed on the second alignment layer and obtained by fixing a reactive liquid crystal;
   in which the spacer side substrate and the counter substrate are provided to oppose the first reactive liquid crystal layer and the second reactive liquid crystal layer to each other; and in which a liquid crystal layer comprising a ferroelectric liquid crystal are held between the spacer side substrate and the counter substrate;
   wherein the reactive liquid crystal which constitutes the first reactive liquid crystal layer and the reactive liquid crystal which constitutes the second reactive liquid crystal layer are different from each other in composition,
   wherein the ferroelectric liquid crystal, having a phase sequence via no Smectic A phase, is made into a mono-stability state, has half-V shaped switching properties, and is capable of attaining gray scale display by a change in applied voltage, and further wherein the ferroelectric liquid crystal shows mono domain alignment in the liquid crystal layer.

3. The liquid crystal display according to claim 1, wherein the reactive liquid crystal shows a nematic phase.

4. The liquid crystal display according to claim 1, wherein the reactive liquid crystal has a polymerizable liquid crystal monomer.

5. The liquid crystal display according to claim 4, wherein the polymerizable liquid crystal monomer is a monoacrylate monomer or a diacrylate monomer.

6. The liquid crystal display according to claim 5, wherein the diacrylate monomer is a compound represented by the below-mentioned formula (1):

[Chemical Formula 3]

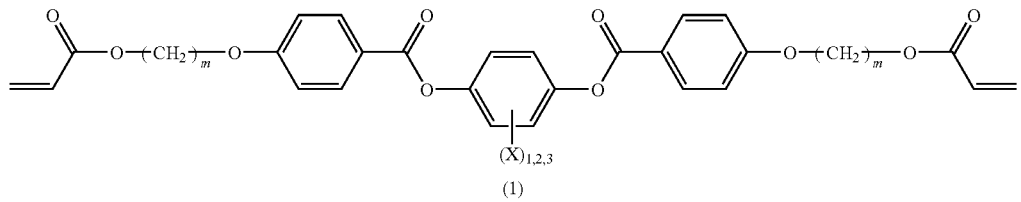

(1)

in which, X in the formula is hydrogen, alkyl having 1 to 20 carbon atoms, alkenyl having 1 to 20 carbon atoms, alkyloxy having 1 to 20 carbon atoms, alkyloxy carbonyl having 1 to 20 carbon atoms, formyl, alkyl carbonyl having 1 to 20 carbon atoms, alkyl carbonyloxy having 1 to 20 carbon atoms, halogen, cyano or nitro; and m is an integer in a range of 2 to 20.

7. The liquid crystal display according to claim 5, wherein the diacrylate monomer is a compound represented by the below-mentioned formula (2):

[Chemical Formula 4]

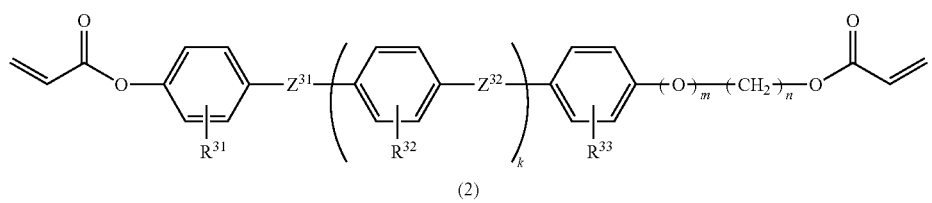

(2)

in which, $Z^{31}$ and $Z^{32}$ in the formula are each independently and directly bonded —COO—, —OCO—, —O—, —CH$_2$CH$_2$—, —CH=CH—, —C≡C—, —OCH$_2$—, —CH$_2$O—, —CH$_2$CH$_2$COO— or —OCOCH$_2$CH$_2$—; $R^{31}$, $R^{32}$ and $R^{33}$ are each independently hydrogen or alkyl having 1 to 5 carbon atoms; k and m are each 0 or 1; and n is an integer in a range of 2 to 8.

8. The liquid crystal display according to claim 1, wherein the first alignment layer and the second alignment layer is a photo alignment layer.

9. The liquid crystal display according to claim 8, wherein a constituent material for the photo alignment layer is a photoreactive type material to exhibit anisotropy to the photo alignment layer by generating a photoreaction, or a photo-isomerization type material including a photo-isomerization-reactive compound to exhibit anisotropy to the photo alignment layer by generating a photo-isomerization reaction.

10. The liquid crystal display according to claim 1, wherein the spacer side substrate and the counter substrate have, therebetween, a sealing agent comprising an ultraviolet curable resin.

11. The liquid crystal display according to claim 1, wherein the liquid crystal display is driven by an active matrix system using a thin film transistor.

12. The liquid crystal display according to claim 1, wherein the liquid crystal display is displayed by a field sequential color system.

13. The liquid crystal display according to claim 2, wherein the reactive liquid crystal shows a nematic phase.

14. The liquid crystal display according to claim 2, wherein the reactive liquid crystal has a polymerizable liquid crystal monomer.

15. The liquid crystal display according to claim 14, wherein the polymerizable liquid crystal monomer is a monoacrylate monomer or a diacrylate monomer.

16. The liquid crystal display according to claim 15, wherein the diacrylate monomer is a compound represented by the below-mentioned formula (1):

[Chemical Formula 5]

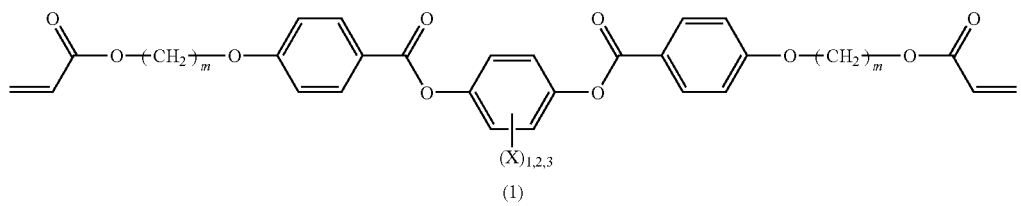

(1)

in which, X in the formula is hydrogen, alkyl having 1 to 20 carbon atoms, alkenyl having 1 to 20 carbon atoms, alkyloxy having 1 to 20 carbon atoms, alkyloxy carbonyl having 1 to 20 carbon atoms, formyl, alkyl carbonyl having 1 to 20 carbon atoms, alkyl carbonyloxy having 1 to 20 carbon atoms, halogen, cyano or nitro; and m is an integer in a range of 2 to 20.

17. The liquid crystal display according to claim 15, wherein the diacrylate monomer is a compound represented by the below-mentioned formula (2):

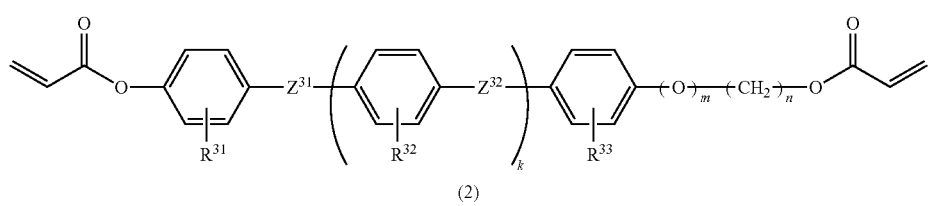

[Chemical Formula 6]

(2)

in which, $Z^{31}$ and $Z^{32}$ in the formula are each independently and directly bonded —COO—, —OCO—, —O—, —CH$_2$CH$_2$—, —CH=CH—, —C≡C—, —OCH$_2$—, —CH$_2$O—, —CH$_2$CH$_2$COO— or —OCOCH$_2$CH$_2$—; $R^{31}$, $R^{32}$ and $R^{33}$ are each independently hydrogen or alkyl having 1 to 5 carbon atoms; k and m are each 0 or 1; and n is an integer in a range of 2 to 8.

18. The liquid crystal display according to claim 2, wherein the first alignment layer and the second alignment layer is a photo alignment layer.

19. The liquid crystal display according to claim 18, wherein a constituent material for the photo alignment layer is a photoreactive type material to exhibit anisotropy to the photo alignment layer by generating a photoreaction, or a photo-isomerization type material including a photo-isomerization-reactive compound to exhibit anisotropy to the photo alignment layer by generating a photo-isomerization reaction.

20. The liquid crystal display according to claim 2, wherein the spacer side substrate and the counter substrate have, therebetween, a sealing agent comprising an ultraviolet curable resin.

21. The liquid crystal display according to claim 2, wherein the liquid crystal display is driven by an active matrix system using a thin film transistor.

22. The liquid crystal display according to claim 2, wherein the liquid crystal display is displayed by a field sequential color system.

\* \* \* \* \*